(12) United States Patent
Alexander et al.

(10) Patent No.: US 12,320,584 B2
(45) Date of Patent: Jun. 3, 2025

(54) PORTABLE COOLER

(71) Applicant: YETI Coolers, LLC, Austin, TX (US)

(72) Inventors: Clayton Alexander, Westlake Village, CA (US); Daren John Leith, Agoura Hills, CA (US); Mikko Juhani Timperi, San Marcos, CA (US); Christopher Thomas Wakeham, Solana Beach, CA (US); Rahul Mulinti, Westlake Village, CA (US); Jacob William Emmert, Westchester, CA (US); Paul Thomas Gurney, Irvine, CA (US); Simon David James, Simi Valley, CA (US)

(73) Assignee: YETI Coolers, LLC, Austin, TX (US)

( * ) Notice: Subject to any disclaimer, the term of this patent is extended or adjusted under 35 U.S.C. 154(b) by 0 days.

(21) Appl. No.: 18/328,486

(22) Filed: Jun. 2, 2023

(65) Prior Publication Data

US 2024/0142154 A1 May 2, 2024

Related U.S. Application Data

(63) Continuation of application No. 17/514,690, filed on Oct. 29, 2021, now Pat. No. 11,668,508, which is a
(Continued)

(51) Int. Cl.
*F25B 21/02* (2006.01)
*F25D 3/08* (2006.01)
(Continued)

(52) U.S. Cl.
CPC ............... *F25D 3/08* (2013.01); *F25B 21/02* (2013.01); *F25D 11/003* (2013.01);
(Continued)

(58) Field of Classification Search
CPC ........ F25D 2303/08; F25D 2303/0843; F25D 2303/084; F25D 2303/082; F25D 2400/361
See application file for complete search history.

(56) References Cited

U.S. PATENT DOCUMENTS

| | | |
|---|---|---|
| 1,649,067 A | 11/1927 | Karlson |
| 1,721,311 A | 7/1929 | Muenchen |
| (Continued) | | |

FOREIGN PATENT DOCUMENTS

| | | |
|---|---|---|
| CH | 631614 | 8/1982 |
| CN | 2052513 U | 2/1990 |
| (Continued) | | |

OTHER PUBLICATIONS

Office Action dated Feb. 6, 2024, received in Japanese Patent Application No. 2021-577125.
(Continued)

*Primary Examiner* — Lionel Nouketcha
(74) *Attorney, Agent, or Firm* — Banner & Witcoff, Ltd.

(57) ABSTRACT

A cooler container kit is described. The cooler container kit includes a container body having a payload chamber, a lid, an electronic system, and one or more electrical connectors. The cooler kit further includes a conduit extending about the payload chamber. The cooler container kit further includes a temperature control system including a cold side heat sink, hot side heat sink, thermoelectric module, and a pump operable to flow a liquid relative to the cold side heat sink to cool the liquid. The cooler container kit further includes a docking unit.

20 Claims, 36 Drawing Sheets

Related U.S. Application Data continuation-in-part of application No. 17/094,098, filed on Nov. 10, 2020, now Pat. No. 11,162,716, which is a continuation-in-part of application No. 16/908,519, filed on Jun. 22, 2020, now Pat. No. 11,365,926.

(60) Provisional application No. 62/866,398, filed on Jun. 25, 2019, provisional application No. 62/887,453, filed on Aug. 15, 2019, provisional application No. 62/955,696, filed on Dec. 31, 2019, provisional application No. 62/970,029, filed on Feb. 4, 2020.

(51) Int. Cl.
  *F25D 11/00* (2006.01)
  *F25D 29/00* (2006.01)

(52) U.S. Cl.
  CPC .... *F25D 29/003* (2013.01); *F25B 2321/0251* (2013.01); *F25D 2400/12* (2013.01); *F25D 2400/36* (2013.01); *F25D 2700/12* (2013.01)

(56) References Cited

U.S. PATENT DOCUMENTS

| | | |
|---|---|---|
| 1,727,913 A | 9/1929 | Svenn et al. |
| 2,046,125 A | 6/1936 | Lacy |
| 2,483,979 A | 10/1949 | Morrill |
| 2,548,076 A | 4/1951 | Bogoia Strezoff |
| 2,746,265 A | 5/1956 | Mills |
| 3,064,113 A | 11/1962 | Pitrone |
| 3,129,116 A | 4/1964 | Corry |
| 3,155,260 A | 11/1964 | Widener |
| 3,238,944 A | 3/1966 | Hirschhorn |
| 3,345,934 A | 10/1967 | Steiner |
| 3,435,622 A | 4/1969 | Barton et al. |
| 3,463,140 A | 8/1969 | Rollor, Jr. |
| 3,536,893 A | 10/1970 | Cran |
| 3,539,399 A | 11/1970 | Harvey |
| 3,543,842 A | 12/1970 | Veit Merges |
| 3,603,106 A | 9/1971 | Ryan et al. |
| 3,607,444 A | 9/1971 | DeBucs |
| 3,622,753 A | 11/1971 | Lax |
| 3,678,248 A | 7/1972 | Tricault et al. |
| 3,739,148 A | 6/1973 | Ryckman, Jr. |
| 3,757,085 A | 9/1973 | Balaguer |
| 3,766,975 A | 10/1973 | Todd |
| 3,797,563 A | 3/1974 | Hoffmann et al. |
| 3,823,567 A | 7/1974 | Corini |
| 3,892,945 A | 7/1975 | Lerner |
| 3,931,494 A | 1/1976 | Fisher et al. |
| 4,038,831 A | 8/1977 | Gaudel et al. |
| 4,068,115 A | 1/1978 | Mack et al. |
| 4,095,090 A | 6/1978 | Pianezza |
| 4,134,004 A | 1/1979 | Anderson et al. |
| 4,240,272 A | 12/1980 | Tiede et al. |
| 4,442,343 A | 4/1984 | Genuit et al. |
| 4,470,999 A | 9/1984 | Carpiac |
| 4,531,046 A | 7/1985 | Stover |
| 4,537,044 A | 8/1985 | Putnam |
| 4,681,611 A | 7/1987 | Bohner |
| 4,751,368 A | 6/1988 | Daifotes |
| D296,509 S | 7/1988 | Fuke |
| 4,785,637 A | 11/1988 | Giebeler |
| 4,801,782 A | 1/1989 | Ineson |
| 4,827,107 A | 5/1989 | Peery |
| 4,865,986 A | 9/1989 | Coy et al. |
| 4,978,833 A | 12/1990 | Knepler |
| 4,980,539 A | 12/1990 | Walton |
| 4,982,722 A | 1/1991 | Wyatt |
| 4,983,798 A | 1/1991 | Eckler |
| 5,042,258 A | 8/1991 | Sundhar |
| 5,090,209 A | 2/1992 | Martin |
| 5,163,290 A | 11/1992 | Kinnear |
| 5,174,122 A | 12/1992 | Levine |
| 5,199,275 A | 4/1993 | Martin |
| 5,208,896 A | 5/1993 | Katayev |
| 5,209,069 A | 5/1993 | Newnan |
| 5,217,064 A | 6/1993 | Kellow |
| 5,243,684 A | 9/1993 | Edwards |
| 5,274,215 A | 12/1993 | Jackson |
| 5,283,420 A | 2/1994 | Montalto |
| 5,313,787 A | 5/1994 | Martin |
| 5,343,368 A | 8/1994 | Miller |
| 5,388,565 A | 2/1995 | Ou |
| 5,448,809 A | 9/1995 | Kraus |
| 5,456,164 A | 10/1995 | Bang |
| 5,497,883 A | 3/1996 | Monetti |
| 5,508,494 A | 4/1996 | Sarris et al. |
| 5,508,600 A | 4/1996 | Myslinski |
| 5,535,815 A | 7/1996 | Hyman |
| 5,549,035 A | 8/1996 | Wing-Chung |
| 5,550,452 A | 8/1996 | Shirai et al. |
| 5,603,220 A | 2/1997 | Seaman |
| 5,603,858 A | 2/1997 | Wyatt et al. |
| 5,605,047 A | 2/1997 | Park |
| 5,643,485 A | 7/1997 | Potter et al. |
| 5,678,925 A | 10/1997 | Garmaise et al. |
| 5,731,568 A | 3/1998 | Malecek |
| 5,737,923 A | 4/1998 | Gilley |
| 5,771,788 A | 6/1998 | Lee |
| 5,786,643 A | 7/1998 | Wyatt et al. |
| 5,842,353 A | 12/1998 | Kuo-Liang |
| 5,862,669 A | 1/1999 | Davis |
| 5,884,006 A | 3/1999 | Frohlich et al. |
| 5,903,133 A | 5/1999 | Amero, Jr. et al. |
| 5,948,301 A | 9/1999 | Liebermann |
| 5,954,984 A | 9/1999 | Ablah et al. |
| 5,959,433 A | 9/1999 | Rohde |
| 6,000,224 A | 12/1999 | Foye |
| 6,000,225 A | 12/1999 | Ghoshal |
| 6,003,319 A | 12/1999 | Gilley et al. |
| 6,005,233 A | 12/1999 | Wyatt |
| 6,013,901 A | 1/2000 | Lavoie |
| 6,020,575 A | 2/2000 | Nagle et al. |
| 6,032,481 A | 3/2000 | Mosby |
| 6,038,865 A | 3/2000 | Watanabe |
| 6,042,720 A | 3/2000 | Reber |
| 6,072,161 A | 6/2000 | Stein |
| 6,075,229 A | 6/2000 | Vanselow |
| 6,089,409 A | 7/2000 | Hart |
| 6,106,784 A | 8/2000 | Lund et al. |
| 6,108,489 A | 8/2000 | Frohlich |
| 6,110,159 A | 8/2000 | Tsujita |
| 6,119,460 A | 9/2000 | Huang |
| 6,123,065 A | 9/2000 | Teglbjarg |
| 6,140,614 A | 10/2000 | Padamsee |
| 6,141,975 A | 11/2000 | Tatsumi |
| 6,144,016 A | 11/2000 | Garvin |
| 6,158,227 A | 12/2000 | Seeley |
| 6,178,753 B1 | 1/2001 | Scudder |
| 6,180,003 B1 | 1/2001 | Reber et al. |
| 6,209,343 B1 | 4/2001 | Owen |
| 6,212,959 B1 | 4/2001 | Perkins |
| 6,232,585 B1 | 5/2001 | Clothier |
| RE37,213 E | 6/2001 | Staggs |
| 6,260,360 B1 | 7/2001 | Wheeler |
| 6,274,856 B1 | 8/2001 | Clothier |
| 6,279,470 B2 | 8/2001 | Simeray et al. |
| 6,281,611 B1 | 8/2001 | Chen et al. |
| 6,295,820 B1 | 10/2001 | Cauchy |
| 6,308,518 B1 | 10/2001 | Hunter |
| 6,310,329 B1 | 10/2001 | Carter |
| 6,314,867 B1 | 11/2001 | Russell |
| 6,316,753 B2 | 11/2001 | Clothier |
| 6,320,169 B1 | 11/2001 | Clothier |
| 6,350,972 B1 | 2/2002 | Wright |
| 6,351,952 B1 | 3/2002 | Baker, III |
| 6,353,208 B1 | 3/2002 | Bostic |
| 6,376,803 B1 | 4/2002 | Klinger |
| 6,384,387 B1 | 5/2002 | Owens |
| 6,403,928 B1 | 6/2002 | Ford |
| 6,414,278 B1 | 7/2002 | Frohlich et al. |
| 6,415,624 B1 | 7/2002 | Connors et al. |

(56) References Cited

U.S. PATENT DOCUMENTS

| | | |
|---|---|---|
| 6,427,863 B1 | 8/2002 | Nichols |
| 6,433,313 B1 | 8/2002 | Owens |
| 6,434,000 B1 | 8/2002 | Pandolfi |
| 6,444,961 B2 | 9/2002 | Clothier |
| 6,539,725 B2 | 4/2003 | Bell |
| 6,543,335 B1 | 4/2003 | Lassota |
| 6,555,789 B2 | 4/2003 | Owens |
| 6,558,947 B1 | 5/2003 | Lund et al. |
| 6,571,564 B2 | 6/2003 | Upadhye |
| 6,584,374 B2 | 6/2003 | Lee et al. |
| 6,598,405 B2 | 7/2003 | Bell |
| 6,609,392 B1 | 8/2003 | Brown |
| 6,622,515 B2 | 9/2003 | Baker, III |
| 6,634,417 B1 | 10/2003 | Kolowich |
| 6,637,210 B2 | 10/2003 | Bell |
| 6,651,445 B1 | 11/2003 | Clark |
| 6,657,170 B2 | 12/2003 | Clothier |
| 6,662,978 B2 | 12/2003 | Lin et al. |
| 6,664,520 B2 | 12/2003 | Clothier |
| 6,668,577 B2 | 12/2003 | Quenedey |
| 6,672,076 B2 | 1/2004 | Bell |
| 6,674,052 B1 | 1/2004 | Luo |
| 6,702,138 B1 | 3/2004 | Bielecki et al. |
| 6,703,590 B1 | 3/2004 | Holley |
| 6,751,963 B2 | 6/2004 | Navedo et al. |
| 6,753,775 B2 | 6/2004 | Auerbach et al. |
| 6,771,183 B2 | 8/2004 | Hunter |
| 6,818,867 B2 | 11/2004 | Kressmann |
| 6,822,198 B2 | 11/2004 | Rix |
| 6,852,954 B1 | 2/2005 | Liu et al. |
| 6,864,462 B2 | 3/2005 | Sanoner et al. |
| 6,870,135 B2 | 3/2005 | Hamm |
| 6,948,321 B2 | 9/2005 | Bell |
| 6,953,913 B1 | 10/2005 | Hara et al. |
| 6,968,888 B2 | 11/2005 | Kolowich |
| 7,002,111 B2 | 2/2006 | Bauer |
| 7,022,946 B2 | 4/2006 | Sanoner et al. |
| 7,034,256 B1 | 4/2006 | Phillips |
| 7,057,527 B2 | 6/2006 | Hunter |
| 7,059,387 B2 | 6/2006 | Kolowich |
| 7,069,739 B2 | 7/2006 | Porter |
| 7,073,678 B1 | 7/2006 | Dibdin et al. |
| 7,091,455 B2 | 8/2006 | Fung |
| 7,109,445 B2 | 9/2006 | Patterson et al. |
| 7,111,465 B2 | 9/2006 | Bell |
| 7,117,684 B2 | 10/2006 | Scudder |
| 7,140,508 B2 | 11/2006 | Kuhn et al. |
| 7,140,768 B2 | 11/2006 | Prabhakar |
| 7,174,720 B2 | 2/2007 | Kennedy |
| 7,193,190 B2 | 3/2007 | Kissel, Jr. |
| 7,208,707 B2 | 4/2007 | Clothier |
| 7,212,955 B2 | 5/2007 | Kirshenbau et al. |
| 7,225,632 B2 | 6/2007 | Derifield |
| 7,227,108 B2 | 6/2007 | Clothier |
| 7,260,438 B2 | 8/2007 | Caldwell |
| 7,263,283 B2 | 8/2007 | Knepler |
| 7,263,855 B2 | 9/2007 | Meyer et al. |
| 7,276,676 B1 | 10/2007 | Thompson |
| 7,278,270 B2 | 10/2007 | Culp |
| 7,287,386 B2 | 10/2007 | Upadhye et al. |
| 7,294,374 B2 | 11/2007 | Romero |
| 7,411,792 B2 | 8/2008 | Richards et al. |
| 7,414,380 B2 | 8/2008 | Tang et al. |
| 7,419,073 B2 | 9/2008 | Crisp, III |
| 7,421,845 B2 | 9/2008 | Bell |
| 7,431,174 B2 | 10/2008 | Thissen |
| 7,511,617 B2 | 3/2009 | Burman et al. |
| 7,571,830 B2 | 8/2009 | Lin |
| 7,592,084 B2 | 9/2009 | Hoffjann |
| 7,659,493 B2 | 2/2010 | Reusche et al. |
| 7,681,754 B1 | 3/2010 | Ross |
| 7,683,572 B2 | 3/2010 | Toya |
| 7,721,566 B1 | 5/2010 | Wilken |
| 7,728,711 B2 | 6/2010 | Shoenfeld |
| 7,748,223 B2 | 7/2010 | Minoura |
| 7,764,497 B2 | 7/2010 | Becklin |
| 7,784,301 B2 | 8/2010 | Sasaki et al. |
| 7,802,446 B2 | 9/2010 | Overgaard |
| 7,815,067 B2 | 10/2010 | Matsumoto et al. |
| 7,825,353 B2 | 11/2010 | Shingler |
| 7,836,722 B2 | 11/2010 | Magill et al. |
| 7,861,538 B2 | 1/2011 | Welle et al. |
| 7,872,214 B2 | 1/2011 | Schandel |
| 7,886,655 B1 | 2/2011 | Lassota |
| 7,908,870 B2 | 3/2011 | Williams et al. |
| 7,913,511 B2 | 3/2011 | Meyer et al. |
| 7,926,293 B2 | 4/2011 | Bell |
| 7,934,537 B2 | 5/2011 | Kolowich |
| 7,939,312 B2 | 5/2011 | Roberts et al. |
| 7,942,145 B2 | 5/2011 | Palena et al. |
| 7,948,209 B2 | 5/2011 | Jung |
| 7,966,927 B2 | 6/2011 | Yoakim |
| 7,997,786 B2 | 8/2011 | Liu |
| 8,055,310 B2 | 11/2011 | Beart |
| 8,056,357 B2 | 11/2011 | Bruce |
| 8,061,149 B1 | 11/2011 | Gowans |
| 8,076,620 B2 | 12/2011 | Maupin et al. |
| 8,113,365 B2 | 2/2012 | Brown |
| 8,146,485 B2 | 4/2012 | Ozanne |
| 8,156,755 B2 | 4/2012 | Murray |
| 8,205,468 B2 | 6/2012 | Hemminger et al. |
| 8,215,835 B2 | 7/2012 | Hyde et al. |
| 8,272,530 B2 | 9/2012 | Rebernik |
| 8,272,532 B2 | 9/2012 | Michaelian et al. |
| 8,274,016 B2 | 9/2012 | Montana |
| 8,280,453 B2 | 10/2012 | Beart et al. |
| 8,319,154 B2 | 11/2012 | Shaikh et al. |
| 8,336,729 B2 | 12/2012 | Kelly |
| 8,362,351 B2 | 1/2013 | Hagg et al. |
| 8,375,728 B2 | 2/2013 | Bell |
| 8,391,104 B2 | 3/2013 | De la Huergo |
| 8,398,602 B2 | 3/2013 | Iio |
| 8,400,104 B2 | 3/2013 | Adamczyk et al. |
| 8,424,316 B2 | 4/2013 | Tuszkiewicz |
| 8,448,457 B2 | 5/2013 | Cutting et al. |
| 8,448,809 B2 | 5/2013 | Kelly |
| 8,453,477 B2 | 6/2013 | Crespo et al. |
| 8,467,669 B2 | 6/2013 | Widanagamage et al. |
| 8,479,941 B2 | 7/2013 | Matsumoto et al. |
| 8,607,581 B2 | 12/2013 | Williams et al. |
| 8,618,448 B2 | 12/2013 | Clayton |
| 8,621,980 B2 | 1/2014 | Bunn |
| 8,646,282 B2 | 2/2014 | Ilercil et al. |
| 8,659,903 B2 | 2/2014 | Schwartz |
| 8,677,767 B2 | 3/2014 | Ilercil et al. |
| 8,759,721 B1 | 6/2014 | Alexander |
| D715,143 S | 10/2014 | Hewitt |
| 8,887,512 B2 | 11/2014 | Olsen |
| 8,887,944 B2 | 11/2014 | Deane et al. |
| 8,893,513 B2 | 11/2014 | June |
| 8,904,809 B2 | 12/2014 | Yuan et al. |
| 8,907,796 B2 | 12/2014 | Sweeney et al. |
| 8,919,138 B2 | 12/2014 | Kobayashi |
| 8,938,986 B2 | 1/2015 | Matta et al. |
| 8,991,194 B2 | 3/2015 | Edwards et al. |
| 9,021,825 B2 | 5/2015 | Hewitt |
| 9,022,249 B2 | 5/2015 | Ranade |
| 9,035,222 B2 | 5/2015 | Alexander |
| 9,057,568 B2 | 6/2015 | Malik et al. |
| 9,060,508 B2 | 6/2015 | Anti et al. |
| 9,103,572 B2 | 8/2015 | Edwards et al. |
| 9,115,919 B2 | 8/2015 | Ilercil |
| 9,134,055 B2 | 9/2015 | Ilercil |
| 9,138,295 B2 | 9/2015 | Hyde et al. |
| 9,139,319 B2 | 9/2015 | Crespo et al. |
| 9,139,351 B2 | 9/2015 | Chou et al. |
| 9,140,476 B2 | 9/2015 | Eckhoff et al. |
| 9,144,180 B2 | 9/2015 | Olsson et al. |
| 9,151,523 B2 | 10/2015 | Ilercil |
| 9,151,545 B2 | 10/2015 | Soukhojak |
| 9,182,155 B2 | 11/2015 | Crumlin |
| 9,184,427 B2 | 11/2015 | Chuang |
| 9,272,475 B2 | 3/2016 | Ranade et al. |
| 9,310,111 B2 | 4/2016 | Edwards et al. |

(56) References Cited

U.S. PATENT DOCUMENTS

| | | |
|---|---|---|
| 9,341,394 B2 | 5/2016 | Edwards et al. |
| 9,351,600 B2 | 5/2016 | Rime |
| 9,366,469 B2 | 6/2016 | Chapman, Jr. |
| 9,372,016 B2 | 6/2016 | Bloedow et al. |
| 9,429,350 B2 | 8/2016 | Chapman, Jr. |
| 9,435,578 B2 | 9/2016 | Calderon et al. |
| 9,447,995 B2 | 9/2016 | Bloedow et al. |
| 9,470,440 B2 | 10/2016 | Ilercil |
| 9,480,363 B2 | 11/2016 | Delattre |
| 9,513,067 B2 | 12/2016 | Ahmed |
| 9,573,754 B2 | 2/2017 | Ahmed et al. |
| 9,581,362 B2 | 2/2017 | Stanley et al. |
| 9,593,871 B2 | 3/2017 | Stanley et al. |
| 9,599,376 B2 | 3/2017 | Ilercil |
| 9,618,253 B2 | 4/2017 | Tansley |
| 9,685,598 B2 | 6/2017 | Marc |
| 9,688,454 B2 | 6/2017 | Ranade |
| 9,713,798 B2 | 7/2017 | Hewitt |
| 9,752,808 B2 | 9/2017 | Nakamura |
| 9,758,299 B2 | 9/2017 | Ahmed et al. |
| 9,791,184 B2 | 10/2017 | Novisoff et al. |
| 9,791,185 B2 | 10/2017 | Ilercil |
| 9,795,979 B2 | 10/2017 | Adler |
| 9,802,806 B2 | 10/2017 | Hewitt |
| 9,814,331 B2 | 11/2017 | Alexander |
| 9,828,165 B2 | 11/2017 | Ranade et al. |
| 9,829,221 B2 | 11/2017 | Ilercil |
| 9,874,377 B1 | 1/2018 | Ilercil |
| 9,885,502 B2 | 2/2018 | Yuan et al. |
| 9,950,851 B2 | 4/2018 | Ranade |
| 9,958,187 B2 | 5/2018 | Monroy |
| 10,012,417 B2 | 7/2018 | Edwards et al. |
| 10,101,420 B2 | 10/2018 | Wikus et al. |
| 10,119,733 B1 | 11/2018 | Ilercil |
| 10,156,388 B2 | 12/2018 | Ilercil |
| 10,161,657 B2 | 12/2018 | Ilercil |
| 10,181,109 B2 | 1/2019 | Joao |
| 10,188,229 B2 | 1/2019 | Alexander |
| 10,274,241 B2 | 4/2019 | Ghiraldi |
| 10,279,979 B2 | 5/2019 | Ranade |
| 10,287,085 B2 | 5/2019 | Kuhn |
| 10,328,074 B2 | 6/2019 | Engelhardt et al. |
| 10,372,922 B2 | 8/2019 | Paterra |
| 10,405,650 B2 | 9/2019 | Turner et al. |
| 10,458,684 B1 | 10/2019 | Ilercil |
| 10,472,158 B2 | 11/2019 | Ranade |
| 10,495,357 B2 | 12/2019 | Ilercil |
| 10,549,900 B2 | 2/2020 | McCormick |
| 10,562,695 B2 | 2/2020 | Knight |
| 10,625,922 B2 | 4/2020 | Epenetos et al. |
| 10,670,323 B2 | 6/2020 | Alexander et al. |
| 10,722,427 B2 | 7/2020 | Cantor |
| 10,743,708 B2 | 8/2020 | Alexander et al. |
| 10,941,972 B2 | 3/2021 | Alexander et al. |
| 10,989,466 B2 | 4/2021 | Alexander et al. |
| 11,090,225 B2 | 8/2021 | Vlahinos et al. |
| 11,172,585 B1 | 11/2021 | Smith, III et al. |
| 11,668,508 B2 | 6/2023 | Alexander |
| 2001/0009609 A1 | 7/2001 | Bradenbaugh |
| 2001/0023866 A1 | 9/2001 | Wang |
| 2002/0023912 A1 | 2/2002 | Mcgee |
| 2002/0083840 A1 | 7/2002 | Lassota |
| 2002/0104318 A1 | 8/2002 | Jaafar |
| 2002/0129712 A1 | 9/2002 | Westbrook |
| 2002/0162339 A1 | 11/2002 | Harrison |
| 2002/0175158 A1 | 11/2002 | Sanoner et al. |
| 2003/0010768 A1 | 1/2003 | Li |
| 2003/0024250 A1 | 2/2003 | Haas |
| 2003/0029862 A1 | 2/2003 | Clothier |
| 2003/0029876 A1 | 2/2003 | Giraud |
| 2003/0066638 A1 | 4/2003 | Qu |
| 2003/0074903 A1 | 4/2003 | Upadhye |
| 2003/0122455 A1 | 7/2003 | Caldwell |
| 2003/0145621 A1 | 8/2003 | Kidwell |
| 2004/0004072 A1 | 1/2004 | Clothier |
| 2004/0006996 A1 | 1/2004 | Butcher |
| 2004/0006997 A1 | 1/2004 | Clark |
| 2004/0007553 A1 | 1/2004 | Smolko |
| 2004/0111179 A1 | 6/2004 | Broadfield et al. |
| 2004/0159240 A1 | 8/2004 | Lyall, III |
| 2004/0167592 A1 | 8/2004 | Grove |
| 2004/0194470 A1 | 10/2004 | Upadhye et al. |
| 2004/0212120 A1 | 10/2004 | Giraud |
| 2004/0226309 A1 | 11/2004 | Broussard |
| 2005/0005612 A1 | 1/2005 | Kennedy |
| 2005/0045615 A1 | 3/2005 | Sanoner et al. |
| 2005/0121431 A1 | 6/2005 | Yuen |
| 2005/0242804 A1 | 11/2005 | Hintz |
| 2006/0021513 A1 | 2/2006 | Ide |
| 2006/0023480 A1 | 2/2006 | Plummer |
| 2006/0081599 A1 | 4/2006 | Anderson |
| 2006/0207442 A1 | 9/2006 | Pettersson |
| 2006/0261233 A1 | 11/2006 | Williams et al. |
| 2007/0024237 A1 | 2/2007 | Cole et al. |
| 2007/0051727 A1 | 3/2007 | Holley |
| 2007/0092773 A1 | 4/2007 | Guo |
| 2007/0144205 A1 | 6/2007 | Moore |
| 2007/0151457 A1 | 7/2007 | Rabin et al. |
| 2007/0182367 A1 | 8/2007 | Partovi |
| 2007/0186577 A1 | 8/2007 | Goncharko |
| 2007/0223895 A1 | 9/2007 | Flemm |
| 2007/0278207 A1 | 12/2007 | Van Hoy |
| 2007/0279002 A1 | 12/2007 | Partovi |
| 2008/0011077 A1 | 1/2008 | Ramus et al. |
| 2008/0019122 A1 | 1/2008 | Kramer |
| 2008/0022695 A1 | 1/2008 | Welle |
| 2008/0041233 A1 | 2/2008 | Bunn |
| 2008/0041859 A1 | 2/2008 | Teglbjarg |
| 2008/0121630 A1 | 5/2008 | Simard |
| 2008/0135564 A1 | 6/2008 | Romero |
| 2008/0141681 A1 | 6/2008 | Arnold |
| 2008/0149624 A1 | 6/2008 | Tamura |
| 2008/0179311 A1 | 7/2008 | Koro et al. |
| 2008/0190914 A1 | 8/2008 | Gibson |
| 2008/0213449 A1 | 9/2008 | Wisner et al. |
| 2008/0251063 A1 | 10/2008 | Palena et al. |
| 2008/0272134 A1 | 11/2008 | Rohe |
| 2009/0049845 A1 | 2/2009 | Mcstravick |
| 2009/0058352 A1 | 3/2009 | Lin |
| 2009/0064687 A1 | 3/2009 | Tuszkiewicz |
| 2009/0071952 A1 | 3/2009 | Kuwabara |
| 2009/0078708 A1 | 3/2009 | Williams |
| 2009/0102296 A1 | 4/2009 | Greene et al. |
| 2009/0151891 A1 | 6/2009 | Li |
| 2009/0152276 A1 | 6/2009 | Groll |
| 2009/0158770 A1 | 6/2009 | Cohrs et al. |
| 2009/0166350 A1 | 7/2009 | Ho |
| 2009/0184102 A1 | 7/2009 | Parker, Jr. et al. |
| 2009/0200320 A1 | 8/2009 | Saito |
| 2009/0230117 A1 | 9/2009 | Fernando |
| 2009/0277187 A1 | 11/2009 | McGann |
| 2010/0000980 A1 | 1/2010 | Popescu |
| 2010/0028758 A1 | 2/2010 | Eaves |
| 2010/0064698 A1 | 3/2010 | Schabron |
| 2010/0089247 A1 | 4/2010 | Yang |
| 2010/0108694 A1 | 5/2010 | Sedlbauer et al. |
| 2010/0125417 A1 | 5/2010 | Hyde et al. |
| 2010/0145688 A1 | 6/2010 | Sung et al. |
| 2010/0147014 A1 | 6/2010 | Kim |
| 2010/0158489 A1 | 6/2010 | Siu et al. |
| 2010/0158660 A1 | 6/2010 | Radhakrishnan |
| 2010/0186499 A1 | 7/2010 | Ramus et al. |
| 2010/0251755 A1 | 10/2010 | Lauchnor |
| 2010/0299278 A1 | 11/2010 | Kriss |
| 2011/0041546 A1 | 2/2011 | Linder |
| 2011/0056215 A1 | 3/2011 | Ham et al. |
| 2011/0062149 A1 | 3/2011 | Driel et al. |
| 2011/0070474 A1 | 3/2011 | Lee et al. |
| 2011/0072978 A1 | 3/2011 | Popescu |
| 2011/0073603 A1 | 3/2011 | Saho et al. |
| 2011/0082437 A1* | 4/2011 | Stacey .................. F25D 15/00 604/404 |
| 2011/0108506 A1 | 5/2011 | Lindhorst-Ko |
| 2011/0121660 A1 | 5/2011 | Azancot et al. |

(56) References Cited

U.S. PATENT DOCUMENTS

| | | |
|---|---|---|
| 2011/0143000 A1 | 6/2011 | Fiset |
| 2011/0152979 A1 | 6/2011 | Driscoll et al. |
| 2011/0155621 A1 | 6/2011 | Lindquist et al. |
| 2011/0168729 A1 | 7/2011 | Koenig |
| 2011/0174993 A1 | 7/2011 | Blain |
| 2011/0179807 A1 | 7/2011 | Holloway |
| 2011/0180527 A1 | 7/2011 | Abbott |
| 2011/0198255 A1 | 8/2011 | Baumfalk et al. |
| 2011/0247356 A1 | 10/2011 | Krosse et al. |
| 2011/0259871 A1 | 10/2011 | Li |
| 2011/0265562 A1 | 11/2011 | Li |
| 2012/0061050 A1 | 3/2012 | Petrillo et al. |
| 2012/0064470 A1 | 3/2012 | Delattre et al. |
| 2012/0082766 A1 | 4/2012 | Maupin et al. |
| 2012/0090333 A1 | 4/2012 | DellaMorte et al. |
| 2012/0103562 A1 | 5/2012 | Alexander |
| 2012/0118874 A1 | 5/2012 | Williams et al. |
| 2012/0132646 A1 | 5/2012 | England et al. |
| 2012/0138597 A1 | 6/2012 | Quella et al. |
| 2012/0193999 A1 | 8/2012 | Zeine |
| 2012/0235505 A1 | 9/2012 | Schatz et al. |
| 2012/0235636 A1 | 9/2012 | Partovi |
| 2012/0248095 A1 | 10/2012 | Lee et al. |
| 2012/0248096 A1 | 10/2012 | Lee et al. |
| 2012/0255946 A1 | 10/2012 | Kim et al. |
| 2012/0256585 A1 | 10/2012 | Partovi et al. |
| 2012/0258229 A1 | 10/2012 | Mindrup |
| 2012/0285180 A1 | 11/2012 | Wilkinson |
| 2012/0312031 A1 | 12/2012 | Olsen |
| 2012/0319500 A1 | 12/2012 | Beart et al. |
| 2013/0059259 A1 | 3/2013 | Oldani |
| 2013/0103463 A1 | 4/2013 | Briar et al. |
| 2013/0167730 A1 | 7/2013 | Behm |
| 2013/0200064 A1 | 8/2013 | Alexander |
| 2013/0206015 A1 | 8/2013 | Jacoby et al. |
| 2013/0221013 A1 | 8/2013 | Kolowich et al. |
| 2013/0239607 A1 | 9/2013 | Kelly |
| 2013/0245991 A1 | 9/2013 | Kriss |
| 2013/0255306 A1 | 10/2013 | Mayer |
| 2013/0255824 A1 | 10/2013 | Williams |
| 2013/0273752 A1* | 10/2013 | Rudisill .............. H01R 13/6205 439/39 |
| 2013/0275075 A1 | 10/2013 | Johnson |
| 2014/0150464 A1 | 6/2014 | Bloedow |
| 2014/0165607 A1 | 6/2014 | Alexander |
| 2014/0230484 A1 | 8/2014 | Yavitz |
| 2014/0238985 A1 | 8/2014 | Sweeney et al. |
| 2014/0298492 A1 | 10/2014 | Simpson |
| 2014/0305927 A1 | 10/2014 | Alexander |
| 2014/0318153 A1 | 10/2014 | Ilercil |
| 2014/0340197 A1 | 11/2014 | Flood |
| 2014/0352329 A1 | 12/2014 | Bloedow et al. |
| 2015/0024349 A1 | 1/2015 | Bischoff |
| 2015/0122688 A1 | 5/2015 | Dias |
| 2015/0143823 A1 | 5/2015 | Slack et al. |
| 2015/0245723 A1 | 9/2015 | Alexander |
| 2015/0335184 A1 | 11/2015 | Balachandran |
| 2016/0164748 A1 | 6/2016 | Kim |
| 2016/0183730 A1 | 6/2016 | Bedi |
| 2016/0201018 A1 | 7/2016 | Watson |
| 2016/0202111 A1 | 7/2016 | Fahey |
| 2016/0214783 A1 | 7/2016 | Xie |
| 2016/0239801 A1 | 8/2016 | Burch et al. |
| 2016/0271015 A1 | 9/2016 | Wengreen et al. |
| 2016/0324338 A1 | 11/2016 | Brija |
| 2017/0042373 A1 | 2/2017 | Alexander et al. |
| 2017/0056289 A1 | 3/2017 | Tsuno |
| 2017/0059216 A1 | 3/2017 | Wiggins |
| 2017/0108261 A1 | 4/2017 | Broussard |
| 2017/0150840 A1 | 6/2017 | Park |
| 2017/0177883 A1 | 6/2017 | Paterra et al. |
| 2017/0180368 A1 | 6/2017 | Paterra |
| 2017/0193297 A1 | 7/2017 | Michini et al. |
| 2017/0259956 A1 | 9/2017 | Hori |
| 2017/0271570 A1 | 9/2017 | Marc |
| 2017/0290741 A1 | 10/2017 | Chou et al. |
| 2017/0314851 A1 | 11/2017 | Alexander et al. |
| 2017/0336134 A1 | 11/2017 | Williams |
| 2017/0356686 A1 | 12/2017 | Xue |
| 2017/0372260 A1 | 12/2017 | Desmarais et al. |
| 2018/0023865 A1 | 1/2018 | Llercil |
| 2018/0035625 A1 | 2/2018 | Lindbo |
| 2018/0036202 A1 | 2/2018 | Wengreen |
| 2018/0039940 A1 | 2/2018 | Varga |
| 2018/0061162 A1 | 3/2018 | High et al. |
| 2018/0075753 A1 | 3/2018 | Joao |
| 2018/0164034 A1 | 6/2018 | Banks |
| 2018/0165902 A1* | 6/2018 | Wilkinson .......... B65D 81/3813 |
| 2018/0175272 A1 | 6/2018 | Imai et al. |
| 2018/0225464 A1 | 8/2018 | Paterra |
| 2018/0235392 A1 | 8/2018 | Yuki |
| 2018/0266739 A1 | 9/2018 | Godbole |
| 2018/0320947 A1 | 11/2018 | Jain et al. |
| 2018/0325296 A1 | 11/2018 | Lavi |
| 2018/0333007 A1 | 11/2018 | Ganahl |
| 2018/0353379 A1 | 12/2018 | Chou et al. |
| 2018/0360264 A1 | 12/2018 | Alexander |
| 2019/0003757 A1 | 1/2019 | Miros |
| 2019/0003781 A1 | 1/2019 | Caniere et al. |
| 2019/0039811 A1 | 2/2019 | Kuhn et al. |
| 2019/0099027 A1 | 4/2019 | Jackson |
| 2019/0112119 A1* | 4/2019 | Alexander .......... A47J 36/2483 |
| 2019/0145688 A1 | 5/2019 | Tsuno |
| 2019/0223635 A1 | 7/2019 | Alexander |
| 2019/0242626 A1 | 8/2019 | Mesquite |
| 2019/0263219 A1 | 8/2019 | Spath |
| 2019/0277553 A1 | 9/2019 | Vlahinos |
| 2019/0303862 A1 | 10/2019 | Bollinger |
| 2019/0359411 A1 | 11/2019 | Fallgren |
| 2019/0373755 A1 | 12/2019 | Paterra |
| 2019/0390890 A1 | 12/2019 | Clayton et al. |
| 2020/0041197 A1 | 2/2020 | Kim |
| 2020/0045959 A1 | 2/2020 | Hoffmann et al. |
| 2020/0224964 A1 | 7/2020 | Alexander |
| 2020/0229645 A1 | 7/2020 | Karsten |
| 2020/0309442 A1 | 10/2020 | Scully, Jr. et al. |
| 2020/0333057 A1 | 10/2020 | Alexander et al. |
| 2020/0345180 A1 | 11/2020 | Alexander |
| 2020/0361690 A1 | 11/2020 | Sanders et al. |
| 2020/0367691 A1 | 11/2020 | Alexander et al. |
| 2020/0408452 A1 | 12/2020 | Alexander et al. |
| 2021/0025634 A1 | 1/2021 | Alexander et al. |
| 2021/0063062 A1 | 3/2021 | Alexander |
| 2021/0169740 A1 | 6/2021 | Janzen et al. |

FOREIGN PATENT DOCUMENTS

| | | |
|---|---|---|
| CN | 1338240 A | 3/2002 |
| CN | 1502513 A | 6/2004 |
| CN | 2708795 Y | 7/2005 |
| CN | 1748112 A | 3/2006 |
| CN | 1776992 A | 5/2006 |
| CN | 2922666 Y | 7/2007 |
| CN | 101069606 A | 11/2007 |
| CN | 101109795 A | 1/2008 |
| CN | 201042350 Y | 4/2008 |
| CN | 201076180 | 6/2008 |
| CN | 201308643 | 10/2008 |
| CN | 201237271 | 5/2009 |
| CN | 101507261 A | 8/2009 |
| CN | 201303850 Y | 9/2009 |
| CN | 201445353 U | 5/2010 |
| CN | 101820128 A | 9/2010 |
| CN | 201612420 U | 10/2010 |
| CN | 102164526 A | 8/2011 |
| CN | 102802294 | 5/2012 |
| CN | 102538037 A | 7/2012 |
| CN | 202681700 | 1/2013 |
| CN | 202919767 U | 5/2013 |
| CN | 102266184 B | 10/2013 |
| CN | 203468187 U | 3/2014 |
| CN | 105705890 A | 6/2016 |
| CN | 105814390 | 7/2016 |
| CN | 108224868 A | 6/2018 |

(56) References Cited

FOREIGN PATENT DOCUMENTS

| | | |
|---|---|---|
| CN | 108974637 A | 12/2018 |
| DE | 19744526 | 4/1999 |
| DE | 20108363 | 8/2001 |
| DE | 20314416 | 1/2004 |
| EP | 0332355 | 9/1989 |
| EP | 0722708 | 7/1996 |
| EP | 0895772 | 2/1999 |
| EP | 1 034 407 A1 | 9/2000 |
| EP | 1 701 313 A2 | 9/2006 |
| EP | 2022727 A1 | 2/2009 |
| EP | 2165243 | 3/2010 |
| EP | 2 273 250 A1 | 12/2011 |
| EP | 2001761 | 1/2012 |
| EP | 2308771 | 6/2012 |
| EP | 2852540 B1 | 7/2016 |
| EP | 3109574 A1 | 12/2016 |
| EP | 3295098 A2 | 3/2018 |
| EP | 3189944 B1 | 6/2018 |
| EP | 3 531 354 A1 | 8/2019 |
| EP | 3491301 B1 | 4/2020 |
| FR | 2737380 | 1/1997 |
| FR | 2752377 | 2/1998 |
| FR | 2763463 | 11/1998 |
| FR | 2828082 | 2/2003 |
| GB | 1311955 A | 3/1973 |
| GB | 2 304 179 A | 3/1997 |
| GB | 2390798 A | 1/2004 |
| GB | 2414922 A | 12/2005 |
| GB | 2441825 | 3/2008 |
| GB | 2513106 A | 10/2014 |
| IN | 02555CN2012 A | 5/2013 |
| JP | S54-147575 U | 4/1953 |
| JP | S63-249519 A | 10/1988 |
| JP | H01 164322 A | 6/1989 |
| JP | H04-201877 A | 4/1992 |
| JP | H05-306472 A | 11/1993 |
| JP | H06-021549 U | 3/1994 |
| JP | H10-146276 U | 6/1998 |
| JP | 11-268777 | 10/1999 |
| JP | 2000-279302 A | 10/2000 |
| JP | 2001-524657 A | 12/2001 |
| JP | 2003106728 A | 4/2002 |
| JP | 2002-516228 A | 6/2002 |
| JP | 3 302626 B2 | 7/2002 |
| JP | 2003-299255 A | 10/2003 |
| JP | 3102537 U | 7/2004 |
| JP | 2004-261493 A | 9/2004 |
| JP | 3594343 B2 | 11/2004 |
| JP | H 8142543 A | 11/2004 |
| JP | 2005-308353 A | 11/2005 |
| JP | 2006-068152 | 3/2006 |
| JP | 2006-102234 A | 4/2006 |
| JP | 2006-166522 A | 6/2006 |
| JP | 2006-345957 | 12/2006 |
| JP | 2007-064557 A | 3/2007 |
| JP | 2007-139328 A | 6/2007 |
| JP | 2007-260838 A | 10/2007 |
| JP | 2007-312932 | 12/2007 |
| JP | 2008-173464 A | 7/2008 |
| JP | 3153007 U | 7/2009 |
| JP | 2009-288234 A | 12/2009 |
| JP | 2010-527226 A | 8/2010 |
| JP | 2011-171205 | 9/2011 |
| JP | 2012-523085 A | 9/2012 |
| JP | 5127819 | 1/2013 |
| JP | 5481388 | 4/2014 |
| JP | 2017-122521 A | 7/2017 |
| JP | 2018-012510 A | 1/2018 |
| JP | 2018-512526 A | 5/2018 |
| JP | 2019-516944 A | 6/2019 |
| KR | 200 390 049 Y1 | 7/2005 |
| KR | 2010 0124932 A | 11/2010 |
| KR | 10-2015-0051074 A | 5/2015 |
| KR | 20220027144 A | 3/2022 |
| WO | WO 02/067737 A2 | 9/2002 |
| WO | WO 2003/073030 A1 | 9/2003 |
| WO | WO 2004/055654 A2 | 7/2004 |
| WO | WO 2008/028329 | 3/2008 |
| WO | WO 2008/065175 | 6/2008 |
| WO | WO 2008/137996 | 11/2008 |
| WO | WO 2008/155538 A2 | 12/2008 |
| WO | WO 2009/138930 | 11/2009 |
| WO | WO 2010/087560 A2 | 8/2010 |
| WO | WO 2010/087560 A3 | 8/2010 |
| WO | WO 2010/132627 A2 | 11/2010 |
| WO | WO 2011/131595 A2 | 10/2011 |
| WO | WO 2012/104665 | 8/2012 |
| WO | WO 2013/187763 A1 | 12/2013 |
| WO | WO 2014/158655 A2 | 10/2014 |
| WO | WO 2015/125790 A1 | 8/2015 |
| WO | WO 2016/166324 A1 | 10/2016 |
| WO | WO 2016/168523 A1 | 10/2016 |
| WO | WO 2016/193480 A1 | 12/2016 |
| WO | WO 2018/016238 A1 | 1/2018 |
| WO | WO 2018 197049 A1 | 11/2018 |
| WO | WO 2018/222645 A1 | 12/2018 |
| WO | WO 2019/204660 A1 | 10/2019 |
| WO | WO 2020/263710 A1 | 12/2020 |
| WO | WO 2021202147 A1 | 10/2021 |
| WO | WO 2022104318 A1 | 5/2022 |

OTHER PUBLICATIONS

Australian Examination Report regarding Application No. 2016216669, dated Feb. 14, 2019, four pages.
Chinese Office Action, regarding Application No. 201510869257.5, dated Aug. 30, 2018, 9 pages.
Decision of Rejection mailed on Apr. 4, 2017 in JP Application No. 2013-537797.
European Office Action dated Sep. 28, 2017, received in European Patent Application No. 14 774 350.4, pp. 5.
European Patent Office Search Report dated Mar. 17, 2016 regarding Application No. 11838764.6-1804, PCT/US2011059014, 7 pages.
European Search Report received in European Patent Application No. 15811173.2, dated Dec. 13, 2017.
First Office Action mailed on Nov. 23, 2016 in CN Application No. 201480014620.9.
International Preliminary Report on Patentability mailed on May 7, 2013 in PCT Application No. PCT/US2011/059014.
International Search Report and Written Opinion dated Aug. 12, 2020, received in International Patent Application No. PCT/US2020/012591, 9 pages.
International Search Report and Written Opinion dated Jul. 9, 2019, received in International Patent Application No. PCT/US2019/028198.
International Search Report and Written Opinion mailed on Jan. 12, 2016 in PCT Application No. PCT/US15/36304.
International Search Report and Written Opinion mailed on Dec. 9, 2014 in PCT/US2014/019130.
International Search Report and Written Opinion mailed on Jul. 12, 2017, in PCT Application No. PCT/US2017/031534.
International Search Report and Written Opinion mailed on Mar. 16, 2012 in PCT/US2011/059014.
International Search Report and Written Opinion received in International Patent Application No. PCT/US2020/038765, dated Nov. 23, 2020, 33 pages.
Invitation to Pay Additional Fees dated Aug. 28, 2020 received in International Patent Application No. PCT/US2020/038765, 18 pages.
Invitation to Pay Additional Fees dated May 7, 2020, received in International Patent Application No. PCT/US2020/012591.
Non-final Office Action mailed on Nov. 14, 2016 in U.S. Appl. No. 15/050,714.
Non-final office action mailed on Aug. 2, 2016 in Japanese Patent Application No. 2013-537797.
Notice of Reason(s) for Rejection mailed on Aug. 11, 2015 in JP Application No. 2013-53797.
Office Action dated Aug. 7, 2018, received for Japanese Patent Application No. JP 2017-151497, 4 pages.

(56) References Cited

OTHER PUBLICATIONS

Office Action dated Jan. 12, 2018, received in Chinese Application No. 201510869257.5.
Office Action from United States Patent and Trademark Office regarding U.S. Appl. No. 16/908,519, dated Apr. 2, 2021, 16 pages.
Office Action from United States Patent and Trademark Office regarding U.S. Appl. No. 17/071,860, dated Apr. 5, 2021, 16 pages.
Office Action in related Chinese Application No. 201180063844.5, mailed Dec. 29, 2014.
Office Action mailed Sep. 4, 2018 regarding Japan Patent Application No. 2017-554610, 10 pages.
Office Action received in Japanese Patent Application No. 2017-151497, dated Nov. 21, 2017, 5 pages.
Patent Examination Report No. 1 in related Australian Application No. 2011323416, mailed May 15, 2015.
Patent Examination Report No. 2 in related Australian Application No. 2011323416, mailed on Oct. 20, 2015.
PCT International Search Report and Written Opinion dated Sep. 14, 2017 regarding International Application No. PCT/US2017/034081, 15 pages.
PCT International Search Report and Written Opinion mailed on Aug. 17, 2017 in PCT Application No. PCT/US2017/032020.
PCT International Search Reportr and Written Opinion, regarding International Application No. PCT/US2021/072239, mailed Mar. 1, 2022, 17 pages.
Second Office Action mailed on Apr. 10, 2017 in CN Application No. 201510869257.5.
Supplementary European Search Report mailed on Oct. 18, 2016 in European Patent Application No. 14 77 4350.
Apr. 1, 2025—(CN) First Office Action—App. No. 202080053623.9.

\* cited by examiner

PORTABLE COOLER

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57 and should be considered a part of this specification. This application is a continuation of U.S. application Ser. No. 17/514,690, filed on Oct. 29, 2021, now U.S. Pat. No. 11,668,508; which is a continuation-in-part of U.S. application Ser. No. 17/094,098, filed on Nov. 10, 2020, now U.S. Pat. No. 11,162,716; which is a continuation-in-part of U.S. application Ser. No. 16/908,519, filed on Jun. 22, 2020, now U.S. Pat. No. 11,365,926; which claims priority to and the benefit of U.S. Provisional Application No. 62/970,029, filed on Feb. 4, 2020; and U.S. Provisional Application No. 62/955,696, filed on Dec. 31, 2019; and U.S. Provisional Application No. 62/887,453, filed on Aug. 15, 2019; and U.S. Provisional Application No. 62/866,398, filed on Jun. 25, 2019. The contents of the aforementioned applications are incorporated herein by reference in their entirety.

BACKGROUND OF THE INVENTION

Field of the Invention

The invention is directed to a portable cooler, and more particularly to a stackable portable cooler.

Description of the Related Art

Portable coolers are used to store products (e.g., liquids, beverages, medicine, organs, food, etc.) in a cooled state. Some are Styrofoam containers that are often filled with ice to keep the product in a cooled state. However, the ice eventually melts, soaking the products and requiring the emptying of the liquid. Such coolers can also leak during transport, which is undesirable. Additionally, such coolers are undesirable for transporting goods across long distances due to their inability to maintain the product in a cooled state, the melting of ice and/or possible leaking of liquid from the cooler. Therefore, such coolers are undesirable for use with temperature sensitive products (e.g., food, medicine, organ transplants, perishable material, etc.). This can result in the non-usability of the products in the cooler. For example, once potency of medicine (e.g., a vaccine) is lost, it cannot be restored, rendering the medicine ineffective and/or unusable. Another drawback of existing containers is that they are single-use containers that end up in the landfills after a single use.

SUMMARY

Accordingly, there is a need for improved portable cooler designs (e.g., for transporting medicine, such as vaccines, insulin, epinephrine, vials, cartridges, injector pens, organ transplants, food, other perishable solid or liquid material, etc.) that can maintain the contents of the cooler at a desired temperature or temperature range. Additionally, there is a need for an improved portable cooler design.

In accordance with one aspect of the disclosure, an improved portable cooler is provided. The cooler can optionally have a vacuum-insulated double wall chamber that can be sealed with a lid (e.g., with a vacuum-insulated lid). This allows the temperature in the chamber to be maintained (e.g., be maintained substantially constant) for a prolonged period of time (e.g., 2 days, 1 day, 12 hours, 8 hours, 6 hours, etc.). Optionally, the chamber can hold perishable contents (e.g., medicine, food, other perishables, etc.) therein and a phase change material (e.g., one or more ice packs, a phase change material sleeve) in thermal communication (e.g., thermal contact) with the perishable contents. Optionally, the cooler has an insulated outer housing (e.g., made of foam, such as lightweight foam).

Optionally, the container can have a cooling fan and one or more air intake openings. The cooling fan is operable to cool the chamber and/or the phase change material in the chamber.

Optionally, the container has one or more sensors that sense a temperature of the chamber and/or contents in the chamber and communicate the information with circuitry. Optionally, the sensed temperature information is communicated (e.g., wirelessly, via a port on the container, such as a USB port) with an electronic device (e.g., a smartphone, a cloud server, a remote laptop or desktop computer, a USB drive).

Optionally, the container has an electronic screen (e.g., digital screen) that can illustrate one or more of a) the temperature sensed by the temperature sensors in the chamber, b) the name of the addressee and/or shipping/delivery address of the container and/or c) the name of the sender and/or shipper/sender address.

Optionally, the container has a user interface (e.g., a button) that can actuated by a user to one or more of: a) change the name of the addressee and/or shipping/delivery address of the container and/or b) automatically contact a package delivery service (e.g., FedEx, DHL) to request a pick-up of the container.

In accordance with another aspect of the disclosure, a portable cooler container with active temperature control system is provided. The active temperature control system is operated to heat or cool a chamber of a vessel to approach a temperature set point suitable for the contents in the cooler container.

In accordance with another aspect of the disclosure, a stackable portable cooler is provided that allows power transfer between the stacked coolers to charge and/or power the cooling system in the stacked coolers.

In accordance with another aspect of the disclosure, a stackable portable cooler is provided that allows for removal of heat from each of the stacked coolers without having an upper cooler impede the cooling function of a lower cooler in the stack.

In accordance with another aspect of the disclosure, a stackable portable cooler container with active temperature control is provided. The container comprises a container body having a chamber defined by a base and an inner peripheral wall of the container body. The container also comprises a temperature control system comprising one or more thermoelectric elements configured to actively heat or cool at least a portion of the chamber, and circuitry configured to control an operation of the one or more thermoelectric elements to heat or cool at least a portion of the chamber to a predetermined temperature or temperature range.

Optionally, the container can include one or more batteries configured to provide power to one or both of the circuitry and the one or more thermoelectric elements.

Optionally, the circuitry is further configured to wirelessly communicate with a cloud-based data storage system and/or a remote electronic device.

In accordance with another aspect of the disclosure, a portable cooler container with active temperature control is provided. A display screen is disposed on a surface of the container body, the display screen configured to selectively display shipping information for the portable cooler container using electronic ink. The display screen is operable to automatically change a shipping address displayed to a different address (e.g., a sender's address for return of the portable cooler to the sender). Optionally, actuation of the display screen to display a shipping address (e.g., a delivery address, a sender's address when the portable cooler is to be returned to the sender), electronics in the cooler wirelessly communicate a signal to a shipping carrier informing the shipping carrier that a shipping label has been assigned to the portable cooler and that the cooler is ready for pick-up and shipping.

In accordance with another aspect of the disclosure, a portable cooler container system is provided. The cooler container system comprises a container body having a chamber configured to receive one or more perishable goods. A sleeve is disposed about the chamber and housing a phase change material or thermal mass. A conduit extends through the sleeve, an outer surface of the conduit in thermal communication with the phase change material or thermal mass. A lid is hingedly coupleable or removably coupleable to the container body to access the chamber. The cooler container system also comprises a temperature control system. The temperature control system comprises a cold side heat sink in thermal communication with at least a portion of the conduit, a hot side heat sink, and a thermoelectric module interposed between and in thermal communication with the cold side heat sink and hot side heat sink. A pump is operable to flow a fluid relative to the cold side heat sink to cool the fluid and to flow the cooled fluid through the conduit in the sleeve to cool the phase change material or thermal mass so that the phase change material or thermal mass is configured to cool at least a portion of the chamber. Circuitry is configured to control an operation of one or both of the thermoelectric module and the pump.

In accordance with another aspect of the disclosure, a portable cooler container system is provided. The cooler container system comprises a container body having a chamber configured to receive one or more temperature sensitive products. A sleeve is disposed about the chamber and housing a phase change material or thermal mass. A conduit extends through the sleeve, an outer surface of the conduit in thermal communication with the phase change material or thermal mass. A lid is hingedly coupleable or removably coupleable to the container body to access the chamber. The cooler container system also comprises a temperature control system. The temperature control system comprises a cold side heat sink in thermal communication with at least a portion of the conduit, a hot side heat sink, and a thermoelectric module interposed between and in thermal communication with the cold side heat sink and hot side heat sink. A pump is operable to flow a fluid relative to the cold side heat sink to cool the fluid and to flow the cooled fluid through the conduit in the sleeve to cool the phase change material or thermal mass so that the phase change material or thermal mass is configured to cool at least a portion of the chamber. Circuitry is configured to control an operation of one or more of the thermoelectric module, fan and pump. An electrophoretic ink display screen configured to selectively display shipping information for the portable cooler container.

In accordance with another aspect of the disclosure, a portable cooler container system is provided. The system comprises a double-walled vacuum-insulated container body having a chamber configured to receive and hold one or more perishable goods. The system also comprises a lid hingedly coupleable or removably coupleable to the container body to access the chamber. The system also comprises an electronic system comprising one or more batteries and circuitry configured to wirelessly communicate via a cell radio with a cloud-based data storage system or a remote electronic device. A display screen on one of the lid and the container body is configured to selectively display an electronic shipping label for the portable cooler container.

In accordance with another aspect of the disclosure, a portable cooler container system is provided. The system comprises an insulated container body having a payload chamber configured to receive one or more temperature sensitive or perishable goods, a lid hingedly coupleable or removably coupleable to the container body to access the chamber, and an electronic system of the container body. The electronic system comprises one or more power storage elements, one or more sensors for sensing one or more parameters of the cooler container, circuitry configured to communicate the sensed parameter information with a remote electronic device, and an electrical connector unit on an outer surface of the cooler container via which power is transferred to the cooler container and via which sensed parameter information is transferred from the cooler container when the cooler container is placed against a power and data transfer unit.

In accordance with another aspect of the disclosure, a portable cooler container system is provided. The system comprises an insulated container body having a payload chamber configured to receive one or more temperature sensitive or perishable products, a sleeve disposed about the payload chamber and housing a phase change material or thermal mass, a conduit extending through the sleeve, an outer surface of the conduit in thermal communication with the phase change material or thermal mass, a lid hingedly coupleable or removably coupleable to the container body to access the payload chamber, and a temperature control system. The temperature control system comprises a cold side heat sink in thermal communication with at least a portion of the conduit, a hot side heat sink, a thermoelectric module interposed between and in thermal communication with the cold side heat sink and hot side heat sink, and a pump operable to flow a fluid relative to the cold side heat sink to cool the fluid and to flow the cooled fluid through the conduit in the sleeve to cool the phase change material or thermal mass so that the phase change material or thermal mass is configured to cool at least a portion of the payload chamber. The portable cooler container system also comprises an electronic system. The electronic system comprises one or more power storage elements, one or more sensors for sensing one or more parameters of the cooler container, circuitry configured to communicate the sensed parameter information with a remote electronic device and to control an operation of one or both of the thermoelectric module and the pump, and an electrical connector unit on an outer surface of the cooler container via which power is transferred to the cooler container and via which sensed parameter information is transferred from the cooler container when the cooler container is placed against a power and data transfer unit.

In accordance with another aspect of the disclosure, a power and data transfer unit for a portable cooler container system is provided. The power and data transfer unit comprises a wall or tower having one or more surfaces configured to face one or more cooler containers placed against the one or more surfaces. The power and data transfer unit also comprises a plurality of electrical connector interfaces on the one or more surfaces, each of the electrical connector interfaces configured to interface with an electrical connector unit of a cooler container placed proximate to the electrical connector interface. The power and data transfer unit also comprises one or more magnets proximate each of the plurality of electrical connector interfaces on the one or more surfaces, the one or more magnets configured to exert a magnetic force on a metal or magnetic surface of the cooler containers to align the electrical connector unit of each cooler container with a corresponding electrical connector interface. The power and data transfer unit also comprises an electronic system. The electronic system comprises a controller with circuitry in communication with the plurality of electrical connector interfaces, one or more power sources in communication with the controller, and a data communication module in communication with the controller. The controller is configured to control delivery of power to the cooler containers and configured to control retrieval of sensed parameter information or data from the cooler containers, the circuitry configured to communicate the sensed parameter information or data to a remote electronic device or cloud-based data storage system.

DETAILED DESCRIPTION

FIGS. 1-23 illustrate a cooler container assembly 1000 (the "assembly"), or components thereof. Though the features below are described in connection with the cooler container assembly 1000, the features also apply to all cooler containers, such as cooler containers 1000', 1000", 1000'" disclosed herein. The assembly 1000 can include a container vessel 100, a frame 300 coupled to the container vessel 100, and a lid 400 removably coupleable to a top end T of the container vessel 100. Optionally, the lid 400 can be a double-walled vacuum lid.

Figure 16:
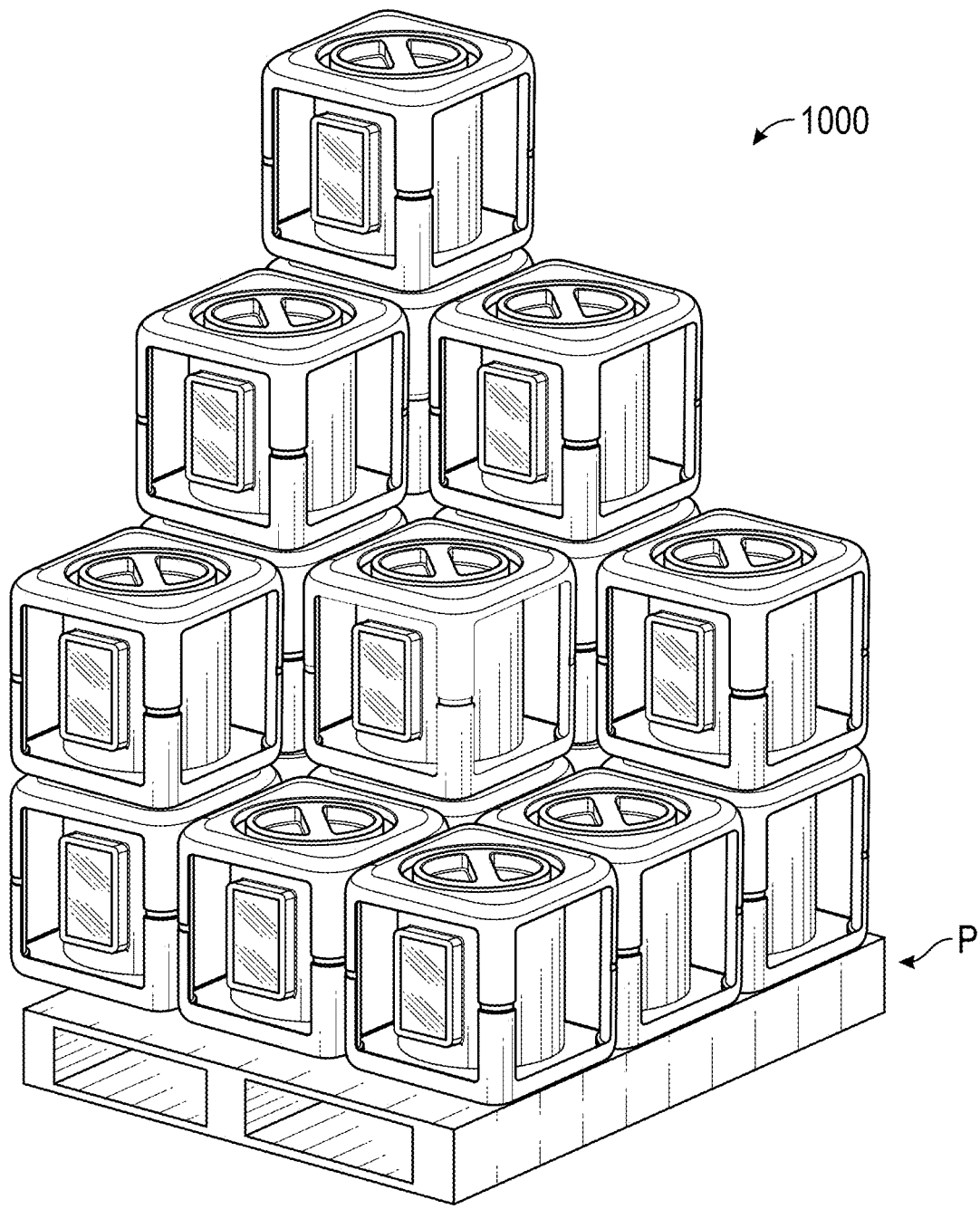
FIG. 16 is a schematic view showing multiple cooler containers stacked on a pallet.
Figure 17:
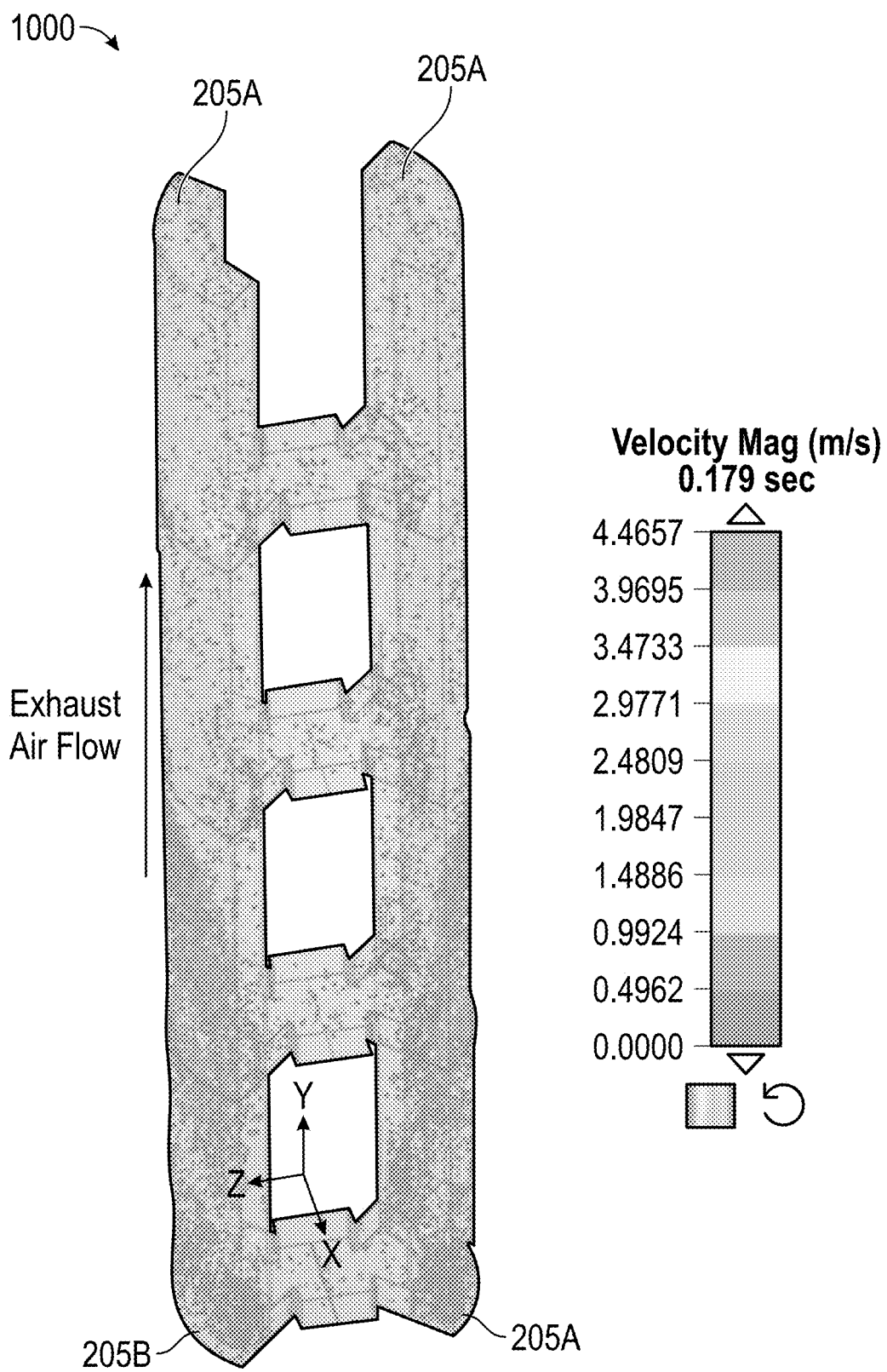
FIG. 17 shows a schematic illustration of stacked cooler containers.

In one implementation, the frame 300 can have a rectangular shape (e.g., a square shape) with two or more (e.g., four) pillars 301. However, in other implementations, the frame 300 can have other suitable shapes (e.g., cylindrical). The frame 300 optionally defines one or more openings or open spaces 302 between the frame 300 and the container vessel 100, allowing air to pass or flow through said openings or spaces 302 (e.g., even when multiple cooler container assemblies 1000 are stacked on top of and beside each other, as shown in FIG. 16).

Figure 1:
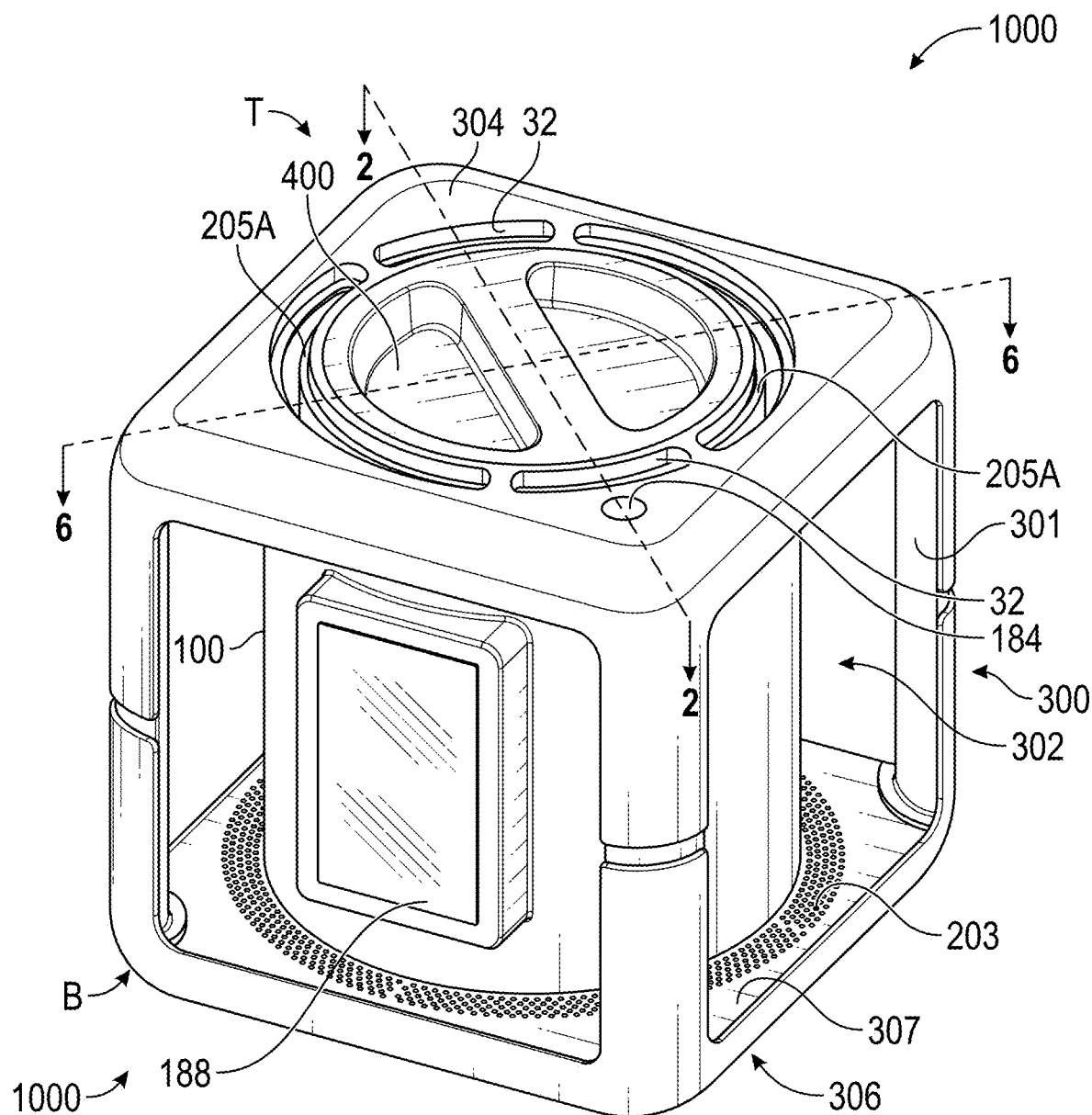
FIG. 1 is perspective front and top view of a cooler container.

A lower surface 307 of the frame 300 can have one or more air intake openings 203 (e.g., an intake grill). As shown in FIG. 1, the air intake openings 203 can be arranged around at least a portion of (e.g., around an entirety of) the periphery of the container vessel 100.

An upper surface 304 of the frame 300 can have one or more distal vent openings 205A. FIG. 1 shows two distal vent openings 205A, though more or fewer openings 205A can be provided in other implementations. The exhaust vent opening(s) 205A can optionally have a curved shape (e.g., semicircular shape). The upper surface 304 of the frame 300 can have one or more electrical contacts 32 (e.g., contact pads, curved contacts). Optionally, the electrical contacts 32 can be recessed relative to the upper surface 304. In the implementation shown in FIG. 1, the frame 300 has two distal vent openings 205A disposed near opposite corners of the frame 300, and two electrical contacts 32 disposed near opposite corners of the frame 300, each electrical contact 32 interposed between the two distal vent openings 205A along a plane that defines the upper surface 304.

The frame 300 has a bottom surface (e.g., underside surface) 306 that also has one or more proximal vent openings 205B (see FIG. 6) that fluidly communicate with the distal vent opening(s) 205A. The bottom surface 306 also has one or more electrical contacts 34 (see FIG. 5). Optionally, the electrical contacts 34 (e.g., pin contacts, Pogo pins, contact pads) can protrude from the bottom surface 306. Advantageously, when the cooler container assemblies 1000 are stacked (in a column), the electrical contacts 34 on the bottom surface 306 of one frame 300 will contact the electrical contacts 32 on the top surface 304 of an adjacent frame 300 to thereby provide an electrical connection between the adjacent cooler container assemblies 1000. Similarly, when stacked, the proximal vent openings 205B on the bottom surface 306 of one frame with substantially align with distal vent openings 205A of an adjacent frame 300 to thereby provide fluid communication (e.g., a flow path, a chimney path) between the adjacent cooler container assemblies 1000 (see FIG. 17).

Figure 15:
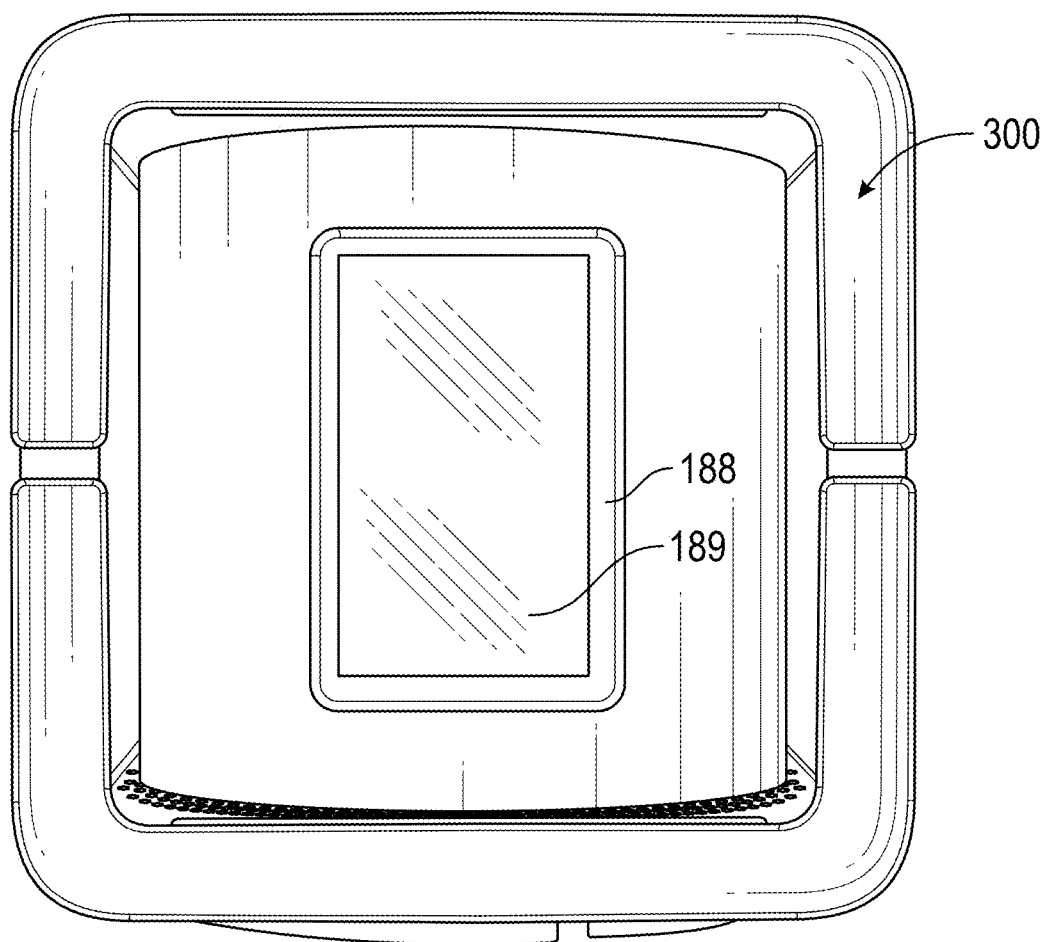
FIG. 15 is a front view of a cooler container showing the display on a surface of the container.

With continued reference to FIG. 1, the cooler container assembly 1000 also includes a display screen 188. Though FIG. 1 shows the display screen 188 on the container vessel 100, it can alternatively (or additionally) be incorporated into the frame 300 and/or lid 400. The display screen 188 can optionally be an electronic ink or E-ink display (e.g., electrophoretic ink display). In another implementation, the display screen 188 can be a digital display (e.g., liquid crystal display or LCD, light emitting diode or LED, etc.). Optionally, the display screen 188 can display a label 189, as shown in FIG. 15, (e.g., a shipping label with one or more of an address of sender, an address of recipient, a Maxi Code machine readable symbol, a QR code, a routing code, a barcode, and a tracking number), but can optionally additionally or alternatively display other information (e.g., temperature history information, information on the contents of the container vessel 100). In another implementation, the display screen 188 can display an advertisement (e.g., for one or more of the payload components, for example, read by an RFID reader of the container 1000, 1000', 1000", 1000'"), as further discussed herein.

The cooler container assembly 1000 can optionally also include a user interface 184. In FIG. 1, the user interface 184 is on the upper surface 304 of the frame 300. In another implementation, the user interface 184 is disposed on the container vessel 100 and/or lid 400. The user interface 184 is optionally a button (e.g., a "return home" button). In one implementation, the user interface 184 is a depressible button. In another implementation, the user interface 184 is a capacitive sensor (e.g., touch sensitive sensor, touch sensitive switch). In another implementation, the user interface 184 is a sliding switch (e.g., sliding lever). In another implementation, the user interface 184 is a rotatable dial. In still another implementation, the user interface 184 can be a touch screen portion (e.g., separate from or incorporated as part of the display screen 188). Advantageously, actuation of the user interface 184 can alter the information shown on the display 188, such as the form of a shipping label shown on an E-ink display 188. For example, actuation of the user interface 184, can switch the text associated with the sender and receiver, allowing the cooler container assembly 1000 to be shipped back to the sender once the receiving party is done with it. Additionally or alternatively, actuation of the user interface 184 causes a signal to be sent by circuitry in the assembly 1000, as further discussed below, to a shipping carrier (e.g., UPS, FedEx, DHL) informing the shipping carrier that a shipping label (e.g., new shipping label) has been assigned to the portable cooler and that the cooler is ready for pick-up and shipping.

Figure 2:
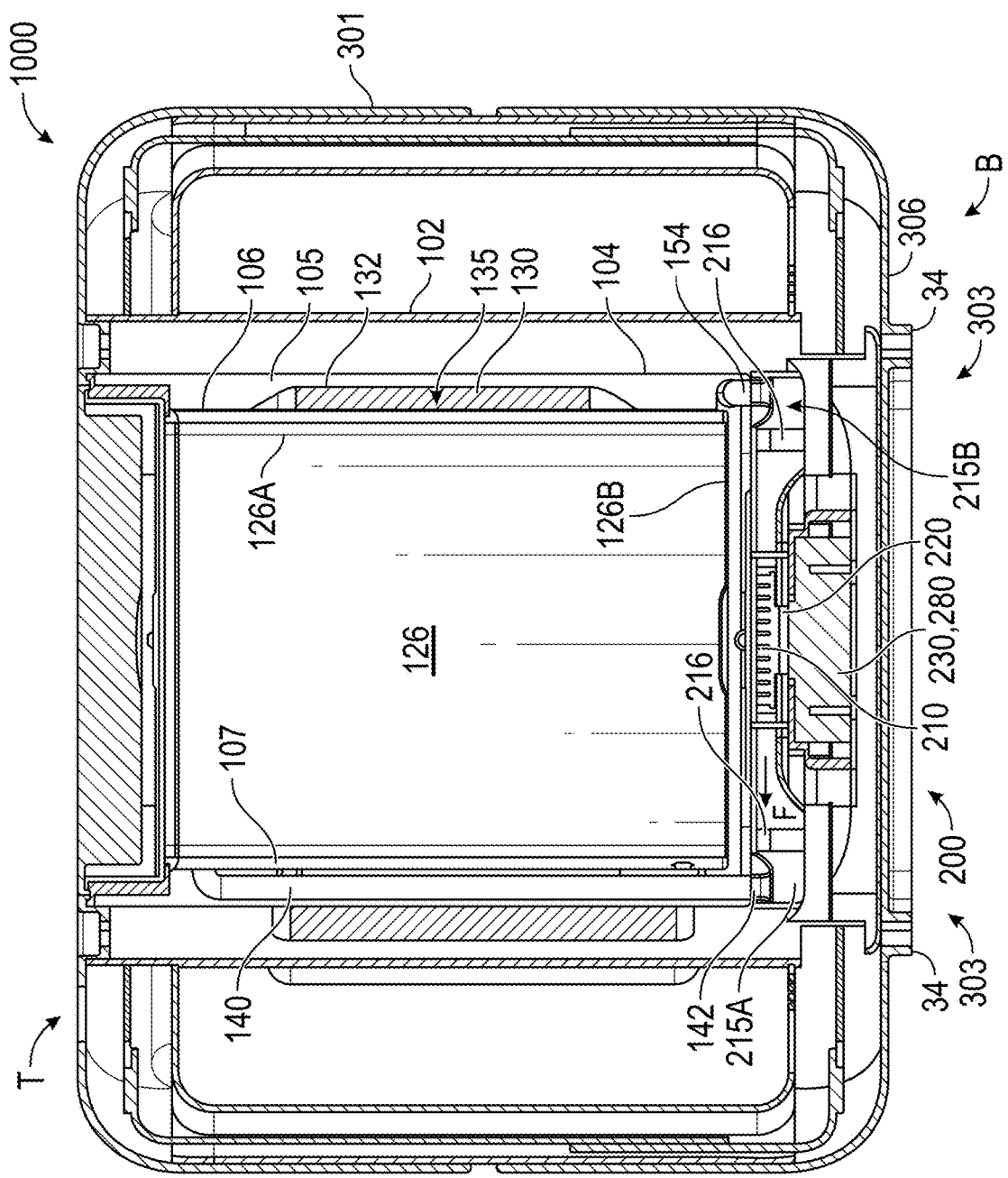
FIG. 2 is a cross-sectional view of the cooler container in FIG. 1 along line 2-2.
Figure 4:
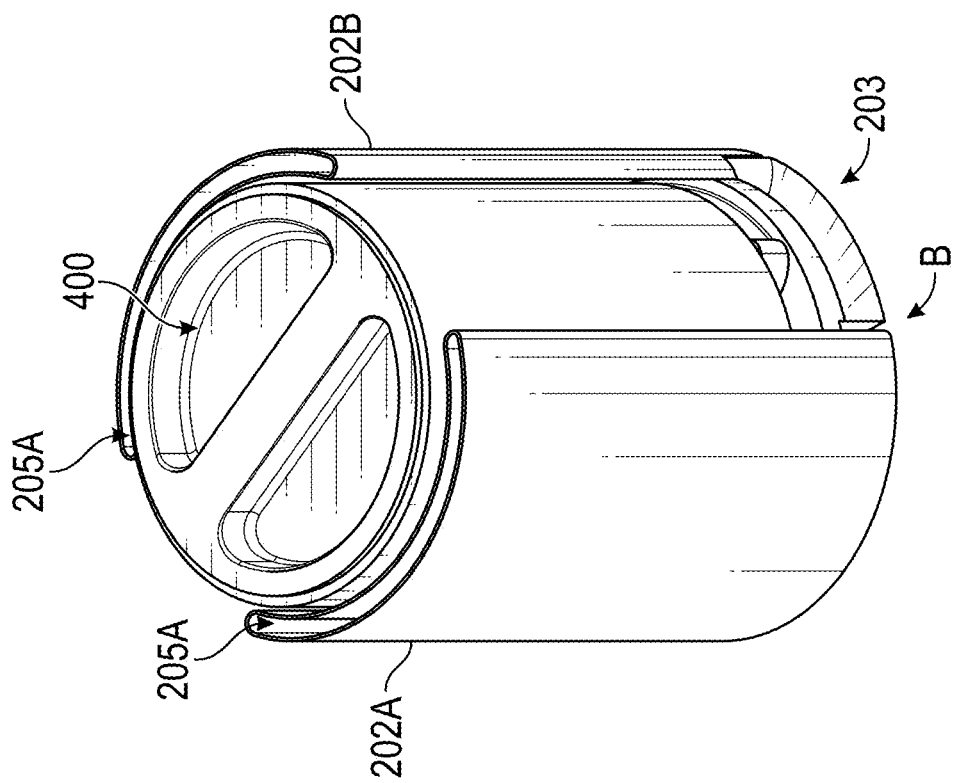
FIG. 4 is a partially assembled view of the cooler container of FIG. 1, excluding the frame and outer vessel wall.
Figure 3:
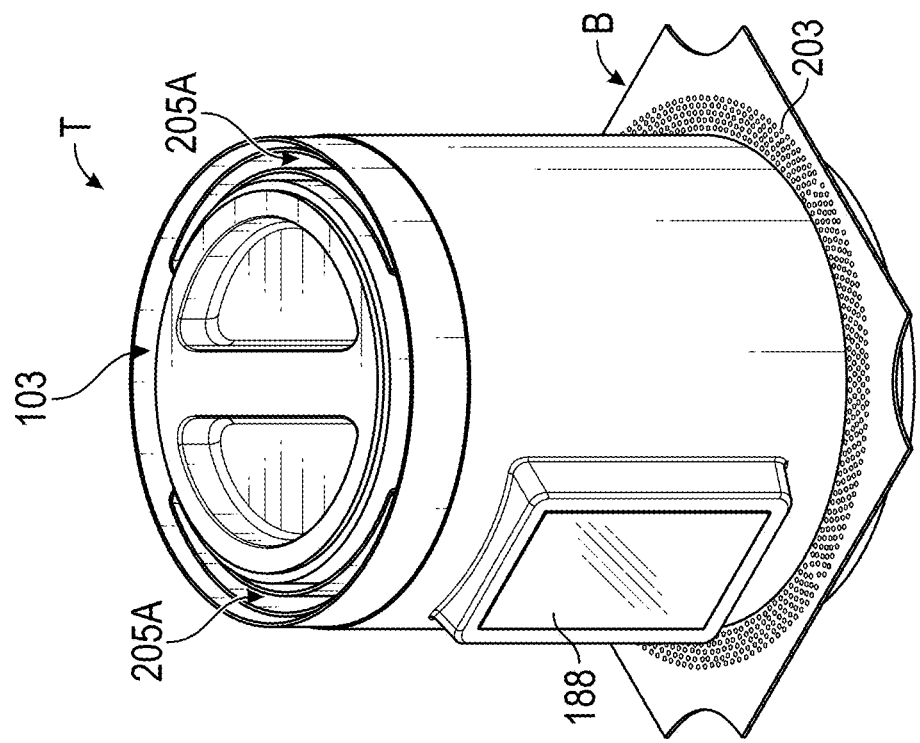
FIG. 3 is a partially assembled view of the cooler container of FIG. 1, excluding the frame.

FIG. 2 shows a cross-sectional view of the cooler container assembly 1000 along line 2-2 in FIG. 1. The assembly 100 can optionally have one or more feet 303 that protrude from the bottom surface 306 can facilitate the positioning and/or interlocking of one assembly 1000 on top of another assembly 1000 when stacking them together. The container vessel 100 can have a chamber 126 defined by an inner wall 126A and a base wall 126B and sized to removably hold one or more materials or products to be cooled (e.g., solids, liquids, food, beverages, medicines, living organisms or tissue). The chamber 126 can in one implementation be cylindrical.

The assembly 1000 also includes a cooling system 200. The cooling system 200 can optionally be at least partially housed in the vessel container 100. In one implementation, the cooling system 200 can be housed below the chamber 126 (e.g., in one or more cavities between the base wall 126B and the bottom end B of the cooler container assembly 1000). The cooling system 200 can include a first heat sink 210 (e.g., a cold side heat sink), one or more thermoelectric modules or TEC (e.g., Peltier elements) 220, and a second heat sink 230 (e.g., a hot side heat sink). The one or more thermoelectric modules (e.g., Peltier elements) 220 can be interposed between (e.g., in thermal communication with, in thermal contact with, in direct contact with) the first heat sink 210 and the second heat sink 230.

The cooling system 200 can optionally include a fan 280 in fluid communication with the second heat sink 230, the fan 280 selectively operable to flow air past the second heat sink 230 to effect heat transfer from the second heat sink 230 (e.g., to remove heat from the hot side heat sink 230). The cooling system 200 can include one or more fans 216 in fluid communication with the first heat sink 210, the fan(s) 216 selectively operable to flow air past the first heat sink 210 to effect heat transfer with the first heat sink 210 (e.g., to allow the cold side heat sink 210 to remove heat from the air flowing past the heat sink 210). In the implementation shown in FIGS. 2 and 5, two fans 216A, 216B are in fluid communication with the first heat sink 210. In one example, the fans 216A, 216B are operable to flow air in the same direction. However, more or fewer fans 216 can be utilized, and can operate in series or parallel to provide air flow. In one example, the fans 216A, 216B are axial fans. In another example, the fans 216A, 216B can be centrifugal fans or radial fans. Other types of fans can be used. As further discussed below the cooling system 200 can flow (e.g., circulate) cooled air cooled by the first heat sink 210 into a channel 107 defined between the inner wall 126A and a second wall 106 (e.g., inner liner wall), the cooled air cooling the inner wall 126A and thereby cooling the chamber 126 and the contents in the chamber 126.

Figure 6:
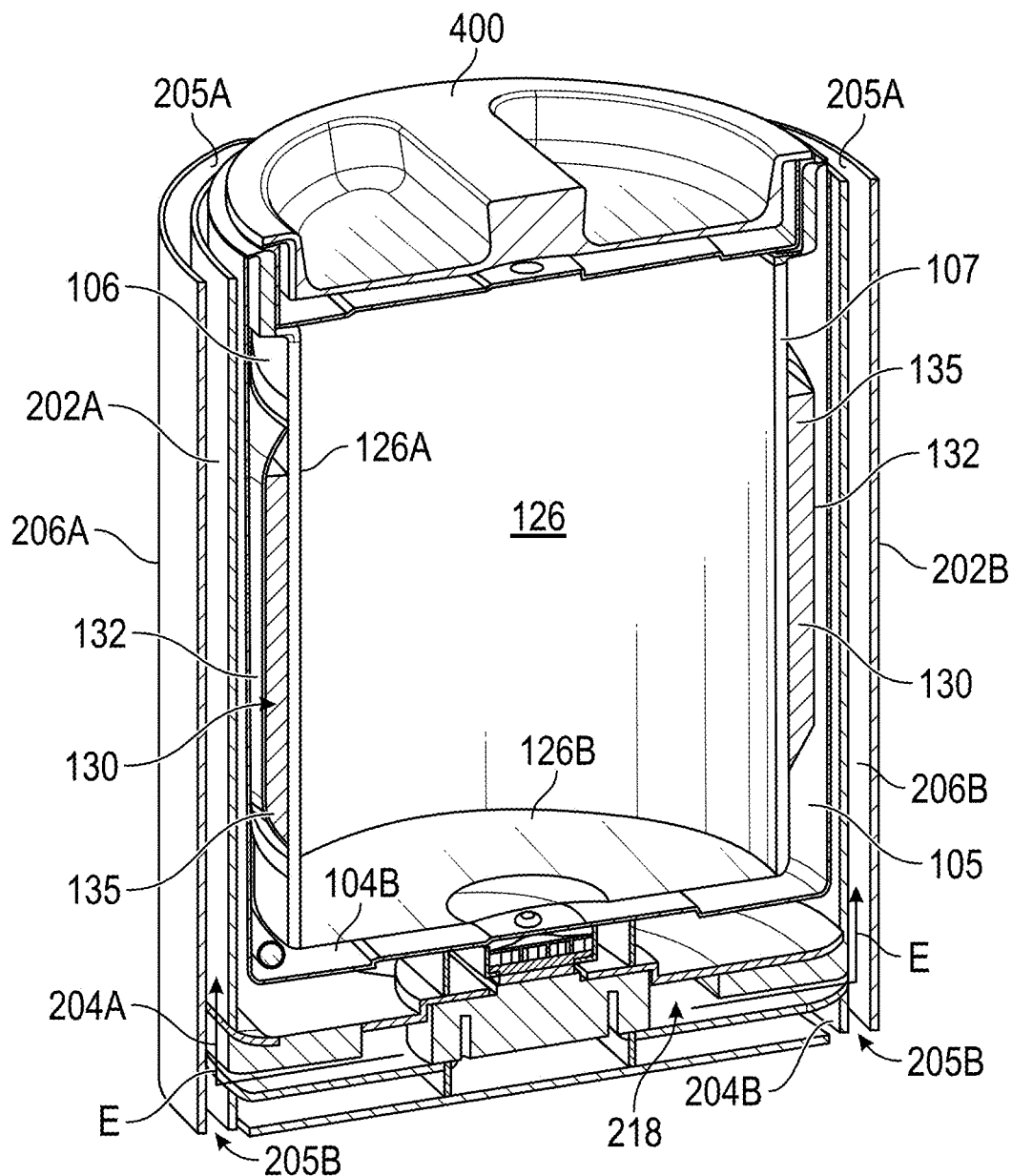
FIG. 6 is a cross-sectional view of the partial assembly in FIG. 4 along line 6-6 in FIG. 1.
Figure 7:
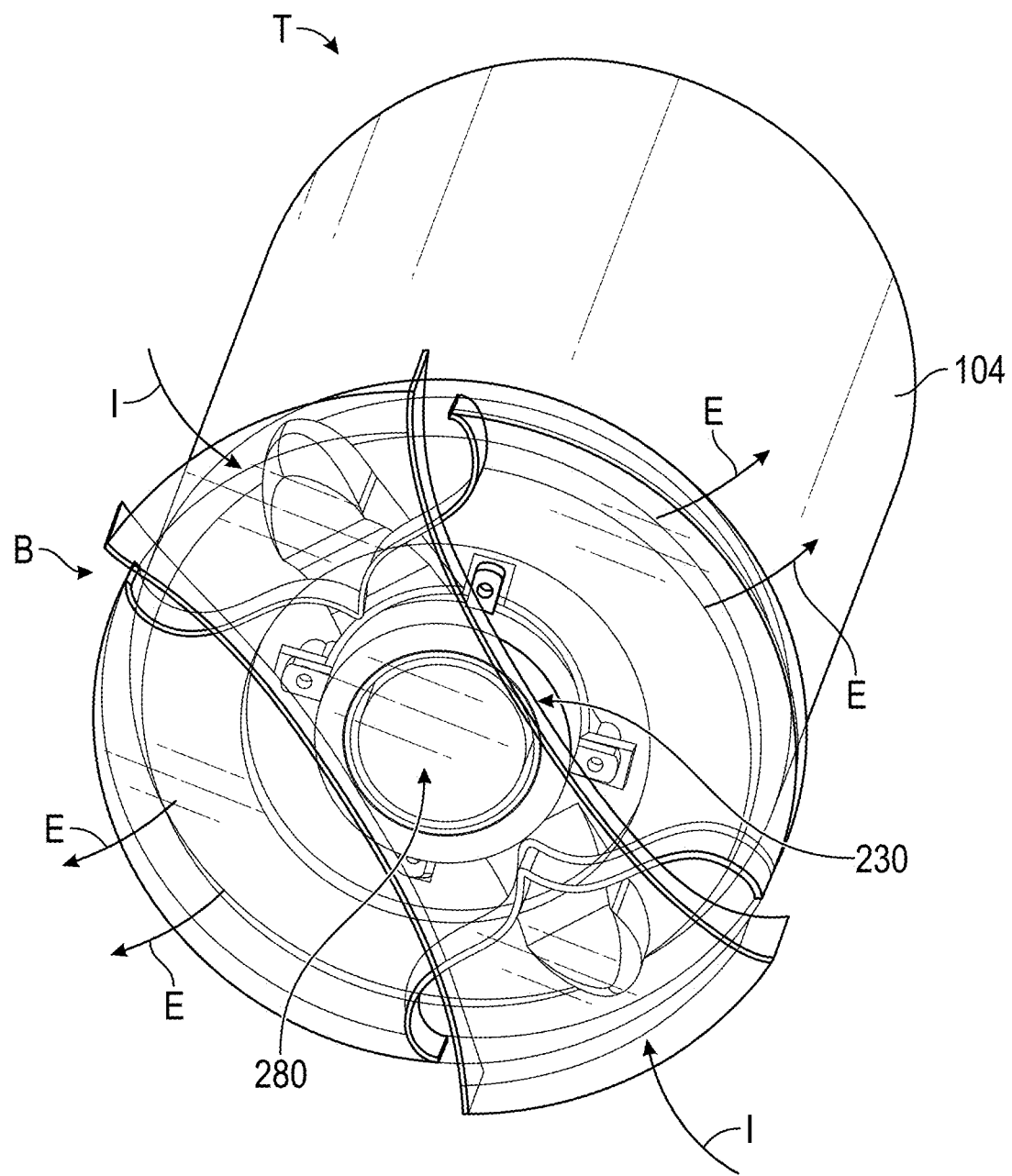
FIG. 7 is a perspective bottom view of a partial assembly of the cooler container of FIG. 1, excluding the frame and outer vessel wall.
Figure 8:
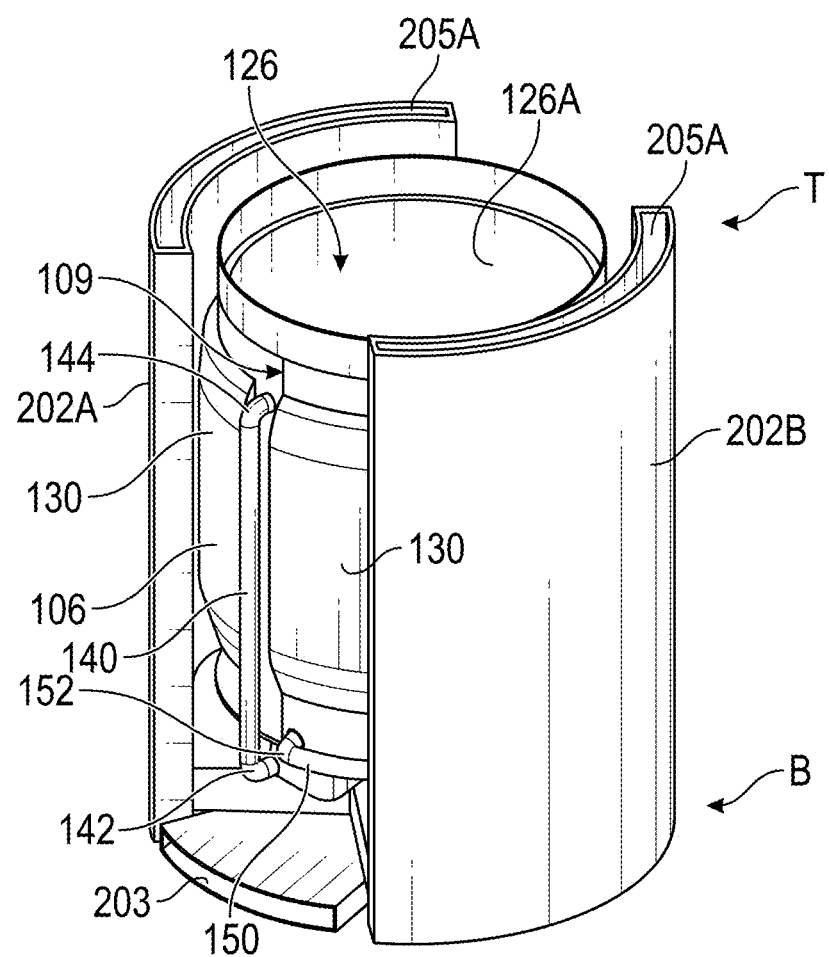
FIG. 8 is a perspective view of a partial assembly of the cooler container of FIG. 1, excluding the frame and outer vessel wall.
Figure 9:
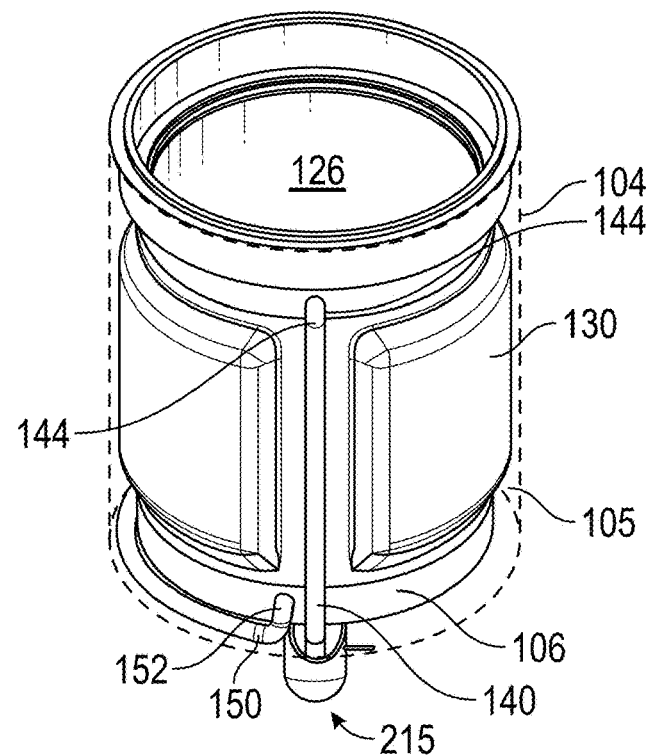
FIG. 9 is a perspective view of a partial assembly of the cooler container of FIG. 1, excluding the frame and outer vessel wall.
Figure 10:
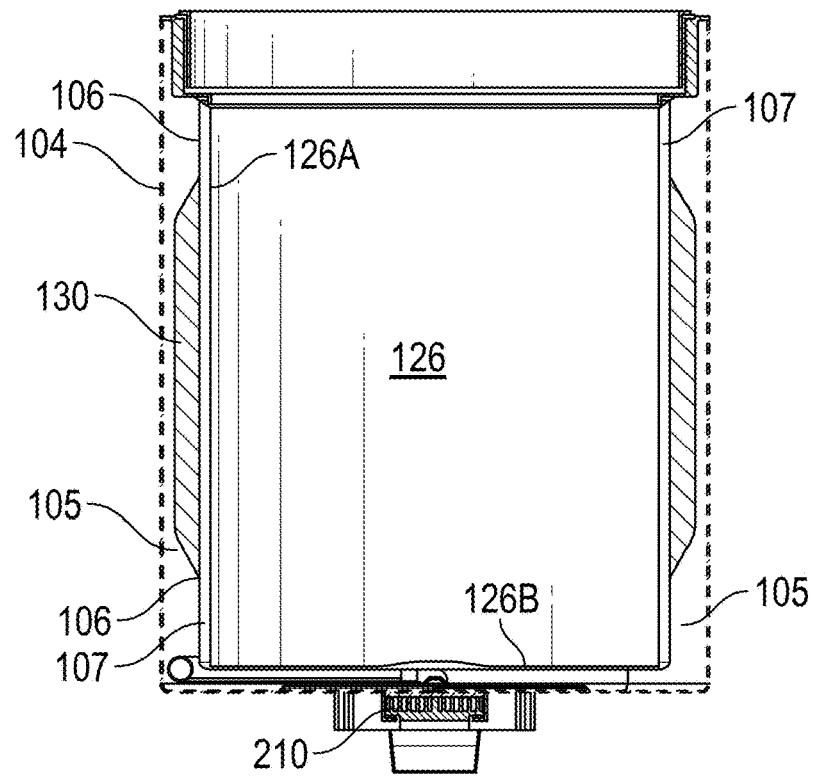
FIG. 10 is a cross-sectional view of the partial assembly in FIG. 9, excluding the frame and outer vessel wall.
Figure 11:
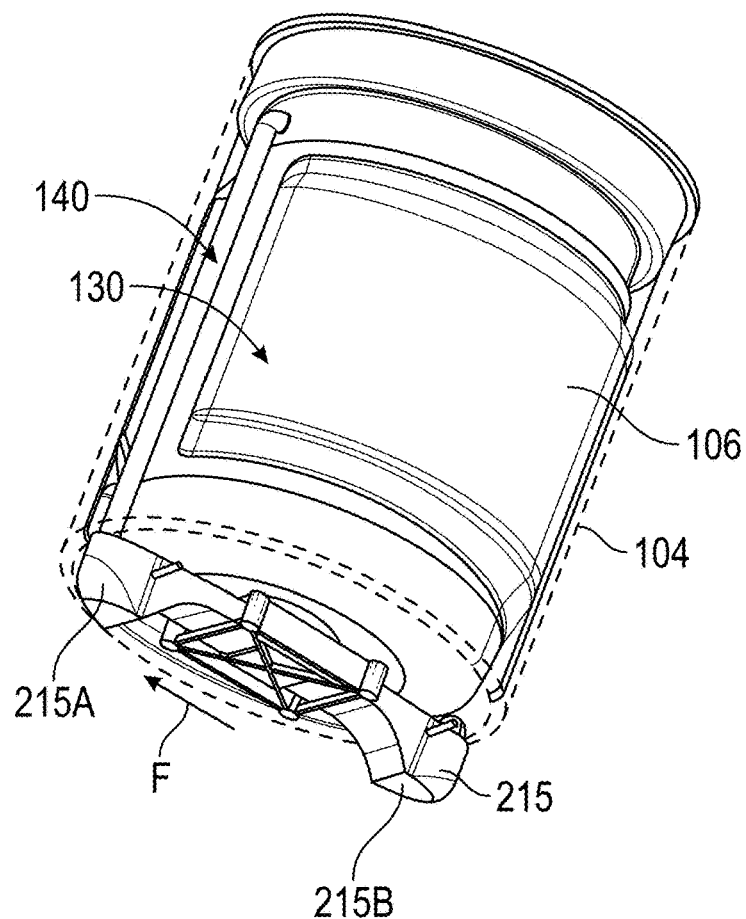
FIG. 11 is a perspective bottom view of the partial assembly in FIG. 9, excluding the frame and outer vessel wall.

As shown in FIG. 6, the cooling system 200 exhausts air that flows past the second heat sink 230 (e.g., heated air that has removed heat from the hot side heat sink 230) via air vent assemblies 202A, 202B, where said air enters channels 206A, 206B in the exhaust assemblies 202A, 202B via one or more openings 204A, 204B, where the exhausted air travels upward along the channels 206A, 206B and exits the cooler container assembly 1000 via the distal vent openings 205A. Additionally, the channels 206A, 206B extend to the proximal vent openings 205A, 205B, thereby allowing air from a lower assembly 1000 to also pass through the channels 206A, 206B and exit via the distal vent openings 205A, 205B. Accordingly, when the assemblies 1000 are stacked on top of each other, the channels 206A, 206B align to allow for (hot) air to exhaust the stacked assemblies 1000 in a chimney-like manner (See FIG. 17). As shown in FIG. 7, intake air I flows (e.g., via openings 203) into the assembly 1000 (e.g., via operation of the fan 280) and into fluid contact with the second heat sink 230, after which the exhaust air E is vented via the channels 206A, 206B and distal vent openings 205A.

With reference to FIGS. 2, 6, 9 and 10, the container vessel 100 can include one or more sleeve portions 130 defined between a third wall 132 and the second wall 106 (e.g., inner liner wall). The one or more sleeve portions 130 can optionally be discrete volumes disposed about at least a portion of the circumference of the second wall 106. The one or more sleeve portions 130 can house a phase change material (PCM) 135 or thermal mass therein. In one implementation, the phase change material 135 can be a solid-liquid PCM. In another implementation, the phase change material 135 can be a solid-solid PCM. The PCM 135 advantageously can passively absorb and release energy. Examples of possible PCM materials are water (which can transition to ice when cooled below the freezing temperature), organic PCMs (e.g., bio based or Paraffin, or carbohydrate and lipid derived), inorganic PCMs (e.g., salt hydrates), and inorganic eutectics materials. However, the PCM 135 can be any thermal mass that can store and release energy.

In operation, the cooling system 200 can be operated to cool the first heat sink 210 to cool the chamber 126. The cooling system 200 can optionally also cool the PCM 135 (e.g., via the second wall 106 as cooled air/coolant flows through the channel 107) to charge the PCM 135 (e.g., to place the PCM 135 in a state where it can absorb energy). In one example, one or more fins can extend from the second wall 106 (e.g., into the volume of the sleeve portion(s) 130), for example to enhance heat transfer to the PCM 135. Advantageously, the PCM 135 operates as a passive (e.g., backup) cooling source for the chamber 126 and contents disposed in the chamber 126. For example, if the one or more intake vents 203 are partially (or fully) blocked (e.g., due to dust or debris accumulation in the vent openings 203) or if the cooling system 200 is not operating effectively due to low power, or due to loss of power, the PCM 135 can maintain the chamber 126 and contents in the chamber 126 in a cooled state until the active cooling system can once again operate to cool the chamber 126 and contents therein.

With continued reference to FIGS. 1-19, the container vessel 100 can include a fourth wall 104 (e.g., outer liner wall) that defines an annular channel 105 between the second wall 106 (e.g., inner liner wall). In one implementation, the annular channel 105 can be under negative pressure (e.g. vacuum), thereby advantageously inhibiting heat transfer with the cooled air flowing through the annular channel 105 to inhibit (e.g., prevent) loss of cooling power and/or improve the efficiency of the cooling loop. An outer vessel wall 102 is disposed about the fourth wall 104. An inlet line (e.g., cool air inlet line, tube, pipe or conduit) 140 can have a proximal end 142 in fluid communication with one end 215A of a cold air fluid chamber 215 and extend to a distal end 144 in communication with the channel 107 between the inner wall 126A and the second wall (e.g., inner liner wall) 106. An outlet line (e.g., cool air exhaust line, tube, pipe or conduit) 150 can have a proximal end 152 in communication with the channel 107 between the inner wall 126A and the second wall 106 and extend to a distal end 154 in fluid communication with an opposite end 215B of the cold air fluid chamber 215. Advantageously, the cold air fluid chamber 215, inlet line 140, outlet line 150 and channel 107 defines a closed system via which a cooled fluid (e.g., cooled air, a cooled liquid coolant) is passed to cool the inner wall 126A and thereby the chamber 126. The air vent assemblies 202A, 202B are arranged about the fourth wall 104 (e.g., outer liner wall), with a gap or channel 103 defined between the air vent assemblies 202A, 202B (see FIGS. 3-4).

Figure 12:
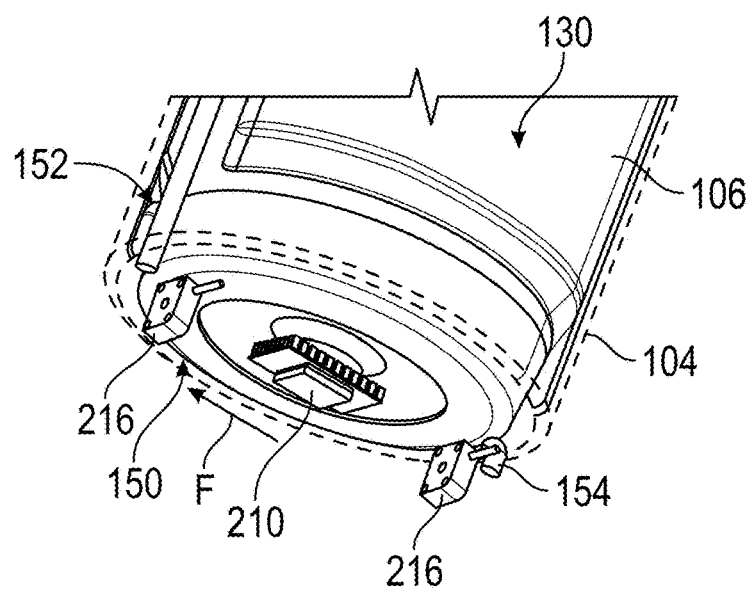
FIG. 12 is a partial perspective view of the partial assembly in FIG. 9, excluding the frame and outer vessel wall.
Figure 14:
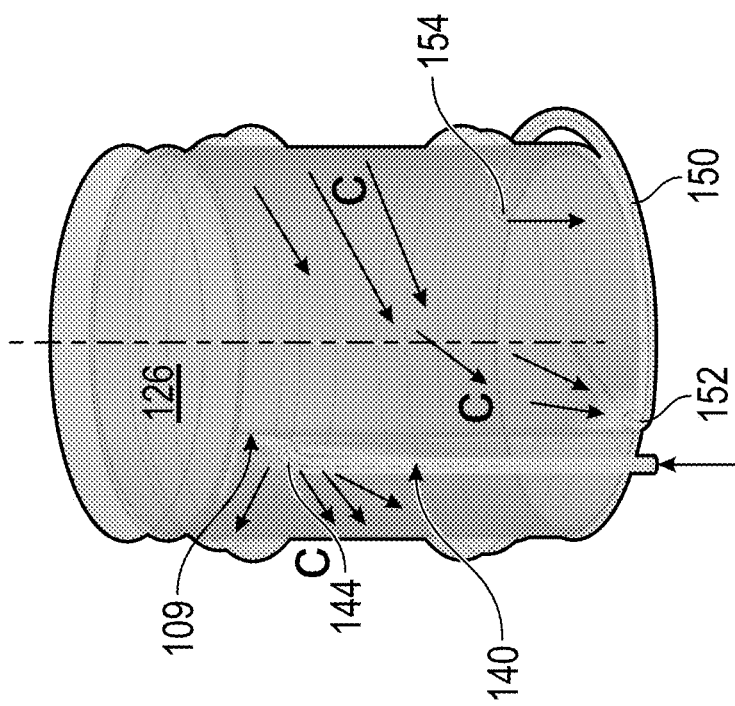
FIG. 14 is a perspective transparent view of the component in FIG. 13, excluding the frame and outer vessel wall and inner liner wall.
Figure 13:
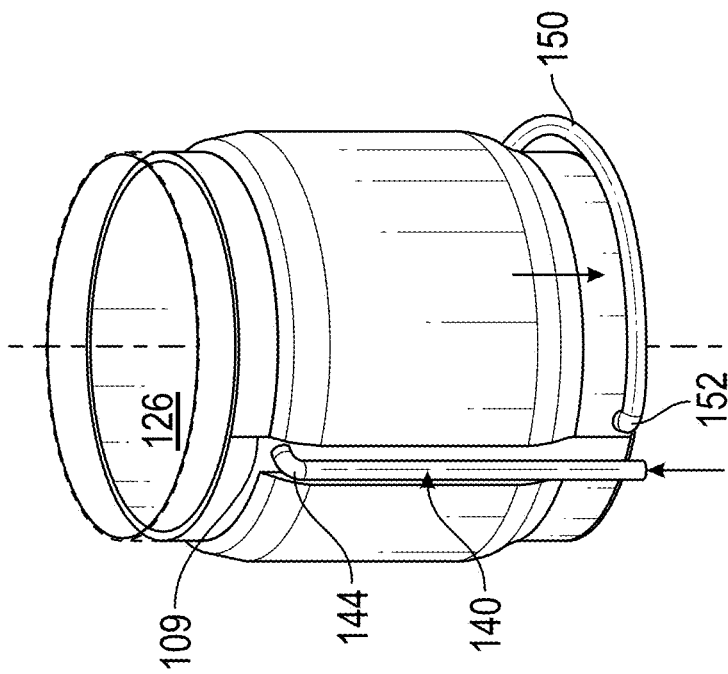
FIG. 13 is a perspective top view of a component of the cooler container of FIG. 1, excluding the frame and outer vessel wall and inner liner wall.

In operation, the fans 216A, 216B operate to drive air past the first heat sink 210 (e.g., cold side heat sink to cool said air) and the air is then directed via the proximal end 142 into the inlet line 140 (e.g., in direction F in FIGS. 2, 12). The air flows up the inlet line 140 and exits via the distal end 144 into the channel 107 on one side of dividing wall 109 (see FIG. 8) that extends between the inner wall 126A and the second wall (e.g., inner liner wall) 106. The air then travels within the channel 107 around the circumference of the inner wall 126A until it reaches the dividing wall 109, where it exits the channel via the proximal end 152 of the outlet line 150. The air exits the outlet line 150 at the distal end 154 and into the opposite end 215B of the cool air fluid chamber 215, where the air is again driven by the fans 216A, 216B over the first heat sink 210 (e.g., cold side heat sink 210 to cool the air) and again circulated via the inlet line 140 into the channel 107. Though not shown, valves can be used to regulate the flow of cooled fluid (e.g., air, another gas, liquid) during active cooling mode as well as control convection thermal ingress when the cooler 1000 is operating in passive cooling mode (e.g., when the fans 216A, 216B are not operating, when the PCM 135 is providing the cooling function, etc.). The dividing wall 109 advantageously forces the cooled air to circulate along substantially the entire surface (e.g., substantially entire circumference) of the chamber 126 (e.g., along path C in FIG. 14), thereby providing (e.g., substantially even) cooling to the chamber 126 (e.g., to substantially all portions of the inner wall 126A, thereby cooling substantially all of the chamber 126), and inhibits inefficient, uneven and/or spotty cooling of the chamber 126. In one example, one or more fins can extend from the second wall 106 into the channel 107 (e.g., along the direction of air flow in the channel 107), for example to enhance heat transfer to the inner wall 126A and/or chamber 126.

Figure 5:
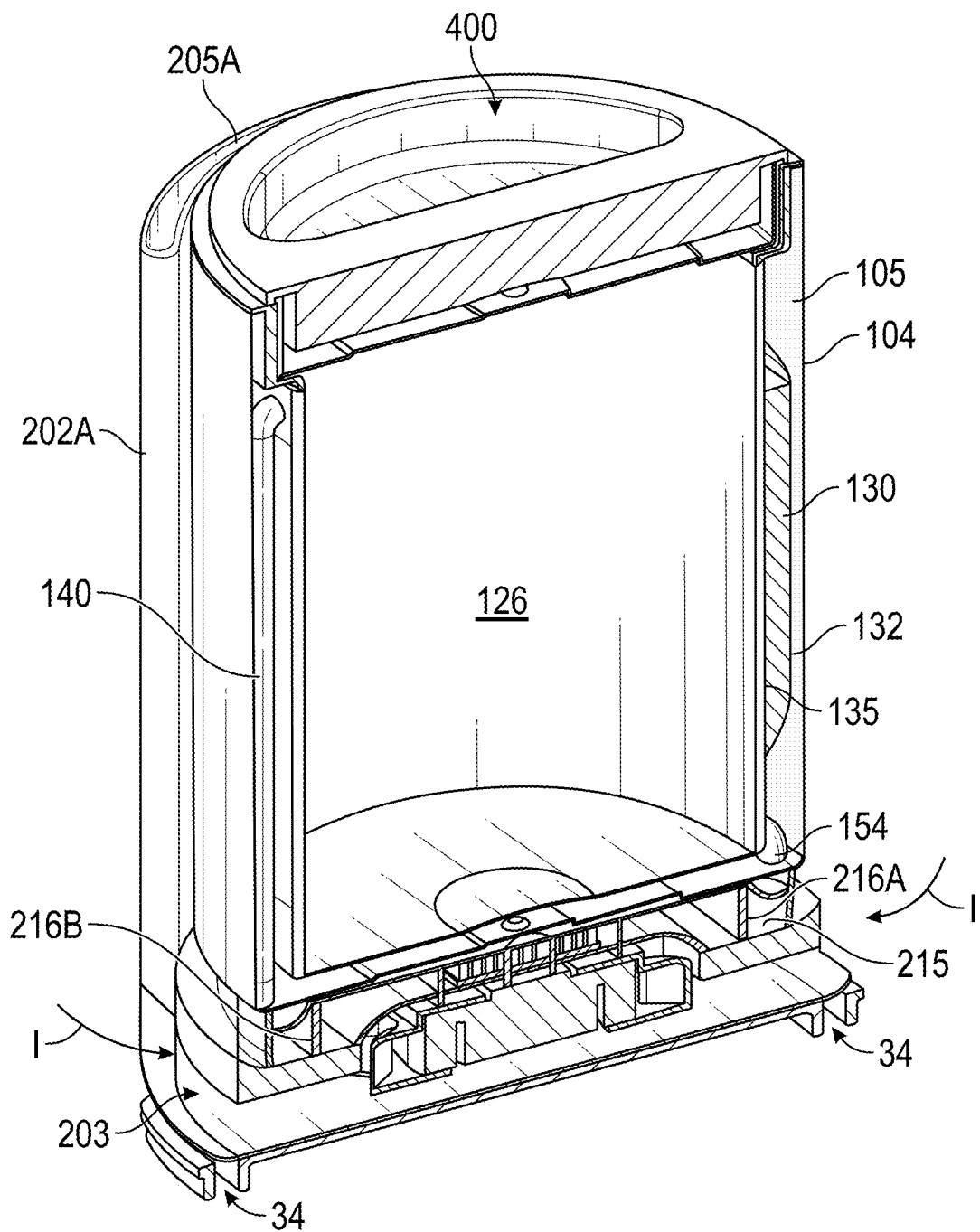
FIG. 5 is a cross-sectional view of the partial assembly in FIG. 4 along line 2-2 in FIG. 1.

The cool air fluid chamber 215 is separated from the hot air fluid chamber 218 (see FIGS. 5-6). In one implementation, thermally insulative material can be interposed between the cool air fluid chamber 215 and the hot air fluid chamber 218. The assembly 1000 can include electronics (e.g., at least partially in a cavity below the base wall 126B, between the base wall 126B and the bottom B of the assembly 1000) operable to control the operation of the fans 280, 216A, 216B, thermoelectric module(s) (TECs) 220, and display 188. The electronics can include circuitry (e.g., control circuitry, one or more processors on a printed circuit board, a CPU or central processing unit, sensors) that controls the operation of the cooling system 200, and optionally one or more batteries to provide power to one or more of the circuitry, fans 280, 216A, 216B, regulating valves and thermoelectric module(s) (TECs) 220. In one implementation, the assembly 1000 can optionally have a power button or switch actuatable by a user to turn on or turn off the cooling system.

Optionally, the bottom B of the assembly 1000 defines at least a portion of an end cap that is removable to access the electronics (e.g., to replace the one or more batteries, perform maintenance on the electronics, such as the PCBA, etc.). The power button or switch is accessible by a user (e.g., can be pressed to turn on the cooling system 200, pressed to turn off the cooling system 200, optionally pressed to pair the cooling system 200 with a mobile electronic device, etc.). Optionally, the power switch can be located generally at the center of the end cap (e.g., so that it aligns/extends along the symmetrical axis of the container vessel 100).

Figure 18:
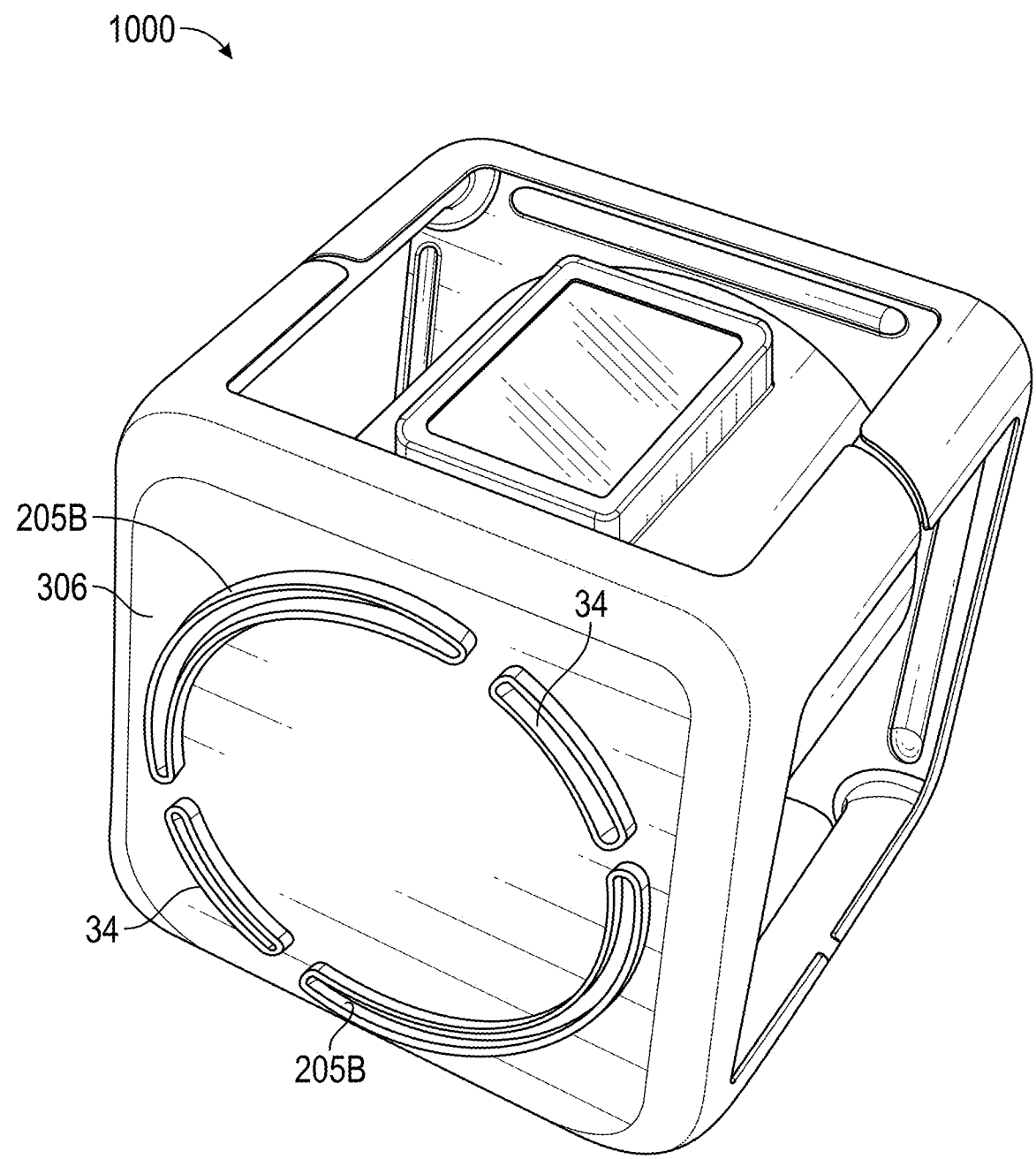
FIG. 18 shows a schematic perspective bottom view of a cooler container.

FIG. 18 shows an example bottom view of the cooler container assembly 1000, showing the proximal vent openings 205B that communicate with the channels 206A, 206B of the air vent assemblies 202A, 202B. FIG. 18 also shows the electrical contacts 34 on the bottom surface 306 of the cooler container assembly 1000. In one example, the proximal vent openings 205B protrude from the bottom surface 306 of the assembly 1000, allowing them to extend into the corresponding proximal openings 205A on the top surface 302 of the assembly 1000. In one example, the electrical contacts 34 protrude from the bottom surface 306 of the assembly 1000, allowing them to extend into corresponding openings for the electrical contacts 32 on the top surface 302 of the assembly 1000.

Figure 19:
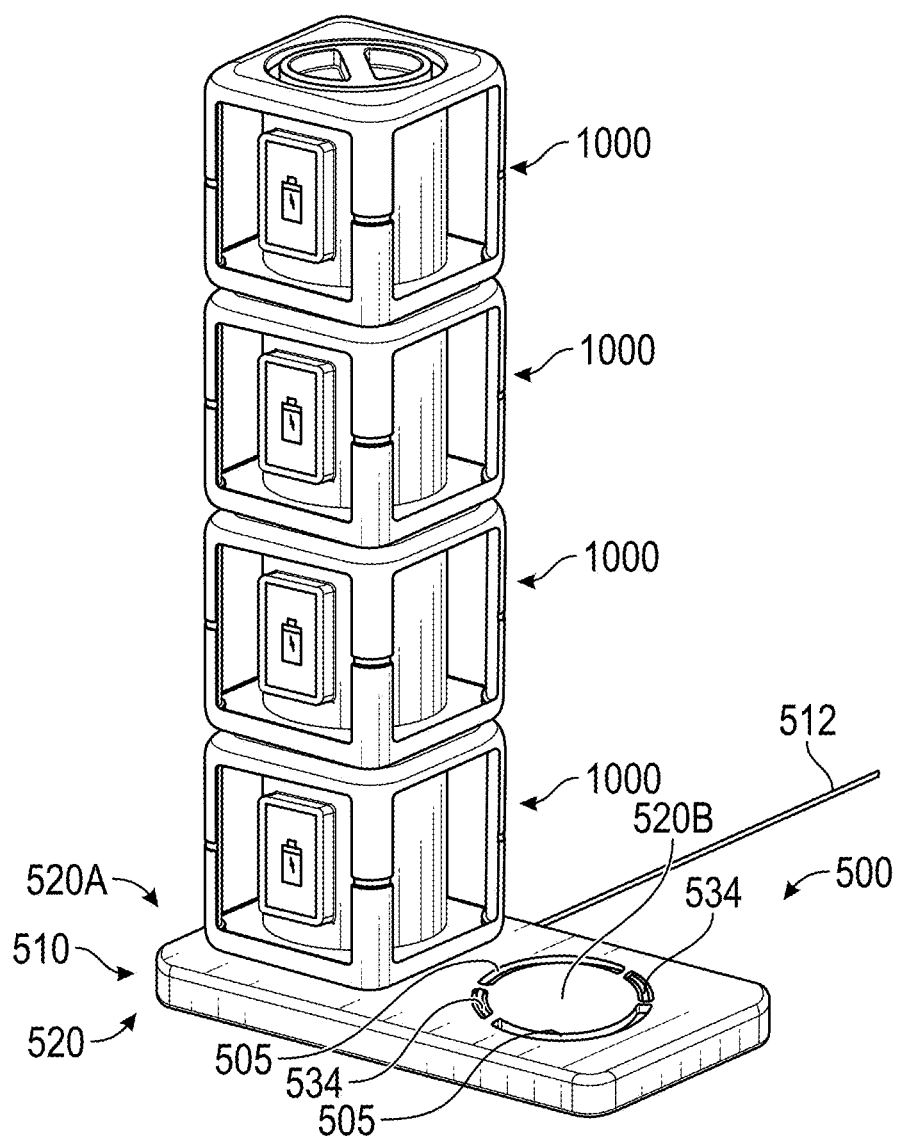
FIG. 19 shows a schematic view of stacked cooler containers on a charging base.

FIG. 19 shows multiple cooler container assemblies 1000 stacked on top of each other. In one example, the bottom of the assemblies 1000 can be placed on a power base or charging base 500. The electrical contacts 32, 34 of the assemblies 1000 allows power to be transferred from one assembly 1000 to the assembly 1000 above it, allowing each of the assemblies 1000 in the stack to receive power from the single charging base 500, advantageously allowing the assemblies 1000 to be powered (e.g., their batteries charged) at the same time.

The charging base 500 can have a platform or base 510 optionally coupled to an electrical cord 512 (e.g., which can be connected to wall power or a portable power source, such as a power source in a trailer, truck, boat, airplane or other transportation unit). The base 510 can have one or more charging units 520 (e.g., two charging units 520A, 520B). The charging units 520 can optionally have one or more connectors 505 sized and/or shaped to interface with the proximal vent openings 205B. The charging units 520 can optionally have one or more electrical contacts 534 sized and/or shaped to interface with the electrical contacts 34 on the bottom of the cooler container assembly 1000. In one example, the connectors 505 and electrical contacts 534 can have a curved shape. In one example, the connectors 505 and electrical contacts 534 together generally define a circular shape (e.g., generally corresponding to a generally circular shape defined by the electrical contacts 34 and proximal vent openings 205B on the bottom surface 306 of the assembly 1000).

Optionally, the display 188 of each of the assemblies 1000 in the stack can display the charging status (e.g., % charge, charge level, time remaining during which cooling system 200 can operate, etc.) of one or more batteries in the corresponding assembly 1000. Optionally, the display 188 of each of the assemblies 1000 can indicate (e.g., via a visual and/or audio signal) when its corresponding batteries are fully charged.

Figure 20:
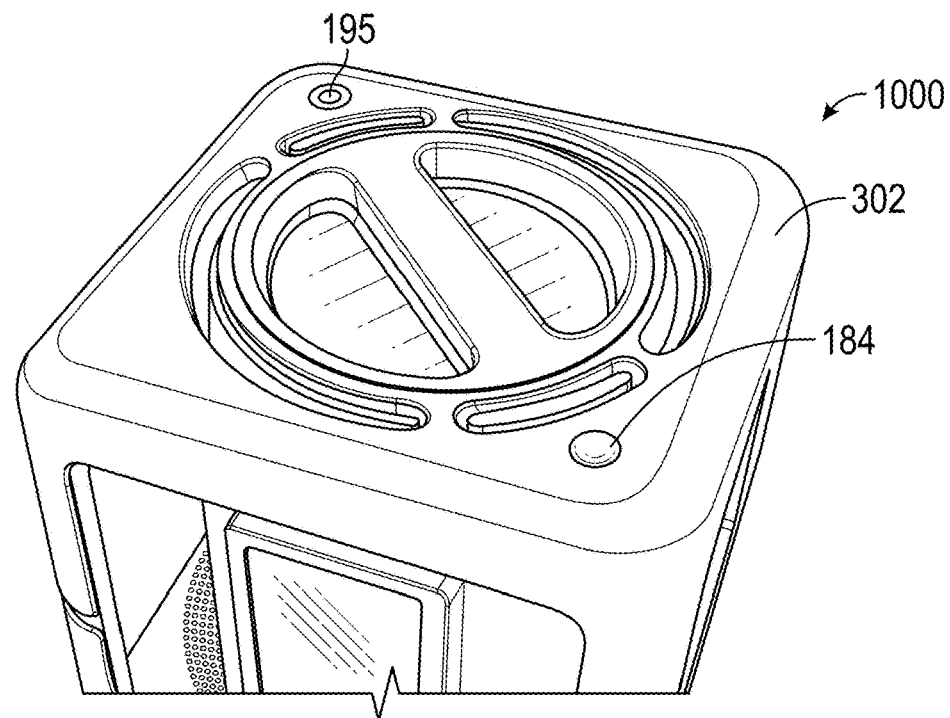
FIG. 20 shows a schematic partial perspective top view of the cooler container.

FIG. 20 shows a top surface 302 of the cooler container assembly 1000, which can optionally include an indicator light 195 to indicate one or more of: the assembly 1000 is on, the lid 400 is closed correctly (e.g., via a signal from one or more sensors, such as proximity sensors, capacitance sensors, etc. send to the control circuitry of the assembly 1000), and the cooling system 200 is in operation (e.g., to cool the chamber 126).

Figure 21:
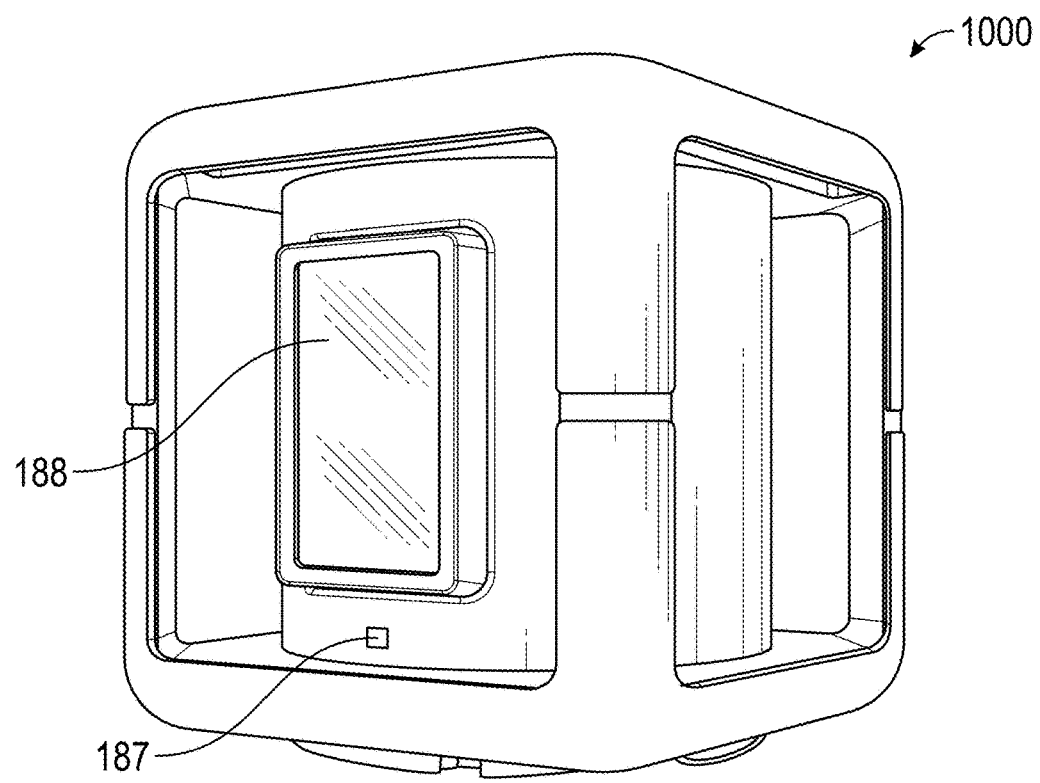
FIG. 21 shows a schematic perspective front view of the cooler container.

FIG. 21 shows a button 187 on a front of the assembly 1000 (e.g., located below the display 188). The button 187 can be actuated (e.g., by a user) to display the battery level of the assembly 1000 (e.g., % charge, charge level, time remaining during which cooling system 200 can operate, etc.). The button 187 can be located elsewhere on the assembly 1000. The button 187 can be a depressible button or a touch switch (e.g., capacitance) sensor.

Figure 22:
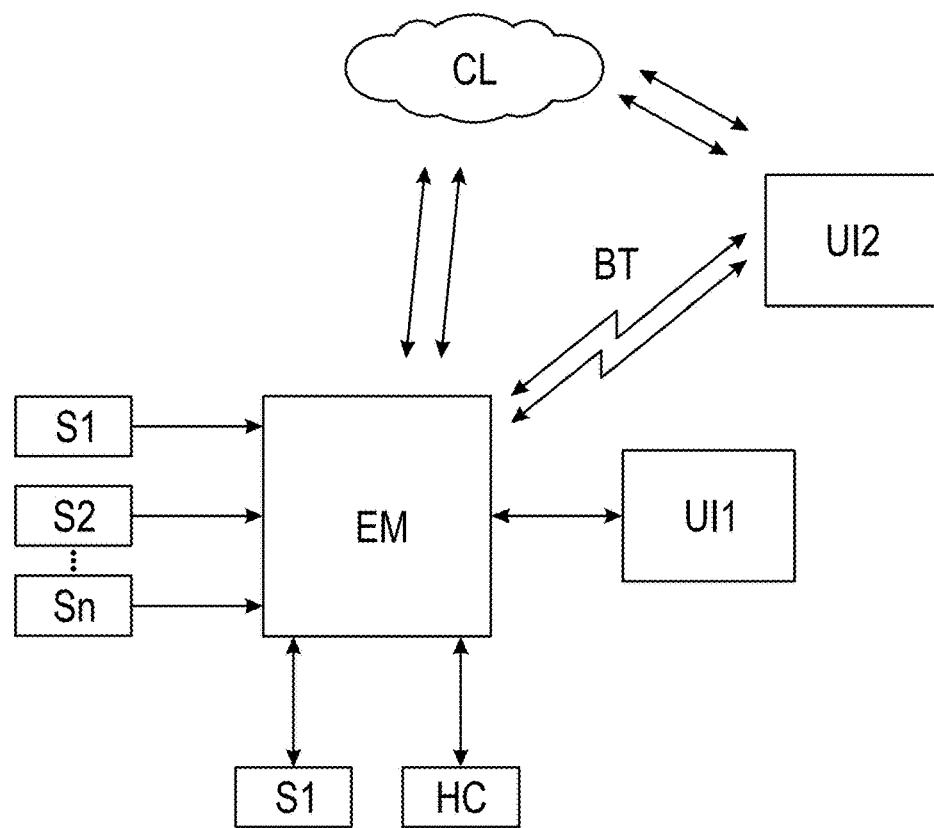
FIG. 22 is a schematic block diagram showing communication between the cooler container and a remote electronic device.

FIG. 22 shows a block diagram of a control system for (e.g., incorporated into) the devices described herein (e.g., the cooler container assembly 1000, 1000', 1000", 1000'''). In the illustrated embodiment, circuitry EM (e.g., control circuitry, microcontroller unit MCU, computer processor(s), etc.) can receive sensed information from one or more sensors S1-Sn (e.g., level sensors, volume sensors, temperature sensors, pressure sensors, orientation sensors such as gyroscopes, accelerometers, battery charge sensors, biometric sensors, load sensors, Global Positioning System or GPS sensors, radiofrequency identification or RFID reader, etc.).

In one implementation, at least one temperature sensor Sn (e.g., Sn1, Sn2 and/or Sn3) is in the vessel 100, 100', 100''' or lid 400, 400', 400''' and exposed to the chamber 126, 126''' to sense a temperature in the chamber 126, 126'''. In another implementation, additionally or alternatively, at least one temperature sensor Sn, Ta (see FIG. 27A) is on the vessel 100, 100', 100''' or lid 400, 400', 400''' and exposed to the outside of the container 1000, 1000', 1000", 1000''' to measure ambient temperature. In one implementation, the RFID reader in the vessel 100, 100', 100''' or lid 400, 400', 400''' can read RFID tags of components (e.g., medication, vials, liquid containers, food packages) placed in the chamber 126, 126'''. The RFID reader can optionally log when the payload contents are inserted into the chamber 126, 126''', and additionally or alternatively the RFID reader can optionally log when each of the one or more of the payload contents is removed from the chamber 126, 126''' to track their position relative to the vessel 100, 100', 100''' and communicate this information to the circuitry EM (e.g., to a memory of the circuitry EM).

In one implementation, one or more of the sensors S1-Sn can include a pressure sensor. The pressure sensor can optionally sense ambient pressure, which can be indicative of an altitude of the cooler container assembly 1000, 1000', 1000'', 1000'''. Optionally, the pressure sensor communicates sensed pressure information to the circuitry EM, which can optionally log or record the data from the pressure sensor and/or can operate one or more components of the cooling system 200, 200'', such as the TECs 220, 220'' and fan(s) 280, 280'' based at least in part on the sensed pressure information from the pressure sensor (e.g., to maintain the chamber 126, 126', 126'' at a desired temperature or temperature range). Such pressure sensor(s) can advantageously allow the cooling system 200, 200'' to operate such that the chamber 126, 126', 126'' is at a desired temperature or temperature range while the cooler container assembly 1000, 1000', 1000'', 1000''' in transit (e.g., in high altitude locations), such as on an airplane or truck.

In one implementation, one or more of the sensors S1-Sn can include an accelerometer. The accelerometer can optionally sense motion (e.g., sudden movement) of the cooler container assembly 1000, 1000', 1000'', 1000'''. Optionally, the accelerometer communicates with the circuitry EM, which can optionally log or record the data from the accelerometer and/or can operate one or more components of the cooling system 200, 200'', such as the TECs 220, 220'' and fan(s) 280, 280'' based at least in part on the sensed information from the accelerometer. Such accelerometer(s) can advantageously sense, for example, when the cooler container assembly 1000, 1000', 1000'', 1000''' has been dropped (e.g., from an unsafe height) or experienced a shock, for example while in transit, such as on an airplane or truck. In one implementation, the accelerometer can also provide the circuitry EM with sensed orientation information of the cooler container assembly 1000, 1000', 1000'', 1000'''. In another implementation, a separate orientation sensor (e.g., a gyroscope), can sense an orientation of the cooler container assembly 1000, 1000', 1000'', 1000''' and communicate the sensed orientation information to the circuitry EM, which can optionally log or record the data from the orientation sensor and/or can operate one or more components of the cooling system 200, 200'', such as the TECs 220, 220'' and fan(s) 280, 280'' based at least in part on the sensed orientation information.

The circuitry EM can be housed in the container vessel 100. The circuitry EM can receive information from and/or transmit information (e.g., instructions) to one or more heating or cooling elements HC, such as the TEC 220 (e.g., to operate each of the heating or cooling elements in a heating mode and/or in a cooling mode, turn off, turn on, vary power output of, etc.) and optionally to one or more power storage devices PS (e.g., batteries, such as to charge the batteries or manage the power provided by the batteries to the one or more heating or cooling elements).

Optionally, the circuitry EM can include a wireless transmitter, receiver and/or transceiver to communicate with (e.g., transmit information, such as sensed temperature and/or position data, to and receive information, such as user instructions from) one or more of: a) a user interface UI1 on the unit (e.g., on the body of the container vessel 100 or frame 300), b) an electronic device ED (e.g., a mobile electronic device such as a mobile phone, PDA, tablet computer, laptop computer, electronic watch, a desktop computer, remote server, cloud server), c) via the cloud CL, or d) via a wireless communication system such as WiFi, broadband network and/or Bluetooth BT. For example, the circuitry EM can have a cell radio antenna or cell radio via which it can communicate information (e.g., GPS location, sensed temperature in the chamber, ambient temperature, etc.) wirelessly (e.g., to the cloud CL, to a remote electronic device, such as a smartphone, etc.). A user can then track a location of the container 1000, 1000', 1000'', 1000''' (e.g., via a website or app on a smartphone). Additionally or alternatively, the circuitry EM can report data sensed by one or more of the sensors S1-Sn (e.g., sensed ambient temperature, sensed temperature in the chamber 126, 126'', sensed pressure, sensed humidity outside the chamber 126, 126'', sensed humidity inside the chamber 126, 126''), for example wirelessly, to a remote electronic device or the cloud CL (e.g., transmit a report to a pharmacy or medical institution with a log temperature, pressure and/or humidity information of the contents of the container 1000, 1000', 1000'', 1000''' during transit to said pharmacy or medical institution). When the containers 1000, 1000', 1000'', 1000''' are stacked, they can set up a MESH network (e.g., a meshnet via BLE 5.0), which would allow the containers 1000, 1000', 1000'', 1000''' at the top of the stack to communicate (via the cell radio or cell radio antenna) GPS location and/or sensed temperature data for each of the stacked containers 1000, 1000', 1000'', 1000'''. For example, the MESH network can optionally identify the container 1000, 1000', 1000'', 1000''' with the most available power to communicate the GPS location and/or sensed temperature data. The electronic device ED can have a user interface UI2, that can display information associated with the operation of the cooler container assembly 1000, 1000', 1000'', 1000''', and that can receive information (e.g., instructions) from a user and communicate said information to the cooler container assembly 1000, 1000', 1000'', 1000''' (e.g., to adjust an operation of the cooling system 200).

In operation, the cooler container assembly 1000, 1000', 1000'' can operate to maintain the chamber 126 of the container vessel 100 at a preselected temperature or a user selected temperature. The cooling system can operate the one or more TECs 220, 220'' to cool the chamber 126, 126'' (e.g., if the temperature of the chamber is above the preselected temperature, such as when the ambient temperature is above the preselected temperature or temperature range, for example when transporting of medication in summer or to very hot climate location) or to heat the chamber 126, 126'' (e.g., if the temperature of the chamber 126 is below the preselected temperature, such as when the ambient temperature is below the preselected temperature or temperature range, for example when transporting of medication in winter or to very cold climate location).

In one implementation, the circuitry EM can reverse the polarity of the TECs 220, 220'' and operate the TECs 220, 220'' to heat the chamber 126, 126'' (e.g., by heating a fluid circulating via a conduit in thermal communication with a phase change material or thermal mass to heat it, which in turn heats the chamber 126, 126''). Advantageously, such reversing of the polarity of the TECs 220, 220'' to heat the chamber 126, 126'' (e.g., by heating of a phase changer material or thermal mass via thermal communication with a fluid heated by the TECs 220, 220'') inhibits (e.g., prevents) one or more of the payload components (e.g., medicine, vaccines, perishable liquids or solids) from freezing. For example, as ambient temperature approaches a predetermined temperature (e.g., 2 degrees C.), for example as measured by a temperature sensor (e.g., Ta in FIG. 27A) of the cooler container assembly 1000, 1000', 1000''', the circuitry EM can reverse the polarity of the TECs 220, 220'' and operate them to heat the chamber 126, 126'' as discussed above. Once ambient temperature rises above a predetermined temperature (e.g., 3 degrees C.), the circuitry EM can stop operation of the TECs 220, 220'' to heat the chamber 126, 126'' and/or reverse the polarity of the TECs 220, 220'' to their original state (e.g., a state in which the TECs 220, 220'' can operate to cool the chamber 126, 126'').

Figure 27A:
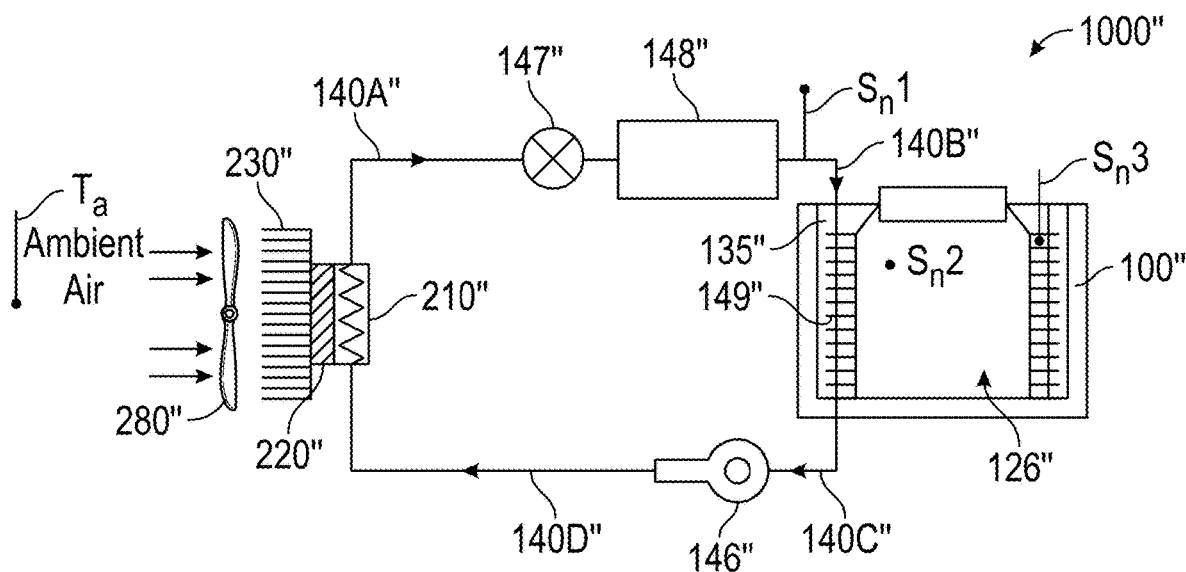
FIG. 27A is a schematic view of a cooler container system.
Figure 27B:
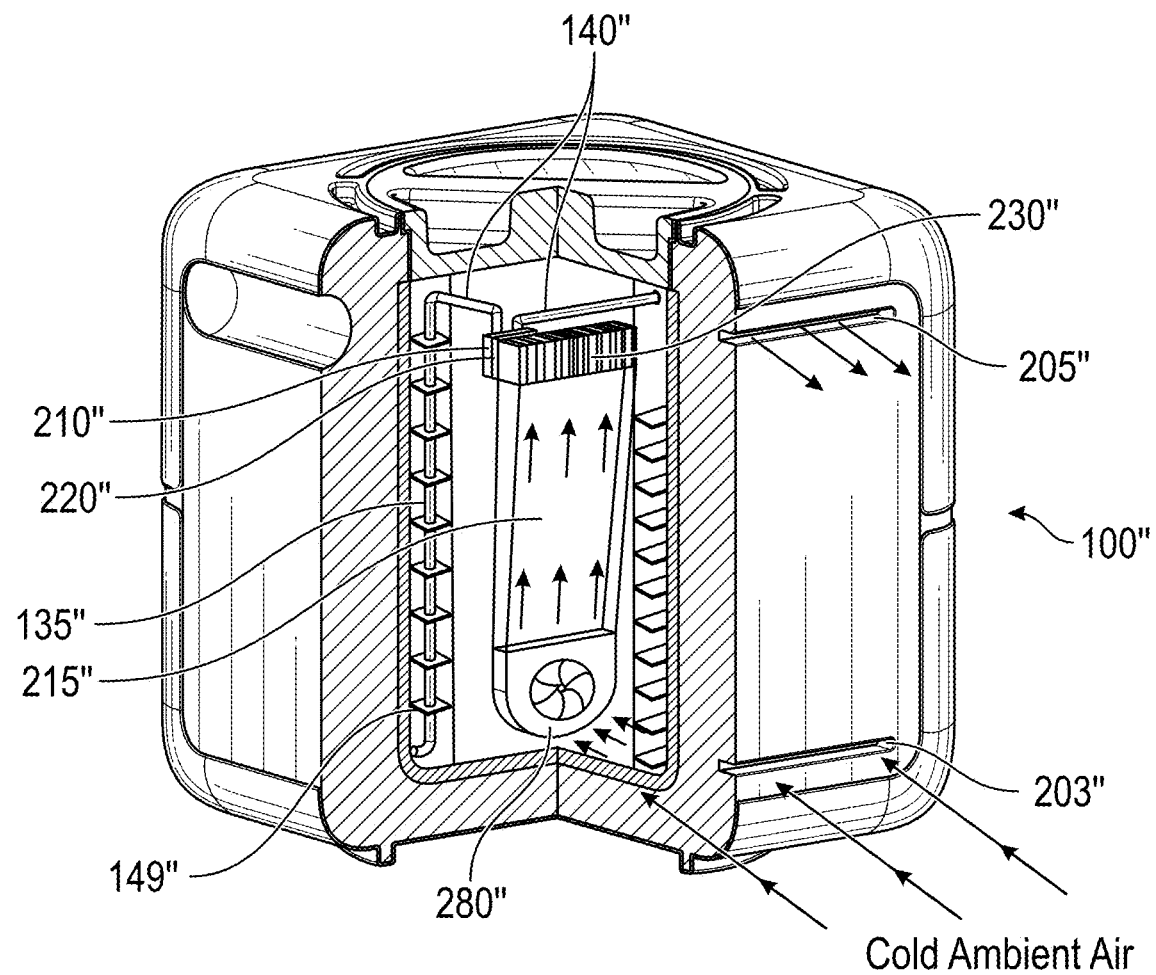
FIG. 27B is a partial cutaway view of the cooler container system of FIG. 27A.

In one implementation, shown in FIG. 27B, the cooler container 1000'' can have one or more removable batteries PS'', which can be installed in the cooler container 1000'' (e.g., via opening 305'') to power the TECs 220, 220'' in the reversed polarity state to heat the chamber 126, 126''. The circuitry EM and TECs 220, 220'' can be operated with power from the one or more removable batteries PS'', instead of other batteries (PS, PS'), which power other components of the cooler container assembly 1000, 1000', 1000'' when the circuitry EM needs to operate the TECs 220 to heat the chamber 126, 126'' (e.g., when sensed ambient and/or chamber temperature falls below a predetermined temperature). Advantageously, to reduce the shipping weight of the cooler container assembly 1000, 1000', 1000'', 1000''', the one or more batteries PS'' can optionally only be installed in the cooler container assembly 1000, 1000', 1000'', 1000''' when they are to be shipped to a climate where ambient temperature is likely to drop below a first predetermined temperature (e.g. 2 degrees C.) and/or when they are to be shipped to a climate where ambient temperature is likely to increase above a second predetermined temperature (e.g., 15 degrees C., 20 degrees C., 30 degrees C., etc.). In another implementation, the one or more batteries PS'' can be installed in the cooler container assembly 1000, 1000', 1000'', 1000''' for all shipments, irrespective of expected ambient temperature.

In some implementations, the cooler container assembly 1000, 1000', 1000'', 1000''' can have a separate heater unit (e.g., resistive heater) in thermal communication with the chamber 126, 126''' (e.g., wound at least partially about the chamber 126, 126'''), which can be operated when the ambient temperature is above the preselected temperature in the chamber 126, 126''' (e.g., after a predetermined period of time), such as when transporting medication in winter or to a very cold climate location. Optionally, the separate heater unit (e.g., resistive heater) and/or circuitry EM can be powered by the one or more batteries PS''. The preselected temperature may be tailored to the contents of the container (e.g., a specific medication, a specific vaccine, food, beverages, human tissue, animal tissue, living organisms), and can be stored in a memory of the assembly 1000, and the cooling system or heating system, depending on how the temperature control system is operated, can operate the TEC 220 to approach the preselected or set point temperature.

Optionally, the circuitry EM of the cooler container 1000, 1000', 1000'', 1000''' can communicate (e.g., wirelessly) information to a remote location (e.g., cloud-based data storage system, remote computer, remote server, mobile electronic device such as a smartphone or tablet computer or laptop or desktop computer) and/or to the individual carrying the container (e.g., via their mobile phone, via a visual interface on the container, etc.), such as a temperature history of the chamber 126 to provide a record that can be used (e.g., to evaluate the efficacy of the medication in the container, to evaluate if contents in the chamber 126 have spoiled, etc.) and/or alerts on the status of the chamber 126 and/or contents in the chamber 126. Optionally, the temperature control system (e.g., cooling system, heating system) of the cooler container 1000, 1000', 1000'' automatically operates the TEC 220 to heat or cool the chamber 126 of the container vessel 100 to approach the preselected temperature. In one implementation, the cooling system 200 can cool and maintain one or both of the chamber 126 and the contents therein at or below 15 degrees Celsius, such as at or below 10 degrees Celsius (e.g., in the range of 2 degrees Celsius to 8 degrees Celsius), in some examples at approximately 5 degrees Celsius.

In one implementation, the one or more sensors S1-Sn can include one more air flow sensors that can monitor airflow through one or both of the intake vent 203 and exhaust vent 205, through the cold side fluid chamber 215, inlet line 140 and/or outlet line 150. If said one or more flow sensors senses that the intake vent 203 is becoming clogged (e.g., with dust) due to a decrease in air flow, the circuitry EM (e.g., on the PCBA) can optionally reverse the operation of the fan 280 for one or more predetermined periods of time to draw air through the exhaust vent 205 and exhaust air through the intake vent 203 to clear (e.g., unclog, remove the dust from) the intake vent 203. In another implementation, the circuitry EM can additionally or alternatively send an alert to the user (e.g., via a user interface on the assembly 1000, wirelessly to a remote electronic device such as the user's mobile phone) to inform the user of the potential clogging of the intake vent 203, so that the user can inspect the assembly 1000 and can instruct the circuitry EM (e.g., via an app on the user's mobile phone) to run an "cleaning" operation, for example, by running the fan 280 in reverse to exhaust air through the intake vent 203. In one example, an air filter can optionally be placed underneath the intake grill/vent 203.

In one implementation, the one or more sensors S1-Sn of the cooler container 1000, 1000', 1000'', 1000''' can include one more Global Positioning System (GPS) sensors for tracking the location of the cooler container assembly 1000, 1000', 1000'', 1000'''. The location information can be communicated, as discussed above, by a transmitter (e.g., cell radio antenna or cell radio) and/or transceiver associated with the circuitry EM to a remote location (e.g., a mobile electronic device, a cloud-based data storage system, etc.). In one implementations, the GPS location is communicated (e.g., automatically, not in response to a query or request) by the circuitry EM at regular intervals (e.g., every 10 minutes, every 15 minutes, etc.). In another implementation, the GPS location is communicated by the circuitry EM upon receipt of a request or query, such as from the user (e.g., via an app or website via which the user can track the location of the cooler container 1000, 1000', 1000'', 1000''').

Figure 23:
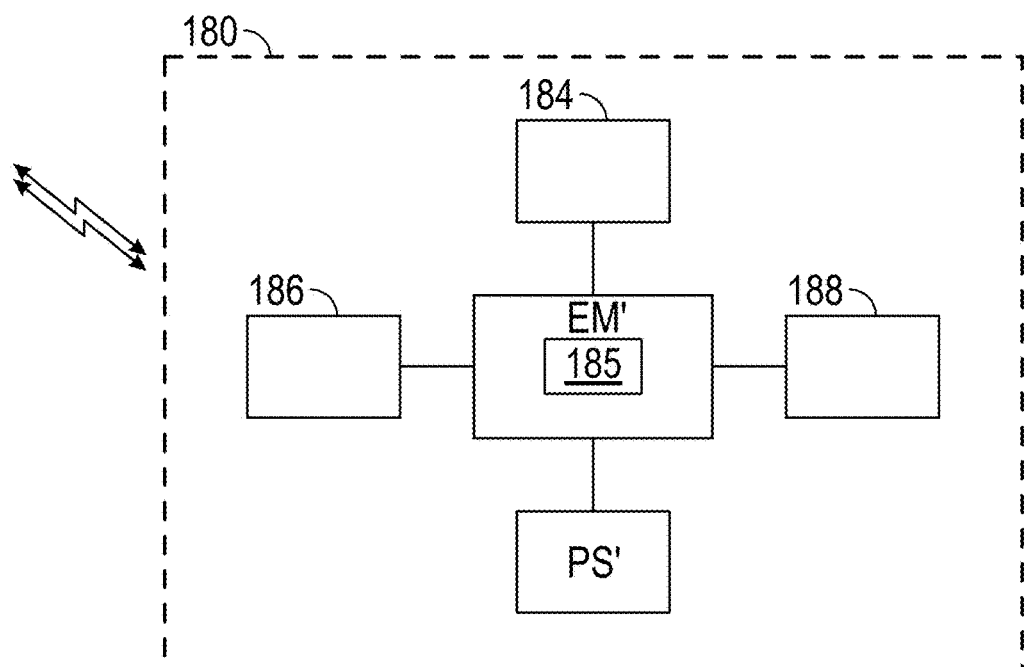
FIG. 23 is a schematic block diagram showing electronics in the cooler container associated with the operation of the display screen of the cooler container.

FIG. 23 shows a block diagram of electronics 180 of the cooler container assembly 1000, 1000', 1000'', 1000'''. The electronics 180 can include circuitry EM' (e.g., including one or more processors on a printed circuit board). The circuitry EM' communicate with one or more batteries PS', with the display screen 188, 188''', and with the user interface 184, 184'''. Optionally, a memory module 185 is in communication with the circuitry EM'. In one implementation, the memory module 185 can optionally be disposed on the same printed circuit board as other components of the circuitry EM'. The circuitry EM' optionally controls the information displayed on the display screen 188, 188'''. Information (e.g., sender address, recipient address, etc.) can be communicated to the circuitry EM' via an input module 186. The input module 186 can receive such information wirelessly (e.g., via radiofrequency or RF communication, via infrared or IR communication, via WiFi 802.11, via BLUETOOTH®, etc.), such as using a wand (e.g., a radiofrequency or RF wand that is waved over the container assembly 1000, 1000', 1000", 1000''', such as over the display screen 188, 188''', where the wand is connected to a computer system where the shipping information is contained). Once received by the input module 186, the information (e.g., shipping information for a shipping label to be displayed on the display screen 188 can be electronically saved in the memory module 185). Advantageously, the one or more batteries PS' can power the electronics 180, and therefore the display screen 188 for a plurality of uses of the cooler container assembly 1000, 1000', 1000", 1000''' (e.g., during shipping of the container assembly 1000 up to one-thousand times). As discussed above, the electronics 180 can wirelessly communicate a signal to a shipping carrier (e.g., UPS, FedEx, DHL) informing the shipping carrier that a shipping label (e.g., new shipping label) has been assigned to the portable cooler and that the cooler is ready for pick-up and shipping (e.g., when the user interface 184 is actuated by the user).

Figure 24A:
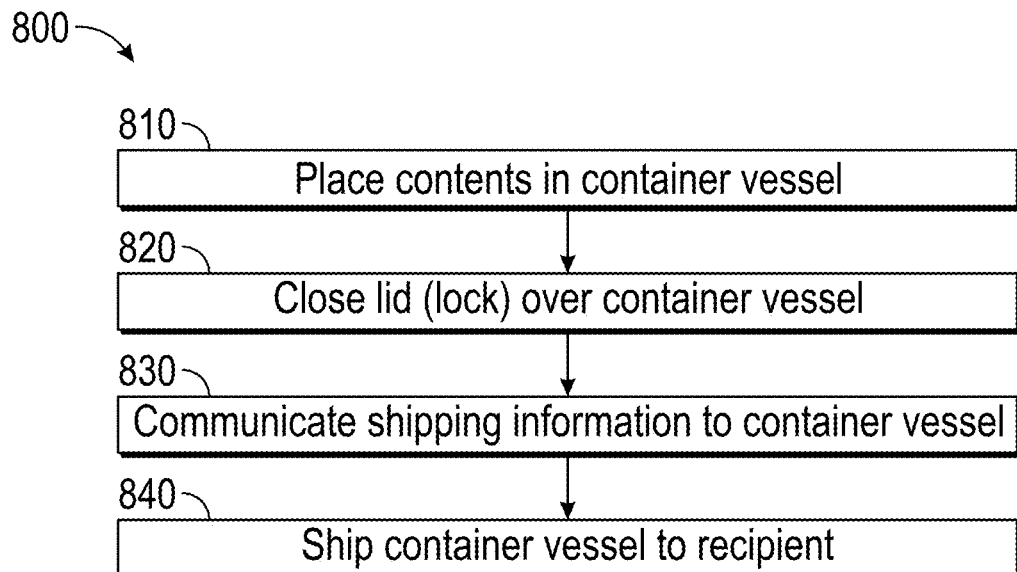
FIGS. 24A-24B show block diagrams of a method for operating the cooler container of FIG. 1.

FIG. 24A shows a block diagram of one method 800 for shipping the cooler container assembly 1000, 1000', 1000", 1000'''. At step 810, one or more components (e.g., food(s), beverage(s), medicine, living tissue or organisms) are placed in the container vessel 100 of the container assembly 1000, such as at a distribution facility for the components or products. At step 820, the lid 400 is closed over the container vessel 100 once the contents have been placed therein. Optionally, the lid 400 is locked to the container vessel 100, 100', 100' (e.g., via a magnetically actuated lock, including an electromagnet actuated when the lid 400 is closed that can be turned off with a code, such as a digital code, a code provided to a user's phone, etc.). At step 830, information (e.g., shipping label information) is communicated (e.g., loaded onto) to the container assembly 1000. For example, as discussed above, a radiofrequency (RF) wand can be waved over the container assembly 1000, 1000', 1000", 1000''' to transfer the shipping information to the input module 186 of the electronics 180 of the container assembly 1000, 1000', 1000", 1000'''. At step 780, the container assembly 1000, 1000', 1000", 1000''' is shipped to the recipient (e.g., displayed on the shipping label 189 on the display screen 188).

Optionally, the assemblies 1000, 1000', 1000", 1000''' can be stacked, for example on a pallet P, as shown in FIG. 16, allowing hot air to be exhausted from the stacked assemblies 100 (using a chimney effect) as discussed above, allowing heated air to exit the stacked assemblies and, for example, be vented out of the shipping container via one or more vents in the shipping container. Further, as discussed above, the stacked assemblies 1000, 1000', 1000", 1000''' can be electrically connected, allowing power transfer between a lower assembly 1000, 1000', 1000", 1000''' to a higher assembly 1000, 1000', 1000", 1000''' (e.g., when all the assemblies are stacked on a power base or a charging base, such as prior to shipping in a warehouse or distribution center or during shipping if the shipping container has a power or charging base on which the assemblies 1000 are stacked). The assemblies 1000, 1000', 1000", 1000''' within the stack (see FIGS. 16, 19) can establish two-way communication link to transmit data, for example temperature history and battery consumption data. In one example, where one of the cooler container assemblies 1000, 1000', 1000", 1000''' is low on power, it can optionally draw power from one or more of the assemblies 1000 around it (e.g., above it, below it) when stacked. Cooling system 200 in individual cooler container assemblies 1000 can optionally remain active when assemblies 1000 are stacked on a power base or charging base (such as charging base 500 in FIG. 19) to charge PCM 135 simultaneously, for example, at the warehouse or shipping facility, on a truck, ship, airplane, etc.

Figure 24B:
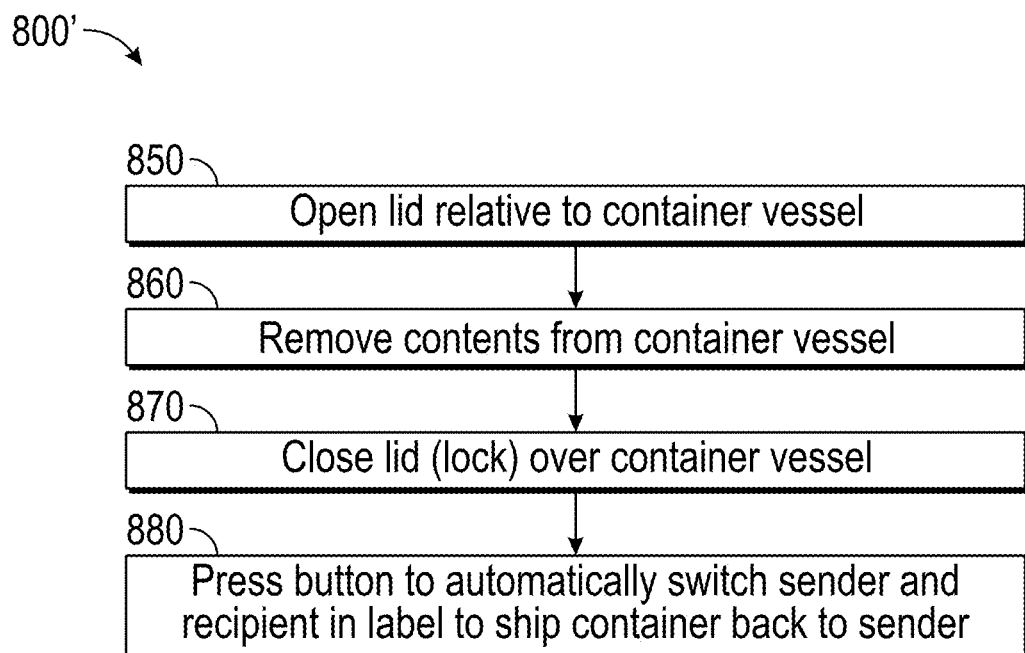

FIG. 24B shows a block diagram of a method 800' for returning the container assembly 1000, 1000', 1000", 1000'''. At step 850, after receiving the container assembly 1000, 1000', 1000", 1000''', the lid 400, 400" can be opened relative to the container vessel 100. Optionally, prior to opening the lid 400, 400", the lid 400, 400" is unlocked relative to the container vessel 100 (e.g., using a code, such as a digital code or RFID code on user's mobile phone, provided to the recipient from the shipper, via a keypad on the vessel 100, 100', 1000" or lid 400, 400", 400''' and/or biometric identification). The user's smartphone or other electronic device with the unlock code can be communicated to the container 1000, 1000', 1000", 1000''', for example, via Bluetooth or RFID, to unlock the lid 400, 400", 400''' from the vessel 100, 100', 100''' (e.g., by positioning or waiving the smartphone or electronic device near the vessel and/or lid). At step 860, the contents (e.g., medicine, foodstuff, beverages, living organisms or tissue) are removed from the container vessel 100. At step 870, the lid 400 is closed over the container vessel 100. At step 880, the user interface 184 (e.g., button) is actuated to switch the information of the sender and recipient in the display screen 188 with each other, advantageously allowing the return of the container assembly 1000, 1000', 1000", 1000''' to the original sender to be used again without having to reenter shipping information on the display screen 188, 188'''. Optionally, actuation of the user interface 184, 184''' in step 880 causes a signal to be wirelessly communicated (e.g., by the electronics 180) to a shipping carrier (e.g., UPS, FedEx, DHL) informing the shipping carrier that a shipping label (e.g., new shipping label) has been assigned to the portable cooler and that the cooler is ready for pick-up and shipping. In one example, the cooler container assembly 1000, 1000', 1000", 1000''' or stack of assemblies 1000, 1000', 1000", 1000''' can also send notifications to both end-user as well as origin facility during certain events, for example, payload has been delivered or alerts as needed.

The display screen 188, 188''' and label 189 advantageously facilitate the shipping of the container assembly 1000 without having to print any separate labels for the container assembly 1000. Further, the display screen 188, 188''' and user interface 184, 184''' advantageously facilitate return of the container system 1000 to the sender (e.g. without having to reenter shipping information, without having to print any labels), where the container assembly 1000, 1000', 1000", 1000''' can be reused to ship contents again, such as to the same or a different recipient. The reuse of the container assembly 1000, 1000', 1000", 1000''' for delivery of perishable material (e.g., medicine, food, beverages, living tissue or organisms) advantageously reduces the cost of shipping by allowing the reuse of the container vessel 100 (e.g., as compared to commonly used cardboard containers, which are disposed of after one use).

Figure 25:
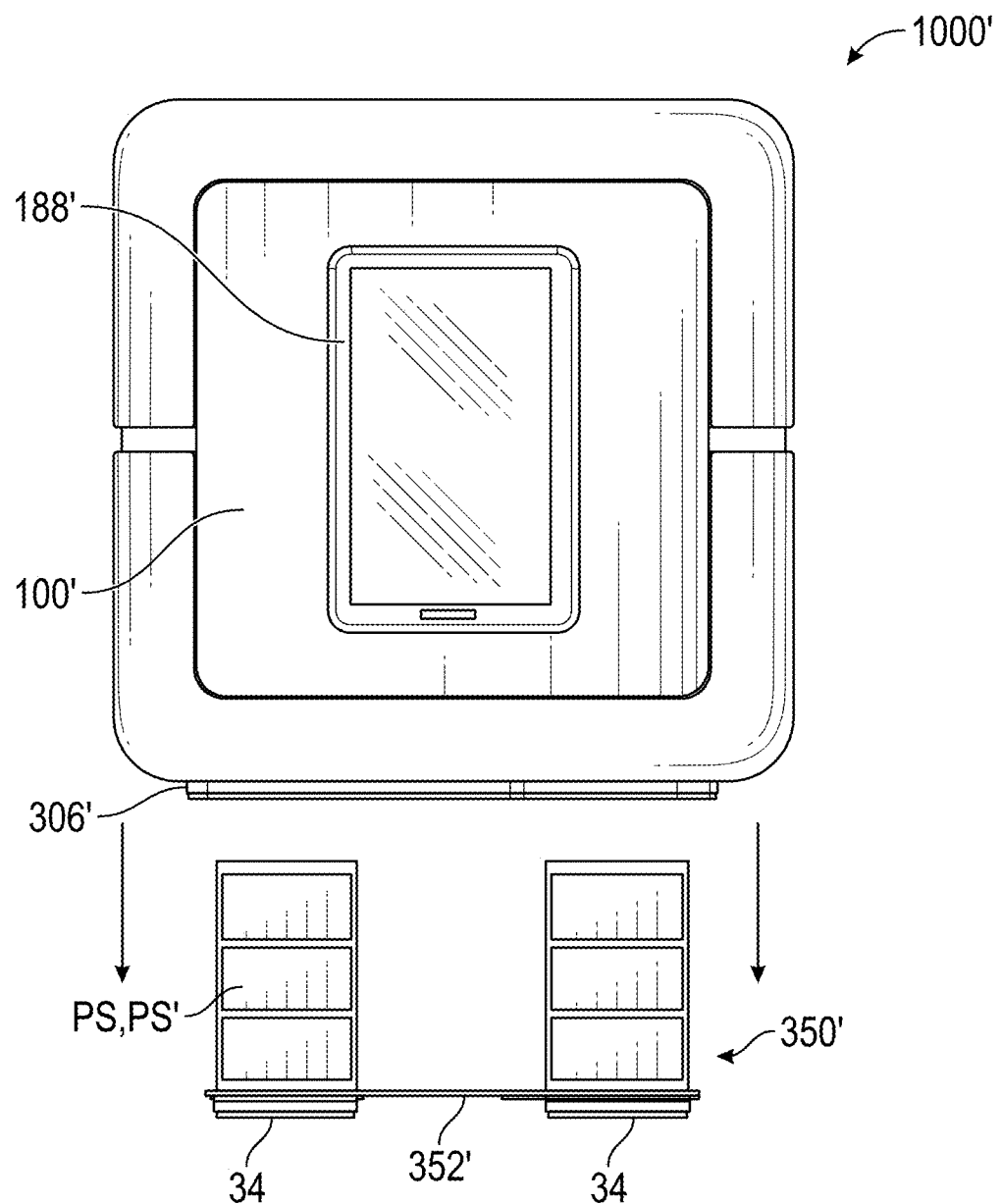
FIG. 25 is a schematic front partially exploded view of a cooler container.

FIG. 25 shows a partially exploded view of a cooler container 1000'. Some of the features of the cooler container 1000' are similar to features of the cooler container 1000 in FIGS. 1-24B. Thus, reference numerals used to designate the various components of the cooler container 1000' are identical to those used for identifying the corresponding components of the cooler container 1000 in FIGS. 1-24B, except that a "'" has been added to the numerical identifier. Therefore, the structure and description for the various features of the cooler container 1000 and how it's operated and controlled in FIGS. 1-24B are understood to also apply to the corresponding features of the cooler container 1000' in FIG. 25, except as described below. Though the features below are described in connection with the cooler container assembly 1000', the features also apply to all cooler containers, such as cooler containers 1000, 1000", 1000''' disclosed herein.

The cooler container 1000' differs from the cooler container 1000 in that the one or more power storage devices (e.g., batteries) PS, PS' are in a module 350' that can be removably coupled to the cooler container 1000'. In one implementation, the power storage devices PS, PS' can optionally be arranged in one or more stacks on a platform 352', and electrically connected to the electrical contacts 34' underneath the platform 352'. The module 350' can optionally couple to the cooler container 1000' (e.g., to the frame 300' of the cooler container 1000') so that the power storage devices PS, PS' extend into compartments in the cooler container 1000' (e.g., compartments in the frame 300'), and so that the platform 352' is adjacent to or generally co-planar with the bottom surface 306' of the frame 300'.

The module 350' locks into place on the cooler container 1000' (e.g., via a latch mechanism, such as a spring-loaded latch mechanism, threaded coupling, magnetic coupling, etc.). Once the module 350' is coupled to the cooler container 1000' (e.g., locked into place on the cooler container 1000'), the display 188' can optionally register (e.g., display) that the module 350' is coupled and optionally show the charge level of the power storage devices PS, PS' of the module 350'. Power can be provided from the power storage devices PS, PS' to the electronics (e.g., Peltier element 220, fan 280, circuitry EM) in the cooler container 1000', for example, via electrical contacts between the module 350' and the cooler container 1000' (e.g., electrical contacts on the frame 300' that contact electrical contacts of the module 350'). In another implementation, power is transmitted from the power storage devices PS, PS' in the module 350' to the electronics (e.g., Peltier element 220, fan 280, circuitry EM) in the cooler container 1000' via inductive coupling.

Advantageously, the module 350' can be decoupled and removed from the cooler container 1000' to replace the power storage devices PS, PS', or to replace the module 350'. Therefore, the module 350' can be interchangeable and/or replaceable. The power storage devices (e.g., batteries) PS, PS' in the module 350' can optionally be charged (or recharged) while coupled to the cooler container 1000'. In another implementation, the module 350' can be detached from the cooler container 1000' and charged (or recharged) separately on the charging station or base 500 before being coupled to the cooler container 1000' as discussed above.

Figure 26:
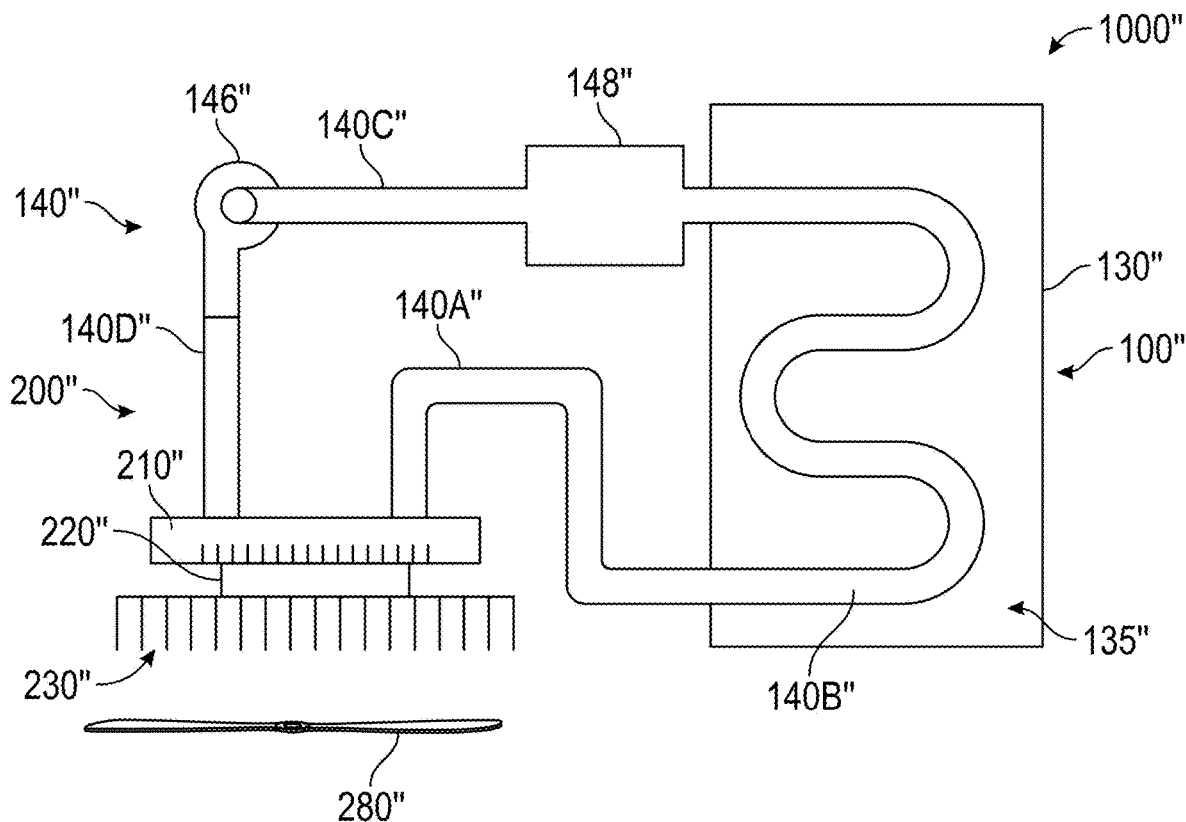
FIG. 26 is a schematic view of a cooler container system.

FIG. 26 shows a schematic view of a cooler container 1000". Some of the features of the cooler container 1000" are similar to features of the cooler container 1000 in FIGS. 1-24B and cooling container 1000' in FIG. 25. Thus, reference numerals used to designate the various components of the cooler container 1000" are identical to those used for identifying the corresponding components of the cooler container 1000 in FIGS. 1-24B and cooler container 1000' in FIG. 25, except that a """ has been added to the numerical identifier. Therefore, the structure and description for the various features of the cooler container 1000" and how it's operated and controlled in FIGS. 1-25 are understood to apply to the corresponding features of the cooler container 1000" in FIG. 26, except as described below. Though the features below are described in connection with the cooler container assembly 1000", the features also apply to all cooler containers, such as cooler containers 1000', 1000, disclosed herein.

The cooler container 1000" can have one or more sleeve portions 130" disposed about the chamber 126" of the container 1000" that can be filled with temperature sensitive contents (e.g., medicine, vaccines, tissue). The sleeve portion(s) 130" can optionally be discrete volumes disposed about the chamber 126". The sleeve portion(s) 130" can house a phase change material (PCM) or thermal mass 135" therein. In one implementation, the phase change material 135" can be a solid-liquid PCM. In another implementation, the phase change material 135" can be a solid-solid PCM. The PCM 135" advantageously can passively absorb and release energy. Examples of possible PCM materials are water (which can transition to ice when cooled below the freezing temperature), organic PCMs (e.g., bio based or Paraffin, or carbohydrate and lipid derived), inorganic PCMs (e.g., salt hydrates), and inorganic eutectics materials. However, the PCM 135" can be any thermal mass that can store and release energy.

The cooler container 1000" can optionally include a cooling system 200". In other examples, described below, at least a portion of the cooling system 200" can be external to the container 1000". The cooling system 200" is optionally a closed loop system. The cooling system 200" optionally includes a conduit 140" via which a cooling fluid (e.g., a cooling liquid, such as water) flows. In some implementations, the cooling fluid can be water. In some implementations, the cooling fluid can be a water mixture (e.g., a water-alcohol mixture, a mixture of water and ethylene glycol, etc.). The cooling system 200" can optionally include one or more of a first heat sink 210" (e.g., a solid to liquid heat exchanger), thermoelectric module(s) or TEC(s) 220", a second heat sink 230", fan(s) 280", a pump 146" and a reservoir 148". The conduit 140" can include a first conduit 140A" that extends between the first heat sink 210" and the sleeve portion(s) 130". The conduit 140" also includes a second conduit 140B" that extends through the sleeve portion(s) 130" and is in fluid communication with the first conduit 140A". The reservoir 148" is in fluid communication with an opposite end of the second conduit 140B". The conduit 140" also includes a third conduit 140C" that extends between the reservoir 148" and the pump 146". The conduit 140" also includes a fourth conduit 140D" that extends between the pump 146" and the first heat sink 210".

In operation, the TEC(s) 220" are operated (as described above in connection with the cooling container 1000, 1000') to remove heat from the first heat sink 210" and transfer said heat to the second heat sink 230". The fan(s) 280" are optionally operated to dissipate the heat from the second heat sink 230", thereby allowing the TEC(s) 220" to remove additional heat from the first heat sink 210" (e.g., to cool the first heat sink 210"). Optionally, the first heat sink 210" (e.g., solid to liquid heat exchanger) can at least partially define one or more flow paths (e.g., in the body of the heat sink 210") in fluid communication with the first conduit 140A" and fourth conduit 140D". The pump 146" can be selectively operated (e.g., by a controller of the cooling system 200" or container 1000") to flow the cooling fluid (e.g., liquid) through the conduit 140" and past or through the first heat sink 210" where the cooling fluid is cooled. The cooled cooling fluid is then directed through the first conduit 140A" and into the sleeve(s) 130" via the second conduit 140B" where the cooling fluid removes heat from the PCM 135" to thereby charge the PCM 135" (e.g., to place the PCM 135" in a state where it can absorb energy). The fluid then exits the sleeve(s) 130" and flows into the reservoir 148". From the reservoir 148", the fluid flows via the third conduit 140C" to the pump 146", where the pump 146" again pumps the liquid via the fourth conduit 140D" past or through the first heat sink 210".

Advantageously, the cooling fluid (e.g., liquid) rapidly cools the PCM 135" in the sleeve(s) 130" to charge the PCM 135". Optionally, the second conduit 140B" in the sleeve(s) 130" extends in a coil like manner (e.g., in a spiral manner) through the sleeve(s) 130" to thereby increase the surface area of the second conduit 140B" that contacts the PCM 135", thereby increasing the amount of heat transfer between the cooling fluid and the PCM 135". This configuration of the second conduit 140B" advantageously results in more rapid cooling/charging of the PCM 135". In one example, the chamber 126" of the cooler container 1000" can be cooled to between about 2 and about 8 degrees Celsius (e.g., 0 degrees C., 1 degree C., 2 degrees C., 3 degrees C., 4 degrees C., 5 degrees C., 6 degrees C., 7 degrees C., 8 degrees C., 9 degrees C., 10 degrees C., etc.). Optionally, the reservoir 148" can have a valve (e.g., bleed valve) via which cooling fluid can be bled from the cooling system 200" or via which cooling fluid can be introduced into the cooling system 200".

The cooler container 1000" can optionally exclude batteries and electronics, such that the cooling system 200" does not operate while the cooler container 1000" is in transit (e.g., on a trailer, truck, airplane, boat, car, etc.). Rather, while in transit, the chamber 126" of the cooler container 1000" is cooled by the charged PCM 135" (e.g., the PCM 135" is the primary cooling mechanism for the chamber 126"). The cooling system 200' can optionally be operated when the cooler container 1000" is placed on a power base (e.g., at a home shipping location, at a hospital, etc.). For example, the cooler container 1000" can have electrical contacts that selectively contact electrical contacts on a power base when the cooler container 1000" is placed on the power base. The power base provides power to one or more of the TEC(s) 220", pump 146", and fan(s) 280", which operate (e.g., by circuitry in the container 1000") as described above to charge the PCM 135". Once the PCM 135" is charged, the cooler container 1000" can be removed from the power base and the chamber 126" filled with temperature sensitive contents (e.g., medicine, vaccines, tissue, etc.), and the cooler container 1000" can be shipped to its destination, as described above. The charged PCM 135" can operate to maintain the contents in the chamber 126" in a cooled state during transit of the cooler container 1000" to its destination.

As discussed above, the cooler containers 1000" can optionally be stacked on top of each other, with the bottom cooler container 1000" disposed on the power base, so that power is transferred from the power base up through the stack of cooler containers 1000" (e.g., the PCM 135" in all stacked containers 1000" are charged substantially simultaneously). In one example, each cooler container 1000" has an amount of cooling fluid in its closed loop cooling system 200" and power is transferred from each container 1000" to the one above it to operate its cooling system 200" to charge its PCM 135". However, this requires that each container 1000" have an amount of cooling fluid in it at all times.

In another example, the cooler container(s) 1000" can optionally have quick disconnect connections that allow for the conduit 140" of each stacked container 1000" to be in fluid communication with each other when the containers 1000" are stacked (e.g., each container 1000" has an open loop cooling system). In this example, the cooling system 200" (e.g., including the first heat sink 210", TEC(s) 220", second heat sink 230", fan(s) 280", pump 146" and reservoir 148") can be located in communication or housed in the power base, not in a vessel 100" of the cooler container(s) 1000". The power base can have quick disconnect connectors that removably couple with quick disconnect connectors on the container 1000" that is connected to the power base (e.g., quick disconnect connectors between different sections of the conduit 140", where some sections, such as 140A", 140C", 140B" are outside the container 1000'" and only conduit section 140B" is in the container 1000"), and each container 1000" can have quick disconnect connectors or valves that allow it to fluidly connect with a container 1000" placed on top of it (e.g., allow the conduit 140" of a container to fluidly connect with the conduit 140" of the container 1000" placed on top of it). Advantageously, this allows the PCM 135" in each of the stacked containers 1000" to be charged at the same time, and allows the reduction in weight and/or size of the cooler container 1000" (e.g., because the cooling system 200" and the cooling fluid is not housed in the container 1000" during transit of the container 1000"), thereby reducing freight cost of shipping the cooling container 1000".

FIGS. 27A-27B show a schematic view of a variation of the cooling container 1000". FIGS. 27A-B add fins 149" to the second conduit 140B" in the sleeve(s) 130" (e.g., the fins 149" would extends between walls of the sleeve(s) 130"), thereby increasing the surface area that is in contact with the PCM 135" and via which heat can be transferred between the PCM 135" and the second conduit 140B" to allow the cooling fluid to charge the PCM 135". Though the features below are described in connection with the cooler container assembly 1000", the features also apply to all cooler containers, such as cooler containers 1000', 1000", disclosed herein.

The container 1000" can have one or more temperature sensors Sn1 in communication with the conduit 140" (e.g., with the conduit section 140B"), one or more temperature sensors Sn2 in communication with the chamber 126", and/or one or more temperature sensors Sn3 in the sleeve(s) 130" (e.g., in thermal communication with the PCM 135"). The one or more temperature sensors Sn1, Sn2, Sn3 can communicate with the circuitry EM, and the circuitry EM can operate one or both of the TEC(s) 220" and fan(s) 280" based at least in part on the sensed temperature from the sensors Sn1, Sn2, and/or Sn3. The container 1000" can optionally have one or more sensors Ta that sense ambient temperature and communicate with the circuitry EM. The sensed temperature from the sensor Ta can provide an indication of humidity level to the circuitry EM, and the circuitry EM can operate one or both of the TEC(s) 220" and fan(s) 280" based at least in part on the sensed temperature from the sensor(s) Ta. The cooler container 1000" can optionally have a shutoff valve 147", which can be selectively actuated by the circuitry EM to inhibit (e.g., prevent) flow of liquid through the conduit 140" (e.g., when there is a malfunction in a component of the cooler container 1000", such as the pump 146" or TEC(s) 220"). In another implementation, one or more of the sensors S1-Sn can be one or more humidity sensors that sense a humidity in the chamber 126, 126" and/or a humidity outside the chamber 126, 126" (e.g., outside the cooler container 1000, 1000', 1000", 1000'") and communicates information indicative of said sensed humidity to the circuitry EM. The circuitry EM can optionally log or record the data from the humidity sensor(s) and/or can operate one or more components of the cooling system 200, 200", such as the TECs 220, 220" and fan(s)

280, 280" based at least in part on the sensed humidity information from the humidity sensor(s) (e.g., to maintain the chamber 126, 126', 126" at a desired temperature or temperature range).

With reference to FIG. 27B, air can enter the vessel 100" via one or more air intake openings 203", and be driven by one or more fans 280" though a channel or path 215" and past a first heat sink 230", where heat is transferred from the first heat sink 230" to the air. The air is then exhausted from the vessel 100" via one or more exhaust openings 205". Though FIG. 27B shows the intake openings 203" and exhaust openings 205" in the same plane or surface, in other implementations, the intake openings 203" and exhaust openings 205" can be on separate planes (e.g., separate planes oriented 180 degrees apart, separate planes oriented 90 degrees apart). For example, the exhaust openings 205" can be on a front surface of the container 1000" (e.g., a surface that has the display of the container 1000") and the intake openings 203" can be on a rear surface of the container 1000''' orientated 180 degrees apart. In another implementation, the exhaust openings 205" can be on a rear surface of the container 1000" and the intake openings 203" can be on a front surface of the container 1000''' (e.g., a surface that has the display of the container 1000") orientated 180 degrees apart.

Figure 27C:
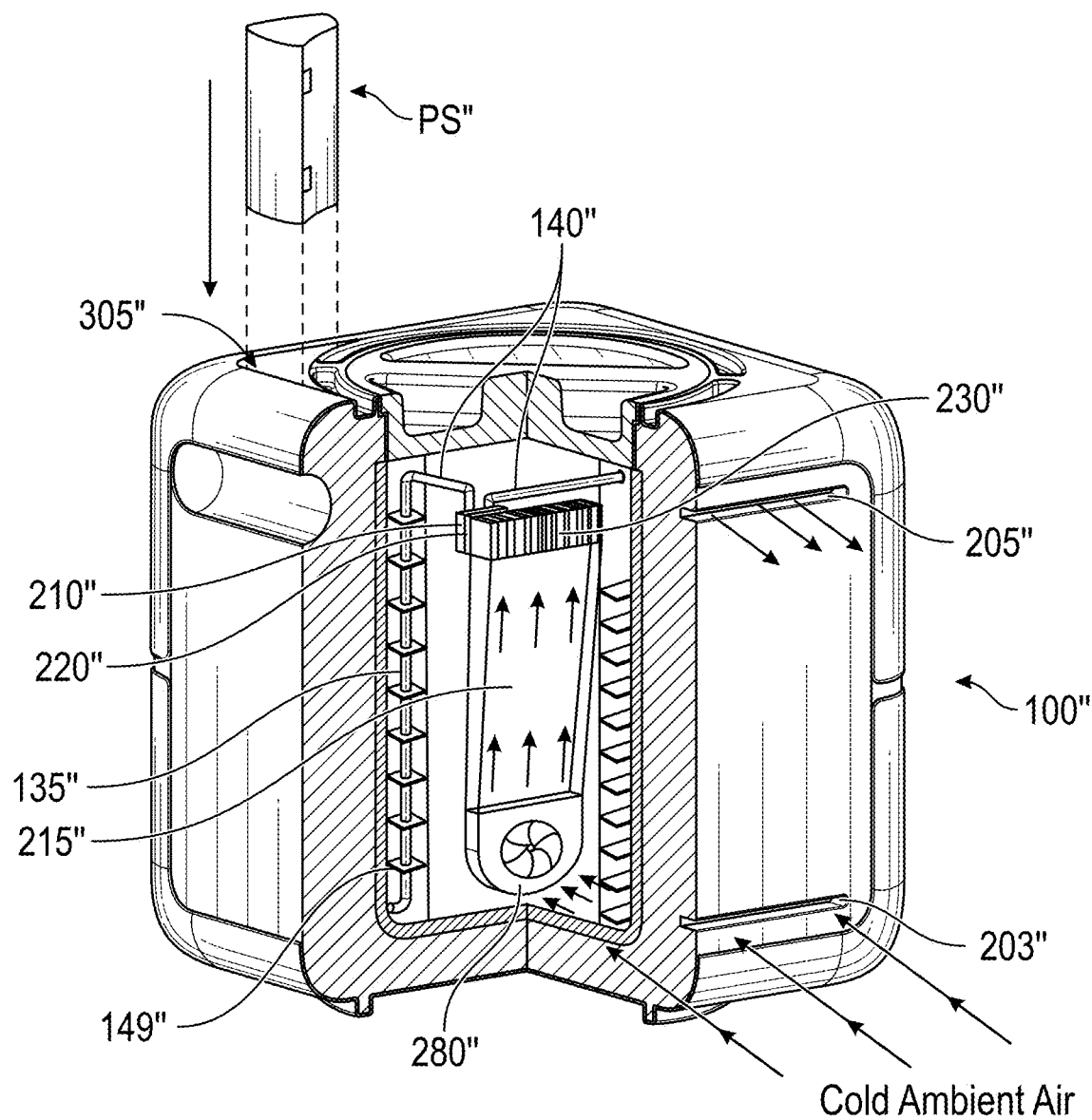
FIG. 27C is a partial cutaway view of an example cooler container system.

Optionally, the cooling system can be located in one corner (e.g., along one edge) of the cooler container 1000", as shown in FIG. 27B. In another implementation, the cooling system can be distributed about at least a portion of the chamber 126" (e.g., distributed completely about the chamber 126"). The first heat sink 230" is in thermal communication with one or more TEC(s) 220", which are in turn in thermal communication with a second heat sink 210" (e.g., a solid to liquid heat exchanger). The second heat sink 210" is in thermal communication with the conduit 140", which flow a fluid (e.g., a liquid, such as water) therethrough. The second heat sink 210" cools the fluid in the conduit 140" as it flows past the second heat sink 210", and transfers the heat to the TECs 220", which in turn transfers the heat to the first heat sink 230" that in turn transfers the heat to the air that is exhausted via the exhaust opening(s) 205". The cooled liquid in the conduit 140" charges the PCM 135" in the sleeve portion(s) 130" via the fins 149" (e.g., so that the phase change material or PCM 135" is in a state where it can absorb energy, such as to cool at least a portion of the chamber 126"). FIG. 27C show another implementation of the cooler container 1000" with the one or more removable batteries PS" that can be optionally installed to power one or both of the circuitry EM and TEC's 220", 220" or separate heater, as discussed above, to inhibit (e.g., prevent) one or more of the payload contents from freezing in cold weather or from exposure to high temperatures in hot weather.

Figure 28:
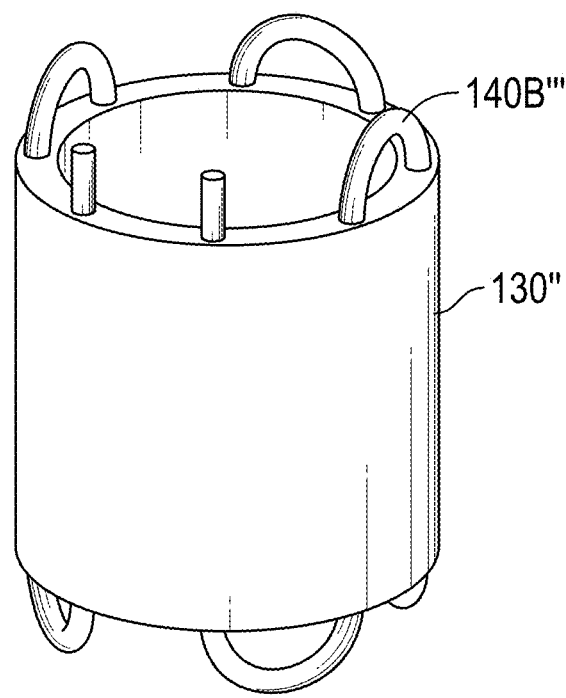
FIG. 28 is a schematic view of a portion of a cooler container system.

FIG. 28 is a schematic view of a variation of the cooler container 1000" in FIG. 26. The structure and description for the various features of the cooler container 1000" and how it's operated and controlled in FIGS. 1-26 are understood to apply to the corresponding features of the cooler container 1000" in FIG. 28, except as described below. Whereas FIG. 26 shows the second conduit 140B" oscillating horizontally, FIG. 28 shows the second conduit 140B''' oscillating vertically within the sleeve(s) 130". Though the features below are described in connection with the cooler container assembly 1000", the features also apply to all cooler containers, such as cooler containers 1000', 1000", disclosed herein.

Figure 29:
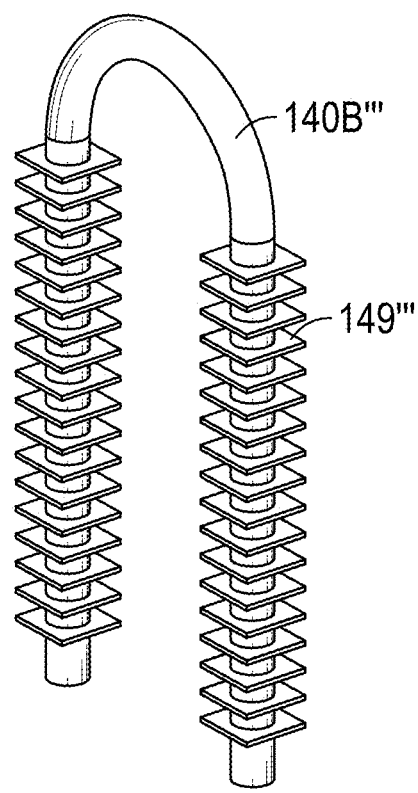
FIG. 29 is a schematic view of an example of a portion of a conduit of a cooler container system.

FIG. 29 is a schematic view of a variation of the cooler container 1000" in FIGS. 27A-B. The structure and description for the various features of the cooler container 1000" and how it's operated and controlled in FIGS. 1-27B are understood to apply to the corresponding features of the cooler container 1000" in FIG. 29, except as described below. Whereas FIGS. 27A-B shows the second conduit 140B" with fins 149" disposed about the conduit 140B" oscillating horizontally, FIG. 29 shows the second conduit 140B''' with fins 149''' disposed about the conduit 140B''' oscillating vertically within the sleeve(s) 130". Though the features below are described in connection with the cooler container assembly 1000", the features also apply to all cooler containers, such as cooler containers 1000', 1000", disclosed herein.

Figure 30:
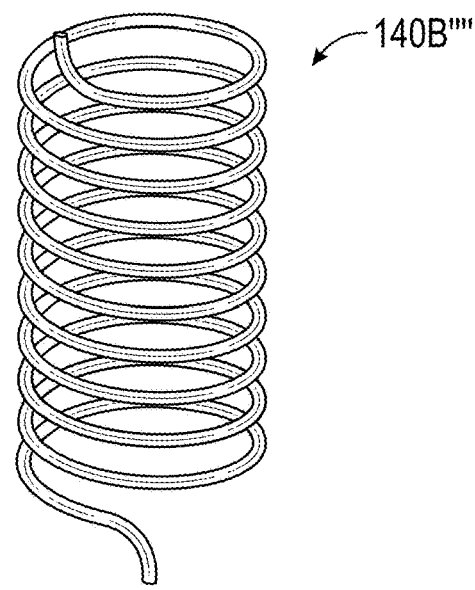
FIG. 30 is a schematic view of an example of a portion of a conduit of a cooler container system.

FIG. 30 is a schematic view of a variation of the cooler container 1000" in FIG. 26. The structure and description for the various features of the cooler container 1000" and how it's operated and controlled in FIGS. 1-26 are understood to apply to the corresponding features of the cooler container 1000" in FIG. 31, except as described below. Unlike the second conduit 104B" in FIG. 26, the second conduit 140B'''' extends in a spiral manner within the sleeve(s) 130" (where the sleeve 130" is excluded to more clearly show the shape of the conduit 140B"). Though the features below are described in connection with the cooler container assembly 1000", the features also apply to all cooler containers, such as cooler containers 1000', 1000", disclosed herein.

Figure 31:
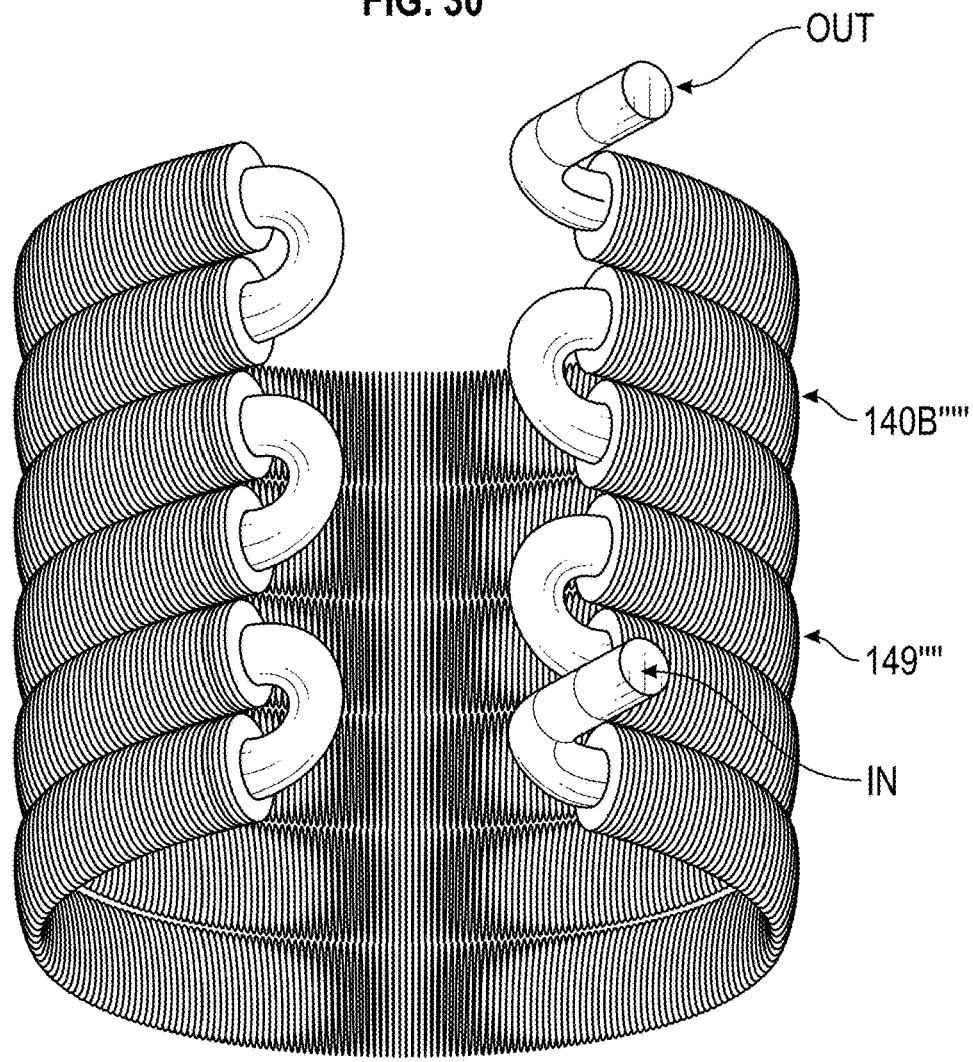
FIG. 31 is a schematic view of an example of a portion of conduit of a cooler container system.

FIG. 31 is a schematic view of a variation of the cooler container 1000" in FIG. 26. The structure and description for the various features of the cooler container 1000" and how it's operated and controlled in FIGS. 1-26 are understood to apply to the corresponding features of the cooler container 1000" in FIG. 31, except as described below. Unlike the second conduit 140B" in FIG. 26, the second conduit 140B'''' extends in a horizontal oscillating manner within the sleeve(s) 130" (where the sleeve 130" is excluded to more clearly show the shape of the conduit 140B"). Fins 149'''' are disposed about the conduit 140B'''' to aid in heat dissipation as discussed above. The second conduit 140B'''' extends between an inlet IN and an outlet OUT. Though the features below are described in connection with the cooler container assembly 1000", the features also apply to all cooler containers, such as cooler containers 1000', 1000", disclosed herein.

Figure 32:
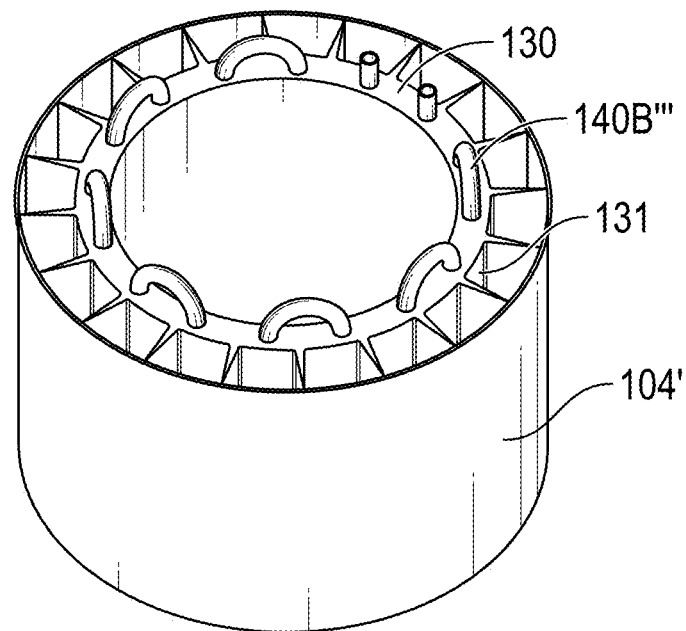
FIG. 32 is a schematic view of an example of a portion of a cooler container system.

FIG. 32 is a schematic view of a variation of the cooler container 1000" in FIG. 28. The structure and description for the various features of the cooler container 1000" and how it's operated and controlled in FIGS. 1-28 are understood to apply to the corresponding features of the cooler container 1000" in FIG. 32, except as described below. Unlike the cooler container 1000" in FIG. 28, FIG. 32 adds fins 131 that extend from an outer surface of the sleeve(s) 130" to an outer wall (e.g., fourth wall) 104'. Though the features below are described in connection with the cooler container assembly 1000", the features also apply to all cooler containers, such as cooler containers 1000', 1000", disclosed herein.

Figure 33:
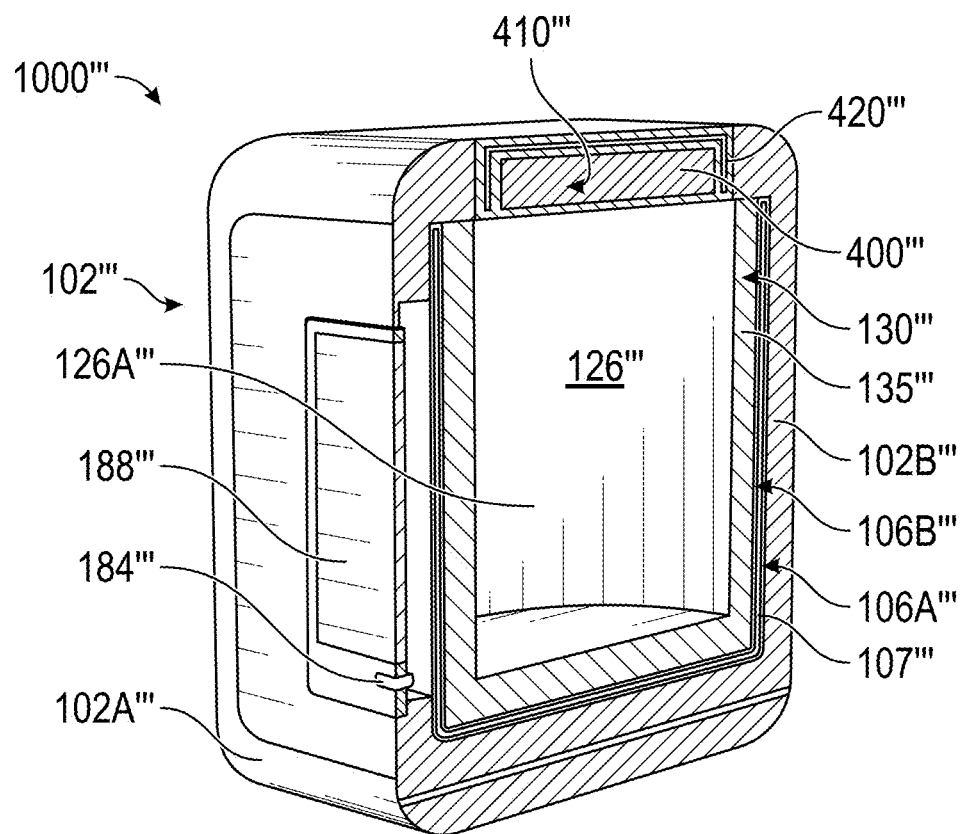
FIG. 33 is a schematic cross-sectional view of a cooler container.

FIG. 33 shows a schematic cross-sectional view of a cooler container 1000'''. Some of the features of the cooler container 1000''' are similar to features of the cooler container 1000 in FIGS. 1-24B. Thus, reference numerals used to designate the various components of the cooling container 1000''' are identical to those used for identifying the corresponding components of the cooling container 1000 in FIGS. 1-24B, except that a "'''" has been added to the numerical identifier. Therefore, the structure and description for the various features of the cooling container 1000 and how it's operated and controlled in FIGS. 1-24B are understood to also apply to the corresponding features of the cooling container 1000''' in FIG. 33, except as described below. Though the features below are described in connection with the cooler container assembly 1000''', the features also apply to all cooler containers, such as cooler containers 1000, 1000'', disclosed herein.

The cooler container 1000''' differs from the cooler container 1000 in various ways. For example, the cooler container 1000''' does not include any fans (such as the fan 280), nor any air intake openings (such as the intake openings 203). The cooler container 1000''' also does not include any thermoelectric modules or TECs (such as Peltier elements 220). Additionally, the cooler container 1000''' does not include a flow pathway for flowing air or another fluid through the container to cool the container. Though FIG. 33 shows a cross-section of the container 1000''', one of skill in the art will recognize that the container 1000''' in one implementation is symmetrical about the cross-sectional plane (e.g. the container has a generally box-like or cube outer shape, such as with a square cross-section along a transverse plane to the cross-sectional plane in FIG. 33), which can advantageously maximize the number of containers 1000''' that can be stored in a given volume (e.g., a delivery truck). The container 1000''' can have other suitable shapes (e.g., cylindrical, rectangular, etc.).

The cooler container 1000''' has a vessel 100''' an outer housing 102'''. Optionally, the outer housing 102''' has one or more portions. In the illustrated implementation, the outer housing 102''' optionally has two portions, including a first (e.g., outer) portion 102A''' and a second (e.g., inner) portion 102B'''. In other implementations, the outer housing 102''' can have fewer (e.g., one) or more (e.g., three, four, etc.) portions.

The first portion 102A''' optionally provides an outer shell. As shown in FIG. 33, the first portion 102A''' optionally covers at least some (e.g., but not all) of the outer surface of the container 1000'''. For example, in one implementation, the first portion 102A''' covers at least the edges of the container 1000'''. In one implementation, the first portion 102A''' only covers the edges of the container 1000'''. In one implementation, the first portion 102A''' is made of an impact resistant material, such as plastic. Other suitable materials can be used. In another implementation, the first portion 102A''' can additionally or alternatively be made of a thermally insulative material.

The second portion 102B''' is optionally made of a thermally insulative material, such as a foam material. Other suitable materials can be used. In another implementation, the second portion 102B''' can additionally or alternatively be made of an impact resistant (e.g., compressible) material.

In some implementations, the outer housing 102''' includes only the first portion 102A''' (e.g., the housing 102''' is defined only by the first portion 102A''') and excludes the second portion 102B'''. In some implementations, the outer housing 102''' includes only the second portion 102B''' (e.g., the housing 102''' is defined only by the second portion 102B''') and excludes the first portion 102A'''.

The container 1000''' also includes a vacuum-insulated chamber 107''' defined between an outer wall 106A''' and an inner wall 106B''' (e.g., a double-walled insulated chamber), where the walls 106A''', 106B''' extend along the circumference and base of the chamber 126''' of the container 1000'''. Therefore, the chamber 126''' that receives the perishable contents (e.g., medicine, food, other perishables, etc.) is surrounded about its circumference and base by the vacuum-insulated chamber 107''', which inhibits (e.g., prevents) heat transfer (e.g., loss of cooling) from the chamber 126''' via its circumference or base.

The cooler container 1000''' optionally includes a phase change material 135''' that can be disposed in the container 1000'''. In one implementation, the phase change material (PCM) 135''' or thermal mass is provided (e.g., contained) in a sleeve 130''' that is surrounded by the inner wall 106B''' and that defines an inner wall 126A''' of the chamber 126'''. In another implementation, the phase change material or thermal mass can alternatively be disposed in one or more packs (e.g., one or more ice packs) in the chamber 126''', where the chamber 126''' is defined by the inner wall 106B'''. In another implementation, the phase change material 135''' or thermal mass can be provided in a sleeve 130''' as well as in separate pack(s) (e.g., one or more ice packs) inserted into the chamber 126''' (e.g., about the perishable contents).

The chamber 126''' can be sealed with a lid 400'''. Optionally, the lid 400''' includes at least a portion 410''' made of a thermally insulative material (e.g., a foam material) to inhibit (e.g., prevent) heat transfer (e.g., loss of cooling) from the chamber 126''' via the opening in the top of the container 1000''' that is sealed with the lid 400'''. The lid 400''' optionally includes a double-walled vacuum-insulated structure 420''' that at least partially surrounds (e.g., surrounds an entirety of) a sidewall and a top wall of the portion 410''' of thermally insulative material, which can further inhibit (e.g., prevent) loss of cooling from the chamber 126'''. In another implementation, the lid 40''' can optionally be hollow and have a space into which a phase change material can be inserted to further reduce the heat transfer out of the chamber 126'''.

The container 1000''' includes an electronic display screen 188''' (e.g., on a side surface, on a top surface, of the container 1000'''). The display screen 188''' can optionally be an electronic ink or E-ink display (e.g., electrophoretic ink display). In another implementation, the display screen 188''' can be a digital display (e.g., liquid crystal display or LCD, light emitting diode or LED, etc.). Optionally, the display screen 188''' can display a label, as shown in FIG. 15, (e.g., a shipping label with one or more of an address of sender, an address of recipient, a Maxi Code machine readable symbol, a QR code, a routing code, a barcode, and a tracking number), but can optionally additionally or alternatively display other information (e.g., temperature history information, information on the contents of the container 1000''').

The cooler container assembly 1000''' can optionally also include a user interface 184'''. In FIG. 33, the user interface 184''' is on the side of the container 1000'''. In another implementation, the user interface 184''' is disposed on a top surface (e.g., a corner) of the housing 102''' of the container 1000''' and/or a surface of the lid 400'''. The user interface 184''' can optionally be a button (e.g., a "return home" button). In one implementation, the user interface 184''' is a depressible button. In another implementation, the user interface 184''' is a capacitive sensor (e.g., touch sensitive sensor, touch sensitive switch). In another implementation, the user interface 184''' is a sliding switch (e.g., sliding lever). In another implementation, the user interface 184''' is a rotatable dial. In still another implementation, the user interface 184''' can be a touch screen portion (e.g., separate from or incorporated as part of the display screen 188'''). Advantageously, actuation of the user interface 184''' can alter the information shown on the display 188''', such as the form of a shipping label shown on an E-ink display 188'''. For example, actuation of the user interface 184''', can switch the text associated with the sender and receiver, allowing the cooler container assembly 1000''' to be shipped back to the sender once the receiving party is done with it. Additionally or alternatively, actuation of the user interface

184''' causes (e.g., automatically causes) a signal to be sent by circuitry in the assembly 1000''', as discussed above, to a shipping carrier (e.g., UPS, FedEx, DHL) informing the shipping carrier that a shipping label (e.g., new shipping label) has been assigned to the portable cooler 1000''' and that the cooler is ready for pick-up and shipping.

Advantageously, the cooler container 1000, 1000', 1000", 1000''' can be reused multiple times (e.g., 500 times, 1000 times, 1500 times, 20000 times), providing a sustainable cooler container for the delivery of perishable material (e.g., medicine, food, other perishables). Additionally, the container 1000, 1000', 1000", 1000''' is easy to use and streamlines the shipping process. For example, the user interface 184''' (e.g., button) makes it easy to return the container without having to print a new shipping label and without having to separately contact the shipping carrier for pick-up, thereby improving the productivity of personnel handling the packages. The cooler containers 1000, 1000', 1000", 1000''' can be stacked, for example in columns of 6 containers 1000, 1000', 1000", 1000''', allowing a user to stack and unstack them without the need for a ladder.

Figure 34:
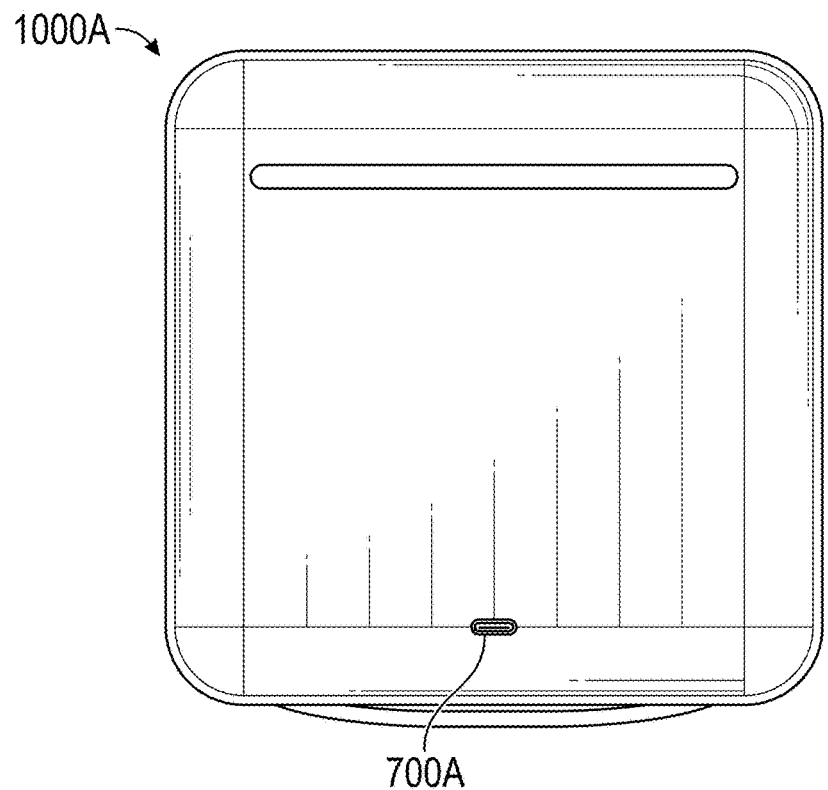
FIG. 34 is a schematic side view of a cooler container.

FIG. 34 shows a schematic view of a cooler container 1000A. Some of the features of the cooler container 1000A are similar to features of the cooler container 1000, 1000', 1000" or 1000''' in FIGS. 1-33. Thus, reference numerals used to designate the various components of the cooling container 1000A are identical to those used for identifying the corresponding components of the cooling container 1000, 1000', 1000" or 1000''' in FIGS. 1-33, except that an "A" has been added to the numerical identifier. Therefore, the structure and description for the various features of the cooling container 1000, 1000', 1000" or 1000''' and how it's operated and controlled in FIGS. 1-33 are understood to also apply to the corresponding features of the cooling container 1000A in FIG. 34, except as described below. Though the features below are described in connection with the cooler container assembly 1000A, the features also apply to all cooler containers, such as cooler containers 1000, 1000', 1000" or 1000''', disclosed herein.

The cooler container 1000A, in addition to including the features of the cooler container 1000, 1000', 1000" or 1000''', also includes one or more (e.g., a plurality of) electrical connectors 700A on a surface thereof, that can be connected to a power cable to provide power from a power source (e.g., AC power such as wall power, DC power from a battery or vehicle) to the electronics 180 and/or cooling system 200, 200", as further discussed below. The one or more electrical connectors 700A can be any suitable electrical connector (e.g., a USB connector, a Mini DisplayPort or MDP connector, a THUNDERBOLT™ connector). FIG. 34 shows the electrical connector 700A as a USB-c connector. In another implementation, the connector 700A can be a USB-A (e.g., USB 1.1-2.0 A or mini-A or micro-A, USB 3.0 A) or a USB-B (e.g., USB 1.1-2.0 B or mini-B or micro-B, USB 3.0 B) connector.

Figure 35:
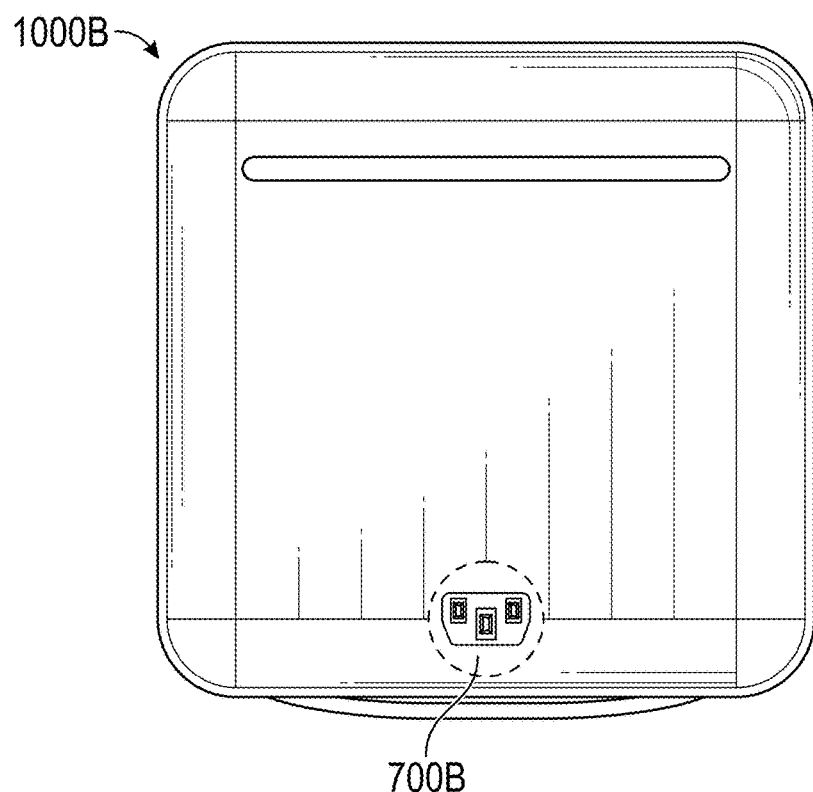
FIG. 35 is a schematic side view of a cooler container.

FIG. 35 shows a schematic view of a cooler container 1000B. Some of the features of the cooler container 1000B are similar to features of the cooler container 1000, 1000', 1000", or 1000''' or 1000A in FIGS. 1-34. Thus, reference numerals used to designate the various components of the cooling container 1000B are identical to those used for identifying the corresponding components of the cooling container 1000, 1000', 1000", 1000''' or 1000A in FIGS. 1-34, except that an "B" has been added to the numerical identifier. Therefore, the structure and description for the various features of the cooling container 1000, 1000', 1000", 1000''' or 1000A and how it's operated and controlled in FIGS. 1-34 are understood to also apply to the corresponding features of the cooling container 1000B in FIG. 35, except as described below. Though the features below are described in connection with the cooler container assembly 1000B, the features also apply to all cooler containers, such as cooler containers 1000, 1000', 1000", 1000''' or 1000A, disclosed herein.

The cooler container 1000B, in addition to including the features of the cooler container 1000, 1000', 1000" or 1000''', also includes one or more (e.g., a plurality of) electrical connectors 700B on a surface thereof, that can be connected to a power cable to provide power from a power source (e.g., AC power such as wall power, DC power from a battery or vehicle) to the electronics 180 and/or cooling system 200, 200", as further discussed below. FIG. 35 shows the electrical connector 700B as an Edison type male connector, such as a male 3-blade connector. In another implementation, the connector 700B can have two blades or can be a female connector or socket.

Figure 36A:
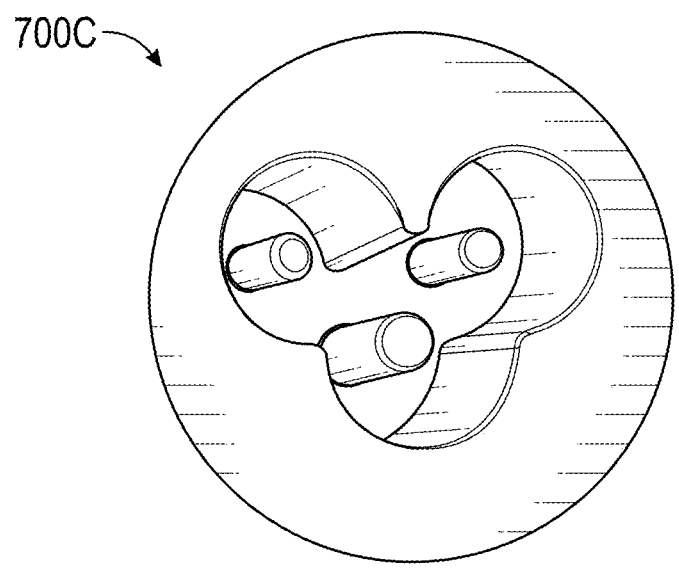
FIG. 36A is a schematic view of an electrical connector of a cooler container.
Figure 36B:
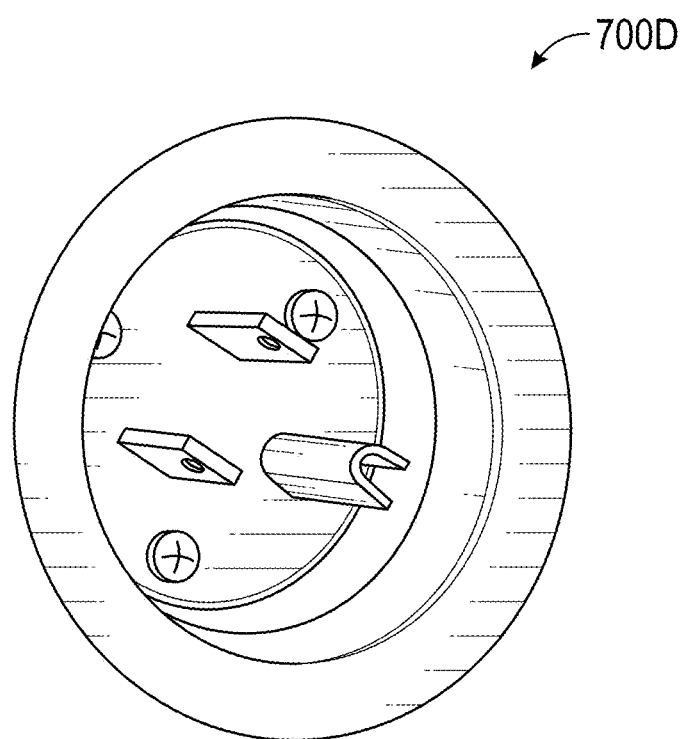
FIG. 36B is a schematic view of an electrical connector of a cooler container.

FIGS. 36A-36B show an electrical connector 700C, 700D that can be implemented in the cooler container 1000A, 1000B discussed above.

Figure 37:
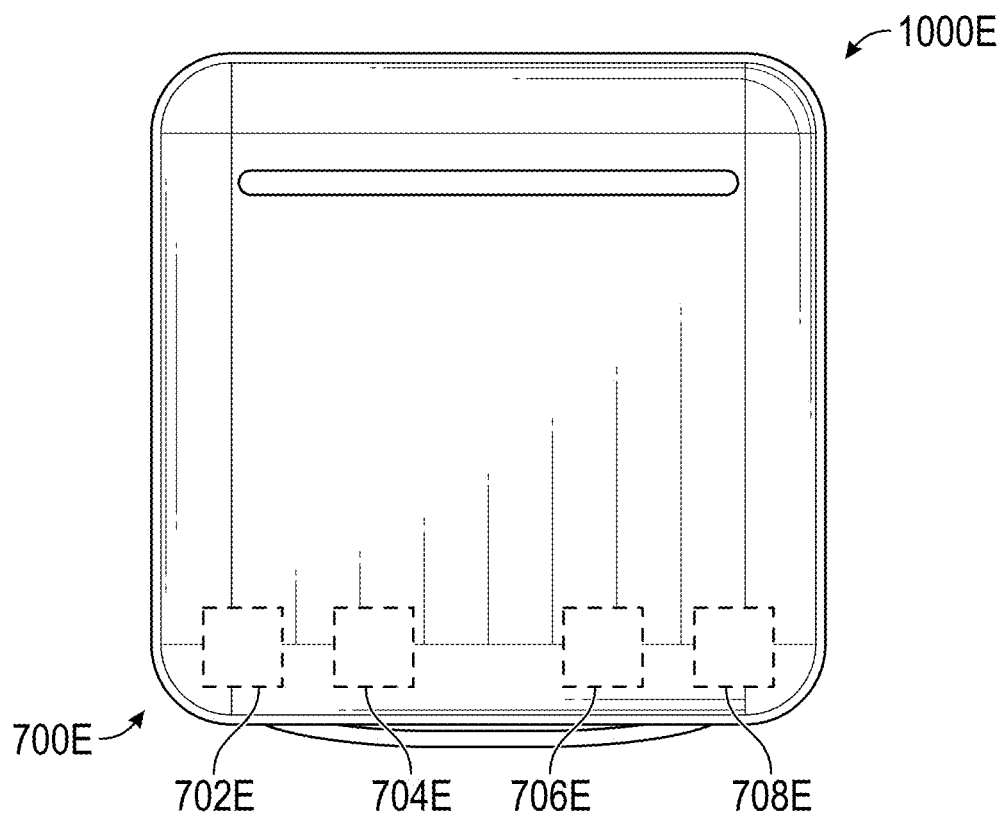
FIG. 37 is a schematic side view of a cooler container.

FIG. 37 shows a schematic view of a cooler container 1000E. Some of the features of the cooler container 1000E are similar to features of the cooler container 1000, 1000', 1000", or 1000''', 1000A or 1000B in FIGS. 1-35. Thus, reference numerals used to designate the various components of the cooling container 1000E are identical to those used for identifying the corresponding components of the cooling container 1000, 1000', 1000", 1000''', 1000A or 1000B in FIGS. 1-35, except that an "E" has been added to the numerical identifier. Therefore, the structure and description for the various features of the cooling container 1000, 1000', 1000", 1000''', 1000A or 1000B and how it's operated and controlled in FIGS. 1-35 are understood to also apply to the corresponding features of the cooling container 1000E in FIG. 37, except as described below. Though the features below are described in connection with the cooler container assembly 1000E, the features also apply to all cooler containers, such as cooler containers 1000, 1000', 1000", 1000''', 1000A or 1000B, disclosed herein.

The cooler container 1000E, in addition to including the features of the cooler container 1000, 1000', 1000" or 1000''', also includes a plurality of electrical connectors 700E (e.g., connectors 702E, 704E, 706E, 708E) on a surface thereof, that can be connected to a power cable to provide power from a power source (e.g., AC power such as wall power, DC power from a battery or vehicle) to the electronics 180 and/or cooling system 200, 200", as further discussed below. The plurality of electrical connectors 700E can be of different types, allowing a user to connect different types of power cables to the cooler container 1000E (e.g., depending on the type of power cable they have available). For example, one of the electrical connectors 700E (e.g., connector 702E) can be one type of connector (e.g., one of connectors 700A, 700B, 700C or 700D described above, another of the electrical connectors 700E (e.g., connector 704E) can be another type of connector (e.g., another of connectors 700A, 700B, 700C or 700D) and different than the connector 702E. In one implementation, each of the connectors 700E of the cooler container 1000E is a different type of connector.

As discussed above, the electrical connector(s) 700A, 700B, 700C, 700D, 700E can be coupled to a power cable to delivery power from a power source (e.g., wall power) to the electronics 180 and/or cooling system 200, 200", for example to operate the one or more TECs (e.g., Peltier elements) 220, 220''' and/or fan(s) 280, 280''', 216 and/or pump 146''', for example to cool (e.g. charge) the PCM 135, 135'', 135''' or thermal mass in the cooler container 1000A, 1000B, 1000E to in turn cool the payload chamber of the cooler container 1000A, 1000B, 1000E to cool the payload (e.g., temperature sensitive contents, such as medicine, food, beverages, etc.). The electrical connector(s) 700A, 700B, 700C, 700D, 700E can be in electrical communication with the circuitry EM of the cooler container 1000A, 1000B, 1000E.

Figure 38:
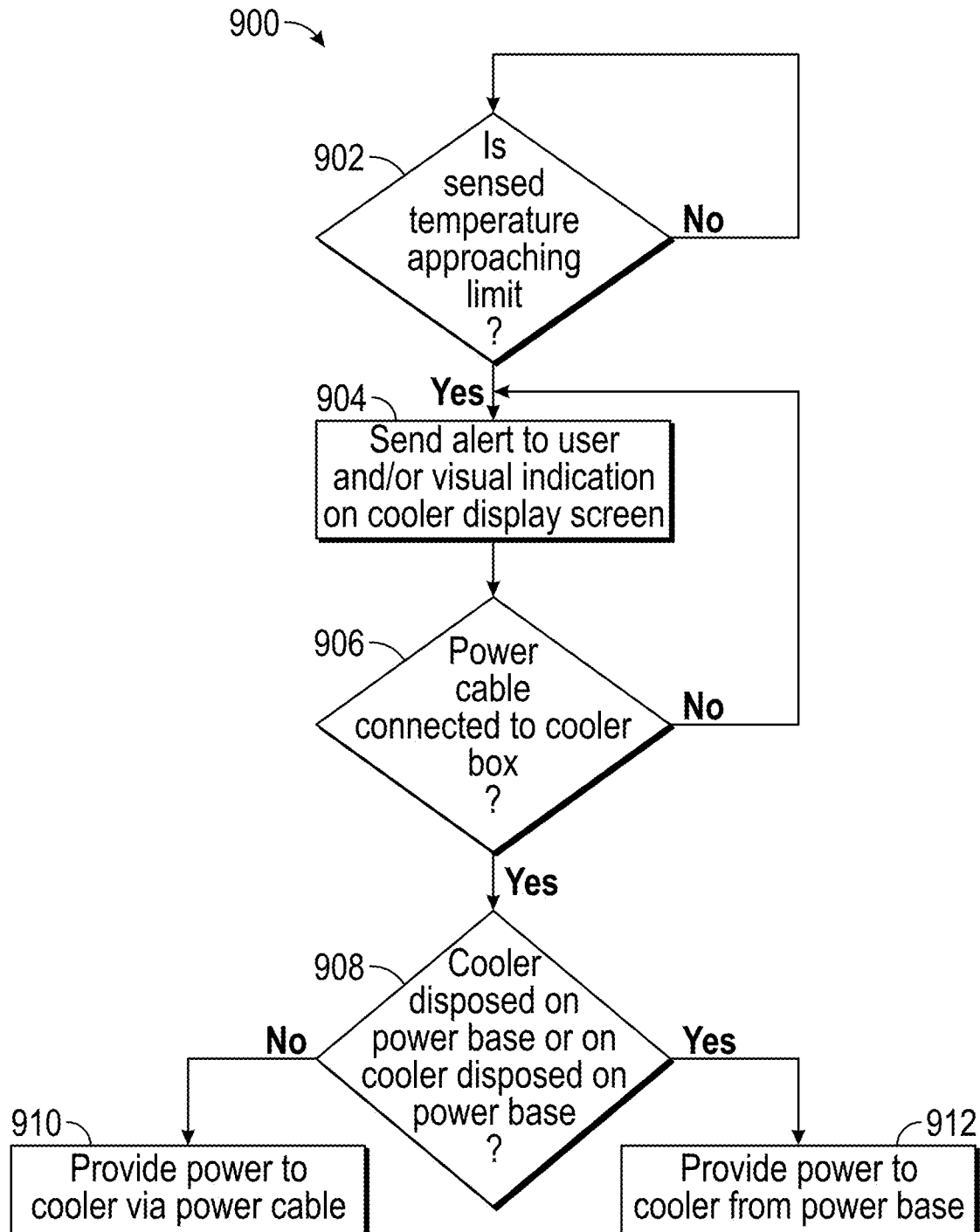
FIG. 38 shows an example process for operating the cooler container.

FIG. 38 shows a flowchart of a process 900 in the operation of the cooler container 1000A, 1000B, 1000E. At block 902, a determination is made (e.g., by the circuitry EM) that sensed temperature (e.g., in the payload chamber) is approaching a limit (e.g., increasing toward a temperature limit prescribed for the payload in the chamber). For example, a determination is made that the sensed temperature is within a predetermined number of degrees from the temperature limit. In another example, a determination is made that the sensed temperature has exceeded the predetermined temperature limit.

At block 904, an alert is sent to a user (e.g., wirelessly, such as by the circuitry EM) once the sensed temperature is determined to be approaching (or has exceeded) the temperature limit. For example, the alert can be sent to a remote electronic device, such as a smartphone or tablet computer or networked computer. Optionally, a visual alert can also be provided on the display screen of the cooler container. The alert can indicate (e.g., to the recipient) that the temperature limit is about to be (or has been) exceeded, and that a power cord should be connected to the cooler container to provide power to the cooling system 200, 200''' in the cooler container.

At block 906, a determination is made (e.g., by the circuitry EM) whether a power cable has been connected to the cooler container. An alert continues to be sent to the user until the power cable is connected to the cooler container.

At block 908, a determination is made (e.g., by the circuitry EM) whether the cooler container is disposed on a power base or charging base (such as charging base 500), or disposed on a cooler container that is in electrical communication with the power or charging base. At block 910, if it is determined (e.g., by the circuitry EM) that the cooler container is not disposed on a power/charging base (such as charging base 500) or disposed on a cooler container that is in electrical communication with the power/charging base, the circuitry (e.g., circuitry EM) of the cooler container controls delivery of power from the power cable connected to the electrical connector(s) 700A, 700B, 700C, 700D, 700E to the electronics 180 or cooling system 200, 200'''. At block 912, if it is determined (e.g., by the circuitry EM) that the cooler container is disposed on a power/charging base (such as charging base 500) or disposed on a cooler container that is in electrical communication with the power/charging base, the circuitry (e.g., circuitry EM) of the cooler container controls delivery of power from the power/charging base to the electronics 180 or cooling system 200, 200''' (even if the power cable is connected to the electrical connector(s) 700A, 700B, 700C, 700D, 700E). That is, if the cooler container is disposed on, or in electrical communication with a power/charging base, the circuitry does not transfer power from the power cable to the electronics 180 or cooling system 200, 200''' in the cooler container.

Figure 39:
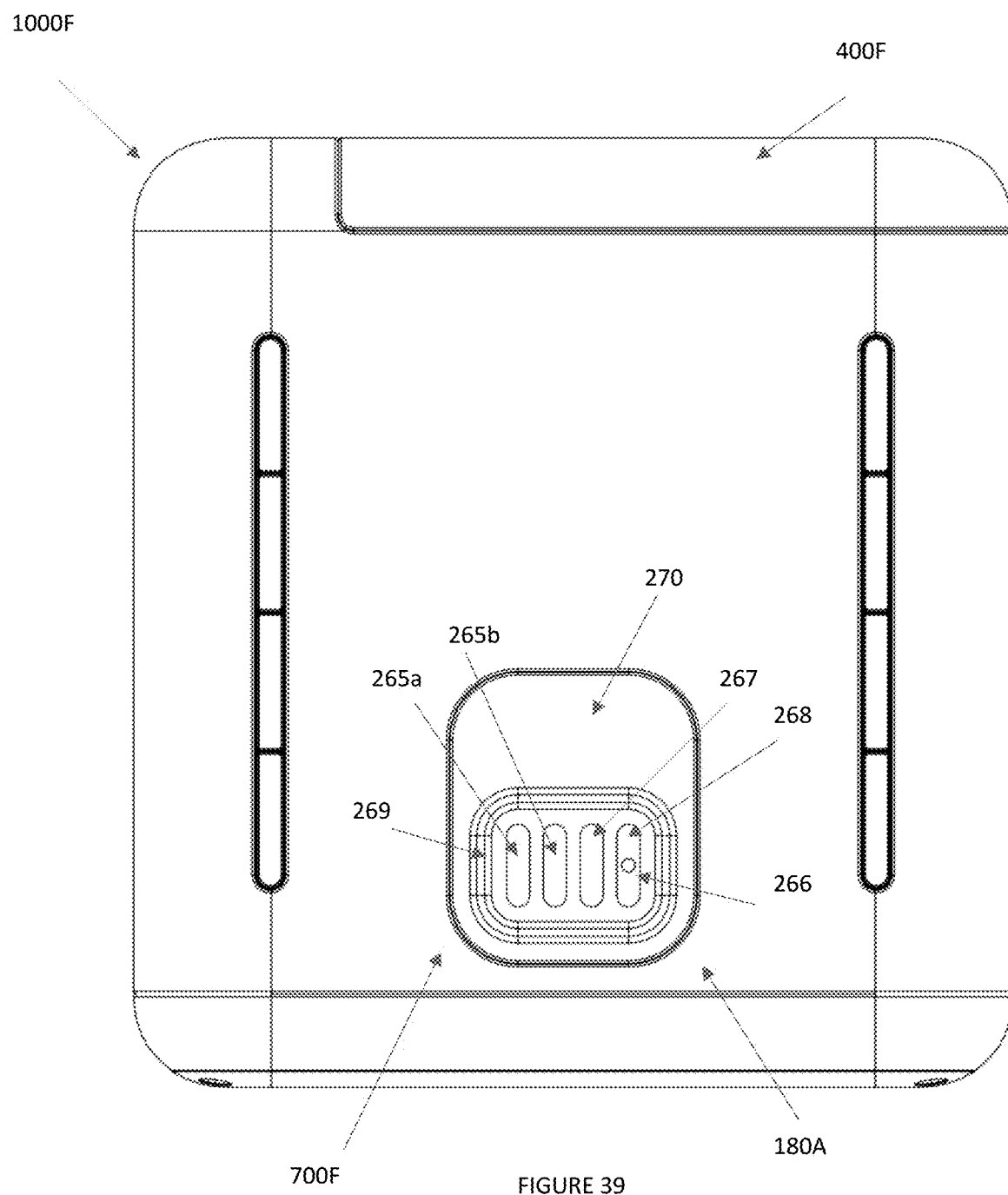
FIG. 39 is a schematic side view of a cooler container.

FIG. 39 shows a schematic view of a cooler container 1000F. Some of the features of the cooler container 1000F are similar to features of the cooler container 1000, 1000', 1000'', 1000''', 1000A, 1000B or 1000E in FIGS. 1-37.

Thus, reference numerals used to designate the various components of the cooling container 1000F are identical to those used for identifying the corresponding components of the cooling container 1000, 1000', 1000'', 1000''', 1000A, 1000B, or 1000E in FIGS. 1-37, except that an "F" has been added to the numerical identifier. Therefore, the structure and description for the various features of the cooling container 1000, 1000', 1000'', 1000''', 1000A, 1000B or 1000E and how it's operated and controlled in FIGS. 1-37 are understood to also apply to the corresponding features of the cooling container 1000F in FIG. 39, except as described below. Though the features below are described in connection with the cooler container assembly 1000F, the features also apply to all cooler containers, such as cooler containers 1000, 1000', 1000'', 1000''', 1000A, 1000B or 1000E disclosed herein.

The cooler container 1000F, in addition to including the features of the cooler container 1000, 1000', 1000'' or 1000''', also includes an electrical connector unit 700F on a surface thereof. The cooler container 1000F has a lid 400F that can be opened to access a payload chamber that can hold temperature sensitive goods (e.g., medicine). The electrical connector unit 700F can include a first electrical contact 265a and a second electrical contact 265b. One of the first and second electrical contacts 265a, 265b can be the positive connection and the other of the first and second electrical contacts 265a, 265b can be the negative connection. The first and second electrical contacts 265a, 265b advantageously allow power, for example around 80 Watts of power, 12 V and 6-7 Amps to be delivered to the cooler container 1000F, as further described below. Optionally, the cooler container 1000F can include electrical contacts (such as electrical contacts 32, 34 described above in connection with the cooler container 1000 in FIGS. 1-19) on an upper (e.g., top) end and lower (e.g. bottom) end of the cooler container 1000F, to allow one or both of power and data (e.g., sensed by one or more sensors of the cooler container 1000F) to the communicated between stacked cooler containers 1000F.

The electrical connector unit 700F can include a third electrical contact 267 that can be used to transfer data from the cooler container 1000F as further described below. The electrical connector unit 700F can include a power connector 266 (e.g., a female power connector that receives an AC power jack plug connector). In other implementations, the power connector 266 can be any of the connectors 700A, 700B, 700C, 700D, 700E disclosed above, such as a USB connector (e.g., USB-C connector, USB 3.1 connector). The power connector 266 can optionally be covered by a movable flap 268. The electrical contacts 265a, 265b, 267 and power connector 266 can be in a portion 269 of the cooler container 1000F that is recessed relative to a surrounding portion of the cooler container 1000F. In another implementation, the electrical contacts 265a, 265b, 267 and power connector 266 can be in a portion 269 of the cooler container 1000F that protrudes relative to a surrounding portion of the cooler container 1000F. With continued reference to FIG. 39, a metal surface or plate 270 (e.g., magnetic surface or plate) can be proximate (e.g., adjacent to, next to, at least partially around, completely around) the portion 269, which can advantageously facilitate the alignment of the cooler container 1000F during power transfer, as further discussed below.

Figure 40:
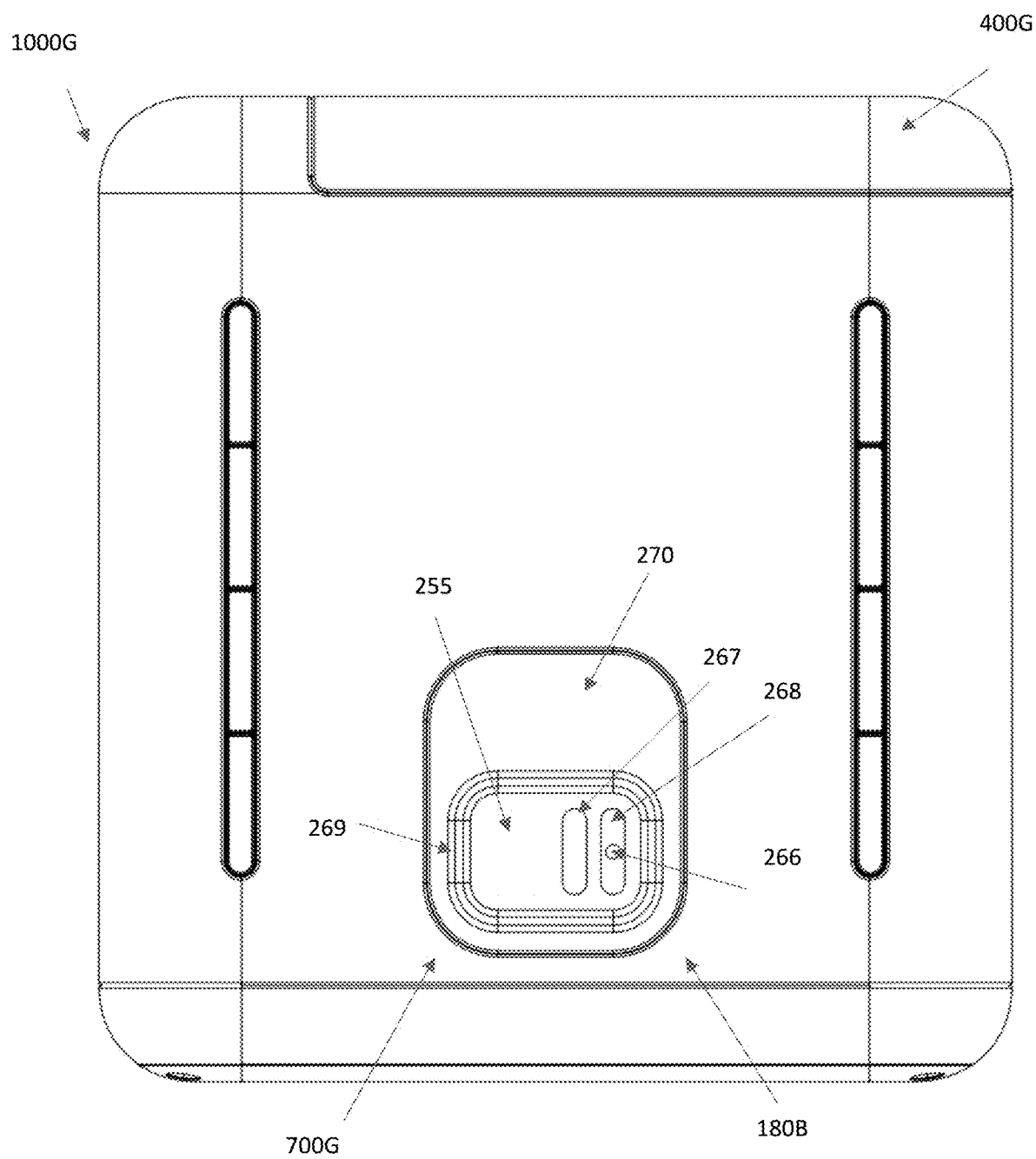
FIG. 40 is a schematic side view of a cooler container.

FIG. 40 shows a schematic view of a cooler container 1000G. Some of the features of the cooler container 1000F are similar to features of the cooler container 1000, 1000', 1000'', 1000''', 1000A, 1000B, 1000E or 1000F in FIGS. 1-39. Thus, reference numerals used to designate the various components of the cooling container 1000G are identical to those used for identifying the corresponding components of the cooling container 1000, 1000', 1000", 1000'", 1000A, 1000B, 1000E or 1000F in FIGS. 1-39, except that a "G" has been added to the numerical identifier. Therefore, the structure and description for the various features of the cooling container 1000, 1000', 1000", 1000'", 1000A, 1000B, 1000E or 1000F and how it's operated and controlled in FIGS. 1-39 are understood to also apply to the corresponding features of the cooling container 1000G in FIG. 40, except as described below. Though the features below are described in connection with the cooler container assembly 1000F, the features also apply to all cooler containers, such as cooler containers 1000, 1000', 1000", 1000'", 1000A, 1000B, 1000E or 1000F disclosed herein.

The cooler container 1000G differs from the cooler container 1000F in that the first and second electrical contacts 265a, 265b are excluded. Rather, the cooler container 1000G has a wireless power receiver 255 (e.g., inductive power receiver) via which the cooler container 1000G wirelessly receives power, as further discussed below. All other aspects of the cooler container 1000G are similar (e.g., identical) to the cooler container 1000F described above.

Figure 41A:
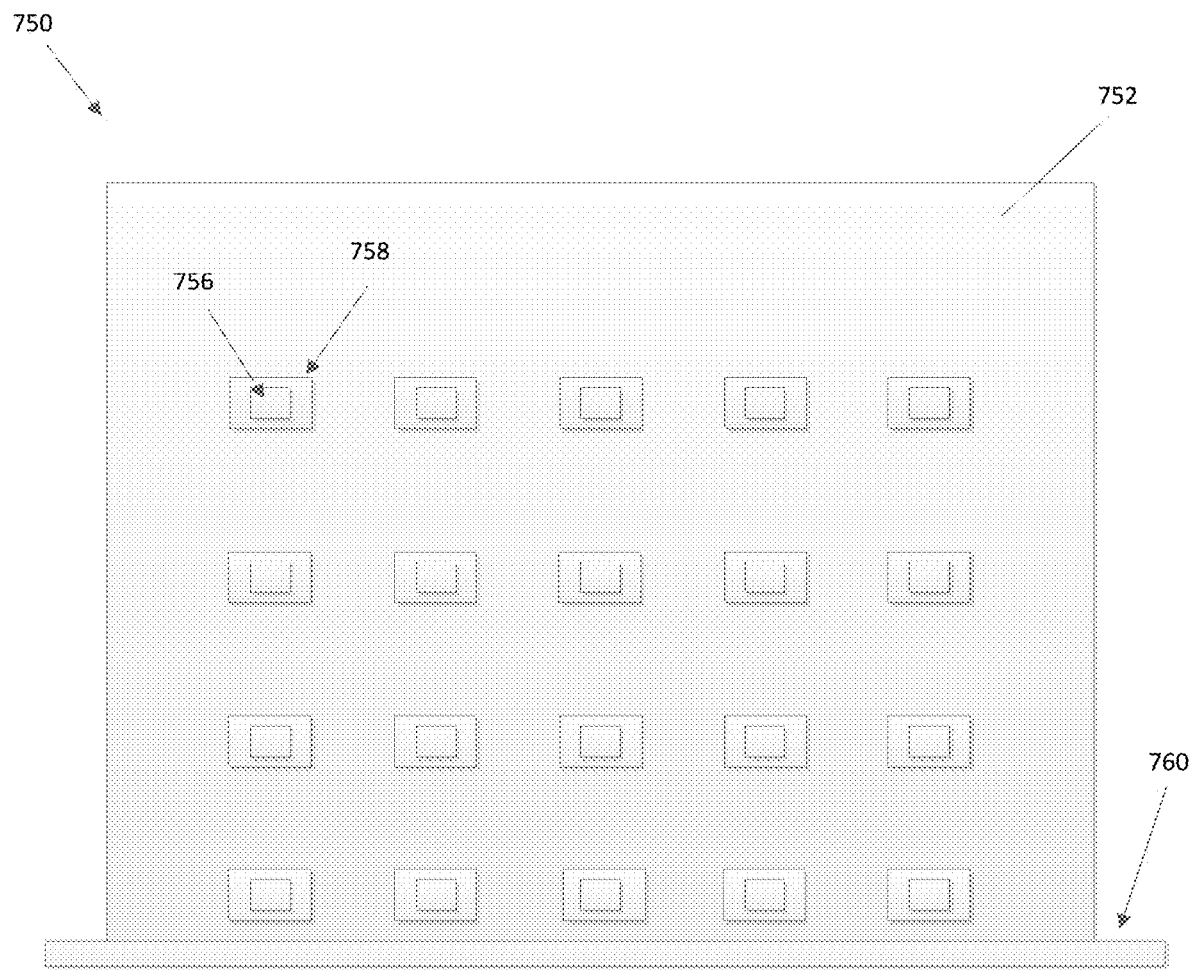
FIG. 41A is a schematic front view of a wall or tower that transfers power to the containers.
Figure 41B:
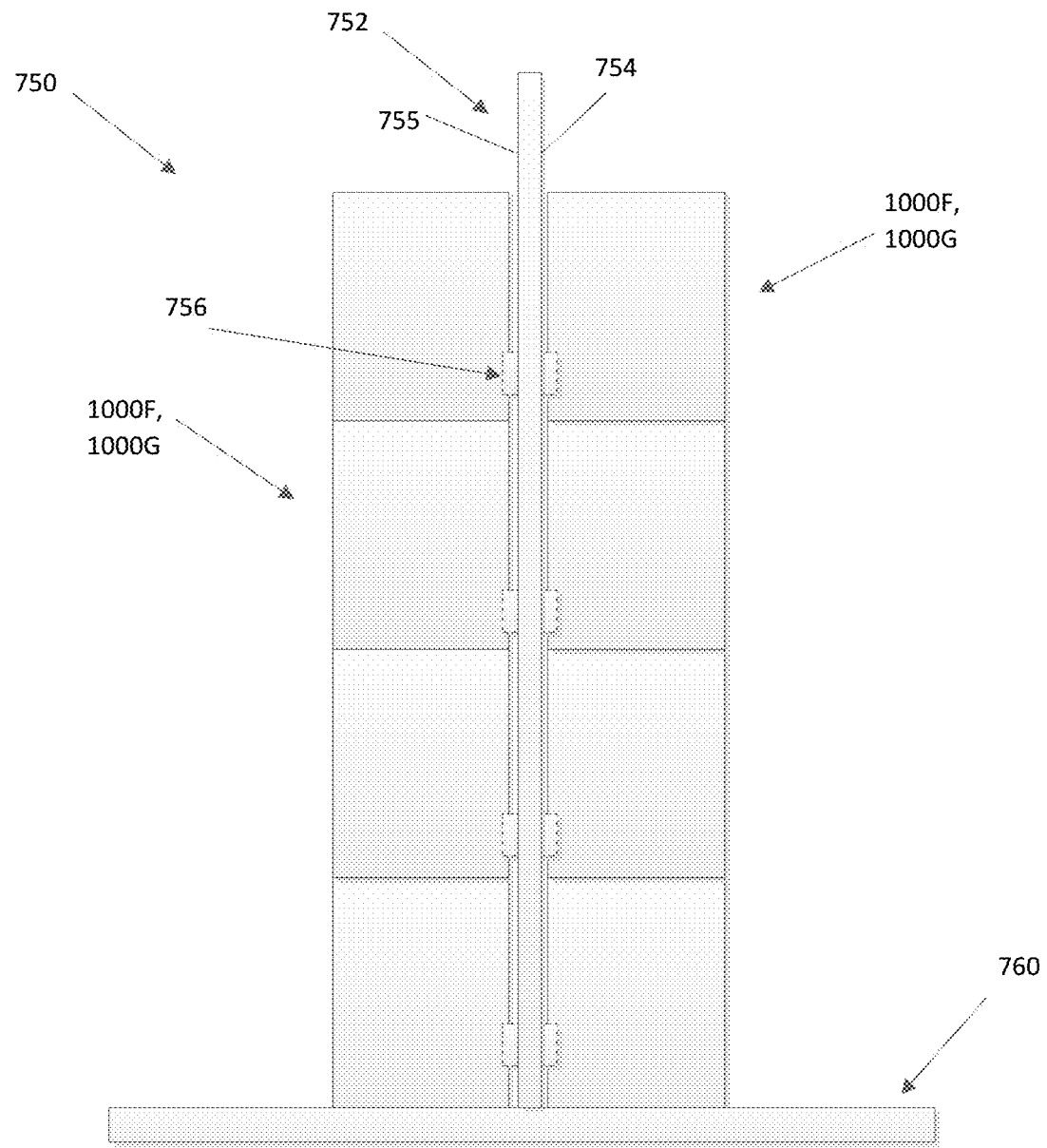
FIG. 41B is a schematic side view of multiple cooler containers proximate the wall or tower of FIG. 41A that transfers power to the containers.

FIGS. 41A-41B show a power and data transfer unit 750 that can be used to provide power to one or more (e.g., multiple) cooler containers 1000F, 1000G and/or receive data from the one or more (e.g., multiple) cooler containers 1000F, 1000G. The power and data unit 750 can be disposed within a perimeter (e.g., in a room, warehouse, order fulfillment center, etc.). Though the power and data transfer unit 750 is described below in connection with the cooler containers 1000F, 1000G, the features of the power and data unit 750 also apply for use with all cooler containers, such as cooler containers 1000, 1000', 1000", 1000'", 1000A, 1000B or 1000E disclosed herein.

In one implementation, the power and data transfer unit 750 includes a tower or wall 752 with multiple electrical connector units or interfaces 756 with corresponding contacts to couple to the electrical connector unit 700F, 700G of the cooler containers 1000F, 1000G. For example, the electrical connector unit(s) 756 can have corresponding contacts to couple to (e.g., engage, electrically communicate with) the first, second and third electrical contacts 265a, 265b, 267 for the cooler container 1000F. In another implementation, the power and data transfer unit 750 (e.g., electrical connector unit 756) can have a wireless power transmitter for wirelessly transferring power (e.g., via inductive coupling) to the cooler container 1000G. In one implementation, the electrical connector unit(s) 756 can have a form factor that fits with the form factor of the portion 269 of the cooler container 1000F, 1000G. For example, where the portion 269 is recessed relative to surrounding portions of the cooler container 1000F, 1000G, the electrical connector unit(s) 756 can protrude relative to a surface of the tower or wall 752 and extend into the recessed portion 269 of the cooler container 1000F, 1000G. In another example, where the portion 269 protrudes relative to surrounding portions of the cooler container 1000F, 1000G, the electrical connector unit(s) 756 can be recessed relative to the surface of the tower or wall 752 and receive the protruding portion 269 of the cooler container 1000F, 1000G.

Each of the electrical connector unit(s) 756 of the tower or wall 752 can have one or more magnets 758 (e.g., magnetic plate, magnetic surface) that is proximate (e.g., adjacent to, next to, at least partially around, completely around) the electrical connector unit 756. Advantageously, when the cooler container 1000F, 1000G is placed proximate (e.g., next to, adjacent to, or abut against) the tower or wall 752, the magnet(s) 758 can exert a magnetic force on the metal surface or plate 270 of the cooler container 1000F, 1000G to urge the portion 269 into engagement with (e.g., contact with, proximity with) the respective electrical connector unit 756 to allow for power transfer from the power and data transfer unit 750 to the cooler container 1000F, 1000G and/or data transfer from the cooler container 1000F, 1000G to the power and data transfer unit 750.

With continued reference to FIG. 41A, the electrical connector unit(s) 756 can be arranged in one or more rows and one or more columns and spaced apart from each other to allow stacked containers 1000F, 1000G to engage the respective electrical connector unit(s) 756 in a column. Advantageously, the power and data unit 750 can allow the transfer of power to multiple cooler containers 1000F, 1000G simultaneously and/or the simultaneous transfer of data from multiple cooler containers 1000F, 1000G to the power and data transfer unit 750. Optionally, the power and data transfer unit 750 can have a platform or base 760 on which the cooler containers 1000F, 1000G are placed.

FIG. 41B shows a side view of one implementation of the power and data transfer unit 750, where the tower or wall 752 has a first surface 754 against which one or more cooler containers 1000F, 1000G can be stacked and couple with (e.g., engage with) respective electrical connector unit(s) 756, and a second (opposite) surface 755 against which one or more cooler containers 1000F, 1000G can be stacked and couple with (e.g., engage with) respective electrical connector unit(s) 756. Advantageously, the power and data unit 750 maximizes the number of cooler containers 1000F, 1000G it can engage with for power and/or data transfer. In the illustrated implementation, the electrical connector unit(s) 756 protrude from the surfaces 754, 755 and engage (e.g., extend into) recessed portions 269 of the cooler containers 1000F, 1000G. In another implementation, the electrical connector unit(s) 756 are recessed in the surfaces 754, 755 and engage (e.g., receive) protruding portions 269 of the cooler containers 1000F, 1000G.

In operation, a user can stack cooler containers 1000F, 1000G against the wall or tower 752 to transfer power to the cooler containers 1000F, 1000G from the power and data transfer unit 750 and/or transfer data from the cooler containers 1000F, 1000G to the power and data transfer unit 750. In one implementation, the power and data transfer unit 750 can evaluate the data (e.g., sensed temperature data) and/or run a diagnostic evaluation while the cooler containers 1000F, 1000G are coupled to the wall or tower 752 to determine if the cooler container 1000F, 1000G is in good operating condition (e.g., if the PCM is retaining temperature, if the electronics 180A, 180B, discussed below, are working well). If a cooler container 1000F, 1000G is determined, based on said diagnostic evaluation, to not be working properly or to be malfunctioning or disabled (e.g., PCM not working properly, pump or fan not working properly), the power and data transfer unit 750 can communicate an alert notice (e.g., to a remote electronic device) and/or display a visual alert (e.g., via a visual indicator next to the location of the cooler container 1000F, 1000G on the wall or tower 752 to indicate the cooler container 1000F, 1000G should not be used and needs maintenance. The wall or tower 752 can have visual indicators (e.g., LED lights) proximate (e.g., next to, adjacent) the location of the cooler containers 1000F, 1000G on the wall or tower 752 that can illuminate to indicate that, for example, the cooler container 1000F, 1000G is in the process of charging (e.g., charging the PCM, charging the power storage elements PS), the cooler container 1000F, 1000G is fully charged (e.g., PCM fully charged, power storage elements PS fully charged) and ready for use, of the cooler container 1000F, 1000G is malfunctioning and needs maintenance. In another implementation, the current state (e.g., charge status or need for maintenance) described above can additionally or alternatively be displayed on the display screen (e.g., display screen 188, 188', 188''') of the cooler container (e.g., the cooler container 1000, 1000', 1000'', 1000''', 1000A, 1000B, 1000E, 1000F, 1000G).

Figure 42A:
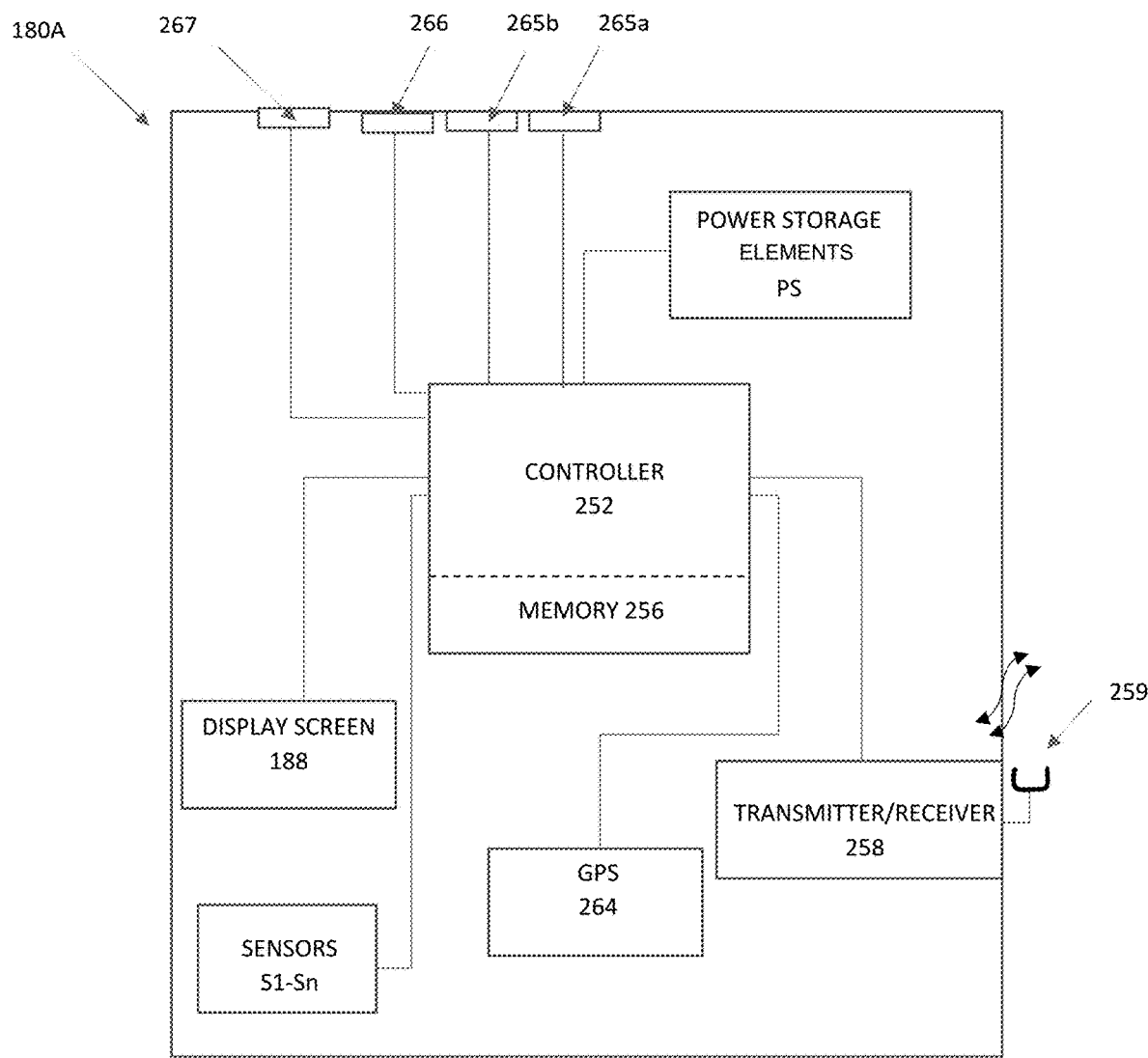
FIG. 42A is a schematic diagram of electronics of the cooler container of FIG. 39.
Figure 42B:
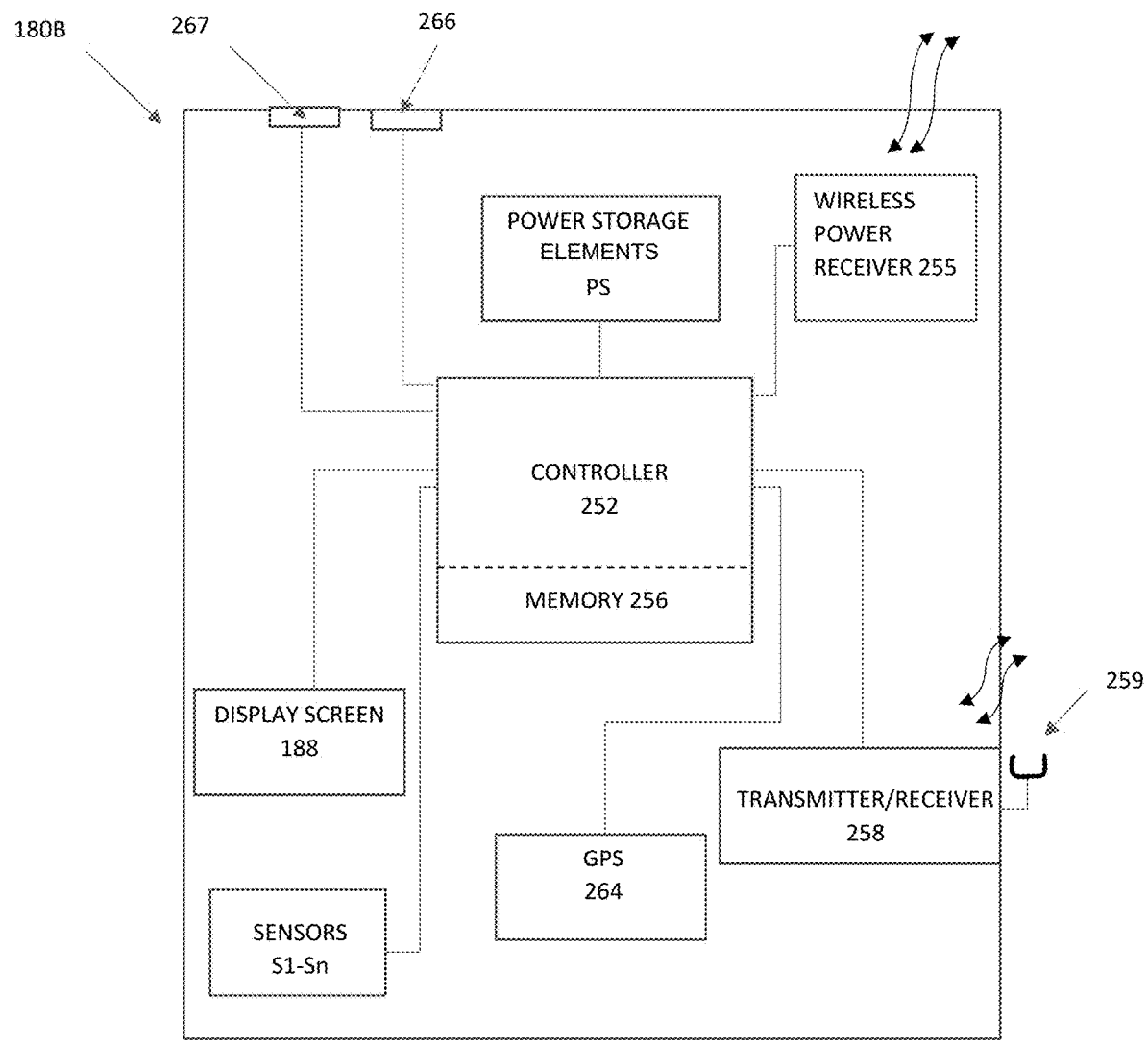
FIG. 42B is a schematic diagram of electronics of the cooler container of FIG. 40.

With reference to FIGS. 42A-42B, the cooler container 1000F, 1000G includes electronics 180A, 180B, respectively. The electronics 180A, 180B can include a display screen 188 (e.g., digital display screen) on a surface of the cooler container 1000F, 1000G. In another implementation, the display screen 188 is excluded from the cooler container 1000F, 1000G. In one implementation, the power storage elements (e.g., batteries) in the electronics 180A are charged via electrical contacts 265a, 265b (e.g., electrical contact strips). In another implementation, the power storage elements (e.g., batteries) in the electronics 180B are charged via inductive power coupling and the cooler container 1000G does not have electrical contacts for power transfer.

FIG. 42A shows a schematic diagram of the electronics 180 of the cooler container 1000F. A controller 252 (e.g., one or more processors, central processing unit or CPU) communicates (e.g., electrically communicates, two-way communication) with one or more power storage elements (e.g., batteries) PS. As discussed above, in one implementation, the power storage element(s) PS can receive power (e.g., from a power source, as further discussed below) via electrical contact(s) 265a, 265b. In another implementation, the power storage element(s) PS can receive power via the power connector 266. The controller 252 also communicates with a memory 256 that can store information sensed by one or more sensors (e.g., GPS, temperature, humidity, pressure, such as such parameter measurements over a period of time), instructions for operation of the electronics 180A and/or information received wirelessly from a remote electronic device (e.g., request for transfer of sensed parameter data or GPS location).

The controller 252 also communicates with a transmitter/receiver or transceiver 258 via which the electronics 180A can communicate wirelessly with a remote electronic device (e.g., a mobile electronic device such as a smartphone, tablet computer, laptop computer, a desktop computer, remote server, cloud server) via a wireless communication system such as Wi-Fi (e.g., IEEE 802.11 standard) and/or short-range wireless communication standard (e.g., BLUETOOTH®) via which the electronics 180A can communicate information (e.g., GPS location, sensed parameter data, such as sensed temperature, humidity and pressure, etc.) wirelessly (e.g., to the cloud, to a remote electronic device, such as a smartphone, etc.). The electronics 180A can also (additionally or alternatively) include a radio antenna 259 (e.g., cell radio antenna or cell radio, such as LTE radio antenna) via which the electronics 180A can communicate information (e.g., GPS location, sensed parameter data, such as sensed temperature, humidity and pressure, etc.) wirelessly (e.g., to the cloud, to a remote electronic device, such as a smartphone, etc.). The electronics 180A can also include a data port or connection (e.g., pin connection, electrical contact) 267 via which the electronics 188A can communicate information (e.g., GPS location, sensed parameter data, such as sensed temperature, humidity and pressure, etc.) to a separate electronic device (e.g., to the power and data transfer unit 750, as discussed above).

The controller 252 also communicates with the display screen 188 described above (e.g., to display sensed parameter information, GPS location info, shipping address information, etc.), one or more parameter sensors S1-Sn (e.g., temperature, pressure, humidity, gas such as carbon dioxide, motion such as via an accelerometer) and one or more global positioning system (GPS) sensors 264 (e.g., receiver(s)) that obtain location information for the electronics 180A (and therefore for the cooler container 1000F). In one implementation, the electronics 180A include a power button or interface that communicates with the controller 252 to turn on or turn off the operation of the electronics 180A (e.g., when manually operated by a user). In another implementation, the electronics 180A automatically turn on when the cooler container 1000F is removed or retrieved from a charging unit, such as the power and data unit 750.

FIG. 42B shows a schematic diagram of the electronics 180B of the cooler container 1000G. Some of the features of the electronics 180B are similar to features of the electronics 180A in FIG. 42A. Thus, reference numerals used to designate the various components of the electronics 180B are identical to those used for identifying the corresponding components of the electronics 180A in FIG. 42A, except that a "B" has been added to the numerical identifier. Therefore, the structure and description for the various features of the electronics 180A in FIG. 42A are understood to also apply to the corresponding features of the electronics 180B in FIG. 42B, except as described below.

The electronics 180B differ from the electronics 180A in that the electrical contacts 265a, 265b for power transfer are excluded and the power storage element(s) PS (e.g., batteries) can receive power (e.g., from a power source) via a wireless power receiver 255 (e.g., inductive coupling receiver) that communicates with the controller 252.

Figure 43:
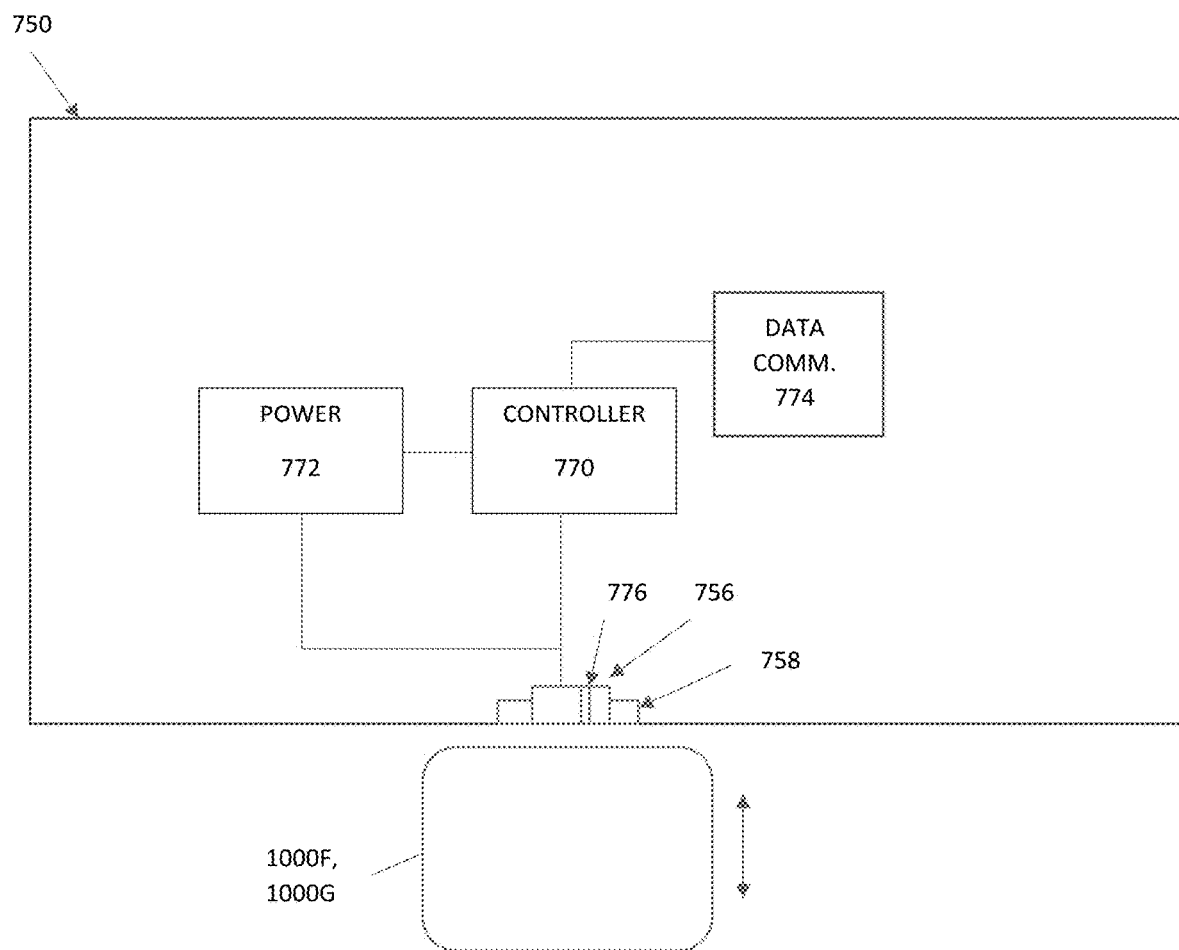
FIG. 43 is a schematic diagram of electronics of the power and data unit of FIGS. 41A-41B.

FIG. 43 shows a schematic diagram of at least a portion of the electronics of the power and data transfer unit 750. The power and data transfer unit 750 has a controller 770 that communicates with (e.g., controls the operation of) a power source 772, a data communication module 774 (e.g., wired communication module, such as high speed internet connection, and the electrical connector unit(s) 756 to which the cooler container(s) 1000F, 1000G can be coupled to transfer power to the cooler container(s) 1000F, 1000G and to receive (e.g., download) data (e.g., sensed parameter data, such as sensed temperature data or history, GPS location data or history) from the cooler container(s) 1000F, 1000G. As discussed above, one or more magnets 758 proximate (e.g., adjacent to, next to, surrounding) the electrical connector unit(s) 756 can facilitate alignment of the electrical contacts in the cooler container 1000F, 1000G with the electrical connector unit(s) 756.

The power source 772 transmits power to the one or more power storage elements PS of the cooler containers 1000F, 1000G directly or via the controller 770, either via electrical contacts that interface with electrical contacts 265a, 265b of the cooler container 1000F or via induction coupling if the cooler container 1000G has a wireless power receiver 255. Data (e.g., sensed temperature, GPS location history, etc.) can be transferred (e.g., downloaded) from the cooler container 1000F, 1000G via a data port or connection 776 of the electrical connector unit(s) 756 that interfaces (e.g., electrically connects) with the data port or connection (e.g., pin connection) 267 of the cooler container 1000F, 1000G and communicated via the data communication module 774, for example, to a remote electronic device (e.g., cloud based data storage system, a remote computer, remote server, etc.).

Advantageously, one or more power and data units 750 can be housed in a single location (e.g., a warehouse), which can be the same location or an adjacent warehouse or location that holds the containers, such as the containers 1000-1000G. Both can be at a shipment fulfillment center or at a shipment origination location, advantageously allowing the easy assembly of containers 1000-1000G with temperature sensitive or perishable goods. In one implementation, the power and data unit(s) 750 can also be at the destination location, allowing the temperature sensitive and/or perishable goods to be removed at the destination location and the cooler containers 1000-1000G to be powered (e.g. to charge the PCM in the containers to prepare them for another delivery of temperature sensitive goods) or data to be downloaded (e.g., for evaluation or transfer to storage or a customer).

Additional Embodiments

In embodiments of the present disclosure, a portable cooler container system or power and data transfer unit may be in accordance with any of the following clauses:

Clause 1. A portable cooler container with active temperature control, comprising:
- a container body having a chamber;
- a frame coupled to a bottom end and a top end of the container, the frame having a plurality of openings to allow air to flow about the container, the frame having one or more air intake openings and one or more proximal vent openings and one or more distal vent openings in fluid communication via one or more vent channels, one or more proximal electrical contacts and one or more distal electrical contacts
- a lid removably coupleable to the container body to access the chamber; and
- a temperature control system comprising
  - a cold side heat sink,
  - a hot side heat sink,
  - a thermoelectric module interposed between and in thermal communication with the cold side heat sink and hot side heat sink,
  - a hot side fan operable to draw air via the air intake openings, over the hot side heat sink to heat the air, and to exhaust the heated air via the distal vent openings,
  - one or more cold side fans operable to flow air over the cold side heat sink to cool the air and into a channel in thermal communication with the chamber to thereby cool the chamber,
  - one or more batteries, and
  - circuitry configured to control an operation of one or more of the thermoelectric module, hot side fan and cold side fans to cool at least a portion of the chamber to a predetermined temperature or temperature range.

Clause 2. The portable cooler container of any preceding clause, further comprising a display screen disposed on one or both of the container body and the lid, the display screen configured to selectively display shipping information for the portable cooler container using electronic ink.

Clause 3. The portable cooler container of any preceding clause, further comprising a button or touch screen actuatable by a user to automatically switch sender and recipient information on the display screen to facilitate return of the portable cooler container to a sender.

Clause 4. The portable cooler container of any preceding clause, further comprising a phase change material or thermal mass in thermal communication with the chamber and the channel, the phase change material or thermal mass configured to be cooled by the cooled fluid flowing through the channel.

Clause 5. The portable cooler container of any preceding clause, further comprising one or more sensors configured to sense the one or more parameters of the chamber or temperature control system and to communicate the sensed information to the circuitry.

Clause 6. The portable cooler container of any preceding clause, wherein at least one of the one or more sensors is a temperature sensor configured to sense a temperature in the chamber and to communicate the sensed temperature to the circuitry, the circuitry configured to communicate the sensed temperature data to the cloud-based data storage system or remote electronic device.

Clause 7. The portable cooler container of any preceding clause, wherein the container body is stackable such that electrical contacts on one container body contact electrical contacts in an adjacent container body, and so that proximal vent openings in one container body align with distal vent openings in an adjacent container body to thereby allow heated air to be exhausted from the stacked containers in a chimney-like manner.

Clause 8. A portable cooler container with active temperature control, comprising:
- a container body having a chamber;
- a frame coupled to a bottom end and a top end of the container, the frame having a plurality of openings to allow air to flow about the container, the frame having one or more air intake openings and one or more proximal vent openings and one or more distal vent openings in fluid communication via one or more vent channels, one or more proximal electrical contacts and one or more distal electrical contacts
- a lid removably coupleable to the container body to access the chamber; and
- a temperature control system comprising
  - a cold side heat sink,
  - a hot side heat sink,
  - a thermoelectric module interposed between and in thermal communication with the cold side heat sink and hot side heat sink,
  - a hot side fan operable to draw air via the air intake openings, over the hot side heat sink to heat the air, and to exhaust the heated air via the distal vent openings,
  - a cooling loop operable to flow a cooled fluid over the cold side heat sink to cool the fluid and into a channel in thermal communication with the chamber to thereby cool the chamber,
  - one or more batteries, and
  - circuitry configured to control an operation of one or more of the thermoelectric module, hot side fan and cold side fans to cool at least a portion of the chamber to a predetermined temperature or temperature range.

Clause 9. A portable cooler container with active temperature control, comprising:
- a container body having a chamber;
- a frame coupled to a bottom end and a top end of the container, the frame having a plurality of openings to allow air to flow about the container, the frame having one or more air intake openings and one or more proximal vent openings and one or more distal vent openings in fluid communication via one or more vent channels, one or more proximal electrical contacts and one or more distal electrical contacts a lid removably coupleable to the container body to access the chamber; and a temperature control system comprising
- a cold side heat sink,
- a hot side heat sink,
- a thermoelectric module interposed between and in thermal communication with the cold side heat sink and hot side heat sink,
- a hot side fan operable to draw air via the air intake openings, over the hot side heat sink to heat the air, and to exhaust the heated air via the distal vent openings,
- one or more cold side fans operable to flow air over the cold side heat sink to cool the air and into a channel in thermal communication with the chamber to thereby cool the chamber,
- one or more batteries, and
- circuitry configured to control an operation of one or more of the thermoelectric module, hot side fan and cold side fans to cool at least a portion of the chamber to a predetermined temperature or temperature range.

Clause 10. The portable cooler container of clause 9, further comprising a display screen disposed on one or both of the container body and the lid, the display screen configured to selectively display shipping information for the portable cooler container using electronic ink.

Clause 11. The portable cooler container of any of clauses 9-10, further comprising a button or touch screen actuatable by a user to automatically switch sender and recipient information on the display screen to facilitate return of the portable cooler container to a sender.

Clause 12. The portable cooler container of any of clauses 9-11, further comprising a phase change material or thermal mass in thermal communication with the chamber and the channel, the phase change material or thermal mass configured to be cooled by the cooled fluid flowing through the channel.

Clause 13. The portable cooler container of any of clauses 9-12, further comprising one or more sensors configured to sense the one or more parameters of the chamber or temperature control system and to communicate the sensed information to the circuitry.

Clause 14. The portable cooler container of any of clauses 9-13, wherein at least one of the one or more sensors is a temperature sensor configured to sense a temperature in the chamber and to communicate the sensed temperature to the circuitry, the circuitry configured to communicate the sensed temperature data to the cloud-based data storage system or remote electronic device.

Clause 15. The portable cooler container of any of clauses 9-14, wherein the container body is stackable such that electrical contacts on one container body contact electrical contacts in an adjacent container body, and so that proximal vent openings in one container body align with distal vent openings in an adjacent container body to thereby allow heated air to be exhausted from the stacked containers in a chimney-like manner.

Clause 16. A portable cooler container with active temperature control, comprising:
- a container body having a chamber;
- a frame coupled to a bottom end and a top end of the container, the frame having a plurality of openings to allow air to flow about the container, the frame having one or more air intake openings and one or more proximal vent openings and one or more distal vent openings in fluid communication via one or more vent channels, one or more proximal electrical contacts and one or more distal electrical contacts
- a lid removably coupleable to the container body to access the chamber; and
- a temperature control system comprising
  - a cold side heat sink,
  - a hot side heat sink,
  - a thermoelectric module interposed between and in thermal communication with the cold side heat sink and hot side heat sink,
  - a hot side fan operable to draw air via the air intake openings, over the hot side heat sink to heat the air, and to exhaust the heated air via the distal vent openings,
  - a cooling loop operable to flow a cooled fluid over the cold side heat sink to cool the fluid and into a channel in thermal communication with the chamber to thereby cool the chamber,
  - one or more batteries, and
  - circuitry configured to control an operation of one or more of the thermoelectric module, hot side fan and cold side fans to cool at least a portion of the chamber to a predetermined temperature or temperature range.

Clause 17. The portable cooler container of any preceding clause, wherein the one or more batteries are in a module removably coupleable to the cooler container, the module being interchangeable.

Clause 18. A portable cooler container system, comprising:
- a container body having a chamber;
- a sleeve disposed about the chamber and housing a phase change material or thermal mass;
- a conduit extending through the sleeve in a coiled path, an outer surface of the conduit in thermal communication with the phase change material or thermal mass;
- a lid removably coupleable to the container body to access the chamber; and
- a temperature control system comprising
  - a cold side heat sink in thermal communication with the conduit,
  - a hot side heat sink,
  - a thermoelectric module interposed between and in thermal communication with the cold side heat sink and hot side heat sink,
  - a hot side fan operable to draw air via the air intake openings, over the hot side heat sink to heat the air, and to exhaust the heated air via the distal vent openings,
  - a pump operable to flow a fluid relative to the cold side heat sink to cool the fluid and to flow the cooled fluid through the conduit in the sleeve to cool the phase change material or thermal mass so that the phase change material or thermal mass can cool at least a portion of the chamber, and
  - circuitry configured to control an operation of one or more of the thermoelectric module, hot side fan and pump.

Clause 19. The portable cooler container system of clause 18, further comprising a display screen disposed on one or both of the container body and the lid, the display screen configured to selectively display shipping information for the portable cooler container using electronic ink.

Clause 20. The portable cooler container system of any of clauses 18-19, further comprising a button or touch screen actuatable by a user to automatically switch sender and recipient information on the display screen to facilitate return of the portable cooler container to a sender.

Clause 21. The portable cooler container system of any of clauses 18-20, further comprising one or more sensors configured to sense the one or more parameters of the chamber or temperature control system and to communicate the sensed information to the circuitry.

Clause 22. The portable cooler container system of any of clauses 18-21, wherein at least one of the one or more sensors is a temperature sensor configured to sense a temperature in the chamber and to communicate the sensed temperature to the circuitry, the circuitry configured to communicate the sensed temperature data to the cloud-based data storage system or remote electronic device.

Clause 23. The portable cooler container system of any of clauses 18-22, wherein the container body is stackable such that electrical contacts on one container body contact electrical contacts in an adjacent container body, and so that proximal vent openings in one container body align with distal vent openings in an adjacent container body to thereby allow heated air to be exhausted from the stacked containers in a chimney-like manner.

Clause 24. The portable cooler container system of any of clauses 18-23, wherein the temperature control system is disposed outside the container body and is selectively coupleable to the container body to charge or cool the phase change material or thermal mass.

Clause 25. A portable cooler container system, comprising:
  a container body having a chamber;
  a sleeve disposed about the chamber and housing a phase change material;
  a conduit extending through the sleeve in a coiled path, an outer surface of the conduit in thermal communication with the phase change material;
  a lid removably coupleable to the container body to access the chamber; and
  a temperature control system comprising
    a cold side heat sink in thermal communication with the conduit,
    a hot side heat sink,
    a thermoelectric module interposed between and in thermal communication with the cold side heat sink and hot side heat sink,
    a hot side fan operable to draw air via the air intake openings, over the hot side heat sink to heat the air, and to exhaust the heated air via the distal vent openings,
    a pump operable to flow a fluid relative to the cold side heat sink to cool the fluid and to flow the cooled fluid through the conduit in the sleeve to charge the phase change material so that the phase change material can cool at least a portion of the chamber, and
    circuitry configured to control an operation of one or more of the thermoelectric module, hot side fan and pump.

Clause 26. The portable cooler container system of clause 25, further comprising a display screen disposed on one or both of the container body and the lid, the display screen configured to selectively display shipping information for the portable cooler container using electronic ink.

Clause 27. The portable cooler container system of any of clauses 25-26, further comprising a button or touch screen actuatable by a user to automatically switch sender and recipient information on the display screen to facilitate return of the portable cooler container to a sender.

Clause 28. The portable cooler container system of any of clauses 25-27, further comprising one or more sensors configured to sense the one or more parameters of the chamber or temperature control system and to communicate the sensed information to the circuitry.

Clause 29. The portable cooler container system of any of clauses 25-28, wherein at least one of the one or more sensors is a temperature sensor configured to sense a temperature in the chamber and to communicate the sensed temperature to the circuitry, the circuitry configured to communicate the sensed temperature data to the cloud-based data storage system or remote electronic device.

Clause 30. The portable cooler container system of any of clauses 25-29, wherein the container body is stackable such that electrical contacts on one container body contact electrical contacts in an adjacent container body, and so that proximal vent openings in one container body align with distal vent openings in an adjacent container body to thereby allow heated air to be exhausted from the stacked containers in a chimney-like manner.

Clause 31. The portable cooler container system of any of clauses 25-30, wherein the temperature control system is disposed outside the container body and is selectively coupleable to the container body to charge the phase change material.

Clause 32. A portable cooler container system, comprising:
  a chamber configured to receive one or more perishable components;
  a first wall circumferentially disposed about the chamber and under a base of the chamber;
  a second wall circumferentially disposed about the first wall and under a base portion of the first wall, the second wall spaced apart from the first wall so as to define a gap therebetween, the gap being under vacuum to thereby thermally insulate the first wall from the second wall to thereby thermally insulate the chamber;
  an outer housing disposed about the second wall;
  a lid removably coupleable over the chamber to substantially seal the chamber; and
  an electronic display screen configured to selectively display an electronic shipping label for the portable cooler container.

Clause 33. The portable cooler container system of clause 32, further comprising circuitry configured to communicate with the electronic display screen.

Clause 34. The portable cooler container system of any of clauses 32-33, further comprising a phase change material or thermal mass in thermal communication with the chamber to cool the one or more perishable components.

Clause 35. The portable cooler container system of any of clauses 32-34, further comprising a button or touch screen actuatable by a user to one or both of a) automatically switch sender and recipient information on the display screen to facilitate return of the portable cooler container to a sender and b) automatically contact a shipping carrier to alert the shipping carrier that a new electronic shipping label has been issued and that the container is ready for pick-up.

Clause 36. The portable cooler container system of any of clauses 32-35, further comprising one or more sensors configured to sense the one or more parameters of the chamber and to communicate the sensed parameters to the circuitry.

Clause 37. The portable cooler container system of any of clauses 32-36, wherein at least one of the one or more sensors is a temperature sensor configured to sense a temperature in the chamber.

Clause 38. The portable cooler container system of any of clauses 32-37, wherein the circuitry is configured to communicate with a cloud-based server system or remote electronic device.

Clause 39. The portable cooler container system of any of clauses 32-38, wherein the electronic display screen is an electronic ink display screen.

Clause 40. The portable cooler container system of any of clauses 32-39, wherein the outer housing comprises a thermally insulative material.

Clause 41. The portable cooler container system of any of clauses 32-40, wherein the lid is a vacuum-insulated lid.

Clause 42. A portable cooler container system, comprising:
- a container body having a chamber configured to receive one or more perishable goods;
- a sleeve disposed about the chamber and housing a phase change material or thermal mass;
- a conduit extending through the sleeve, an outer surface of the conduit in thermal communication with the phase change material or thermal mass;
- a lid hingedly coupleable or removably coupleable to the container body to access the chamber; and
- a temperature control system comprising
  - a cold side heat sink in thermal communication with at least a portion of the conduit,
  - a hot side heat sink,
  - a thermoelectric module interposed between and in thermal communication with the cold side heat sink and hot side heat sink,
  - a pump operable to flow a fluid relative to the cold side heat sink to cool the fluid and to flow the cooled fluid through the conduit in the sleeve to charge the phase change material or thermal mass so that the phase change material or thermal mass is configured to cool at least a portion of the chamber, and
  - circuitry configured to control an operation of one or both of the thermoelectric module and pump.

Clause 43. The portable cooler container system of clause 42, wherein the conduit extends through the sleeve along a coiled path.

Clause 44. The portable cooler container system of any of clauses 42-43, further comprising a display screen disposed on one or both of the container body and the lid, the display screen configured to selectively display shipping information for the portable cooler container.

Clause 45. The portable cooler container system of any of clauses 42-44, wherein the display screen is an electrophoretic ink display.

Clause 46. The portable cooler container system of any of clauses 42-45, further comprising a button or touch screen manually actuatable by a user to automatically switch sender and recipient information on the display screen to facilitate return of the portable cooler container to a sender.

Clause 47. The portable cooler container system of any of clauses 42-46, further comprising one or more sensors configured to sense one or more parameters of the chamber or temperature control system and to communicate the sensed information to the circuitry.

Clause 48. The portable cooler container system of any of clauses 42-47, wherein at least one of the one or more sensors is a temperature sensor configured to sense a temperature in the chamber and to communicate the sensed temperature to the circuitry, the circuitry configured to communicate the sensed temperature data to a cloud-based data storage system or remote electronic device.

Clause 49. The portable cooler container system of any of clauses 42-48, wherein the container body is stackable such that electrical contacts on one container body contact electrical contacts in an adjacent container body.

Clause 50. The portable cooler container system of any of clauses 42-49, wherein at least a portion of the temperature control system is disposed outside the container body and is selectively coupleable to the container body to cool the phase change material or thermal mass.

Clause 51. The portable cooler container system of any of clauses 42-50, further comprising one or more fins extending from an outer surface of the conduit and in thermal communication with the phase change material or thermal mass.

Clause 52. The portable cooler container system of any of clauses 42-51, wherein the container body is a vacuum-insulated container body.

Clause 53. A portable cooler container, comprising:
- a double-walled vacuum-insulated container body having a chamber configured to receive and hold one or more perishable goods;
- a lid hingedly coupleable or removably coupleable to the container body to access the chamber; and
- an electronic system of the container body, comprising
  - one or more batteries, and
  - circuitry configured to wirelessly communicate via a cell radio with a cloud-based data storage system or a remote electronic device; and
- an electronic display screen on one of the lid and the container body configured to selectively display an electronic shipping label for the portable cooler container.

Clause 54. The portable cooler container system of clause 53, further comprising one or more volumes of a phase change material or thermal mass to cool the one or more perishable goods.

Clause 55. The portable cooler container system of any of clauses 53-54, further comprising a button or touch screen manually actuatable by a user to one or both of a) automatically switch sender and recipient information on the display screen to facilitate return of the portable cooler container to a sender and b) automatically contact a shipping carrier to alert the shipping carrier that a new electronic shipping label has been issued and that the container is ready for pick-up.

Clause 56. The portable cooler container system of any of clauses 53-55, further comprising one or more sensors configured to sense the one or more parameters of the chamber and to communicate the sensed parameters to the circuitry.

Clause 57. The portable cooler container system of any of clauses 53-56, wherein at least one of the one or more sensors is a temperature sensor configured to sense a temperature in the chamber.

Clause 58. The portable cooler container system of any of clauses 53-57, wherein the electronic display screen is an electrophoretic ink display screen.

Clause 59. The portable cooler container system of any of clauses 53-58, wherein the lid is a vacuum-insulated lid.

Clause 60. A portable cooler container system, comprising:
- an insulated container body having a payload chamber configured to receive one or more temperature sensitive or perishable goods;
- a lid hingedly coupleable or removably coupleable to the container body to access the chamber; and
- an electronic system of the container body comprising
  - one or more power storage elements, one or more sensors for sensing one or more parameters of the cooler container, circuitry configured to communicate the sensed parameter information with a remote electronic device; and an electrical connector unit on an outer surface of the cooler container via which power is transferred to the cooler container and via which sensed parameter information is transferred from the cooler container when the cooler container is placed against a power and data transfer unit.

Clause 61. The portable cooler container system of clause 60, wherein the electrical connector unit further comprises one or more metal plates or surfaces configured to magnetically align the electrical connector unit with a corresponding electrical connector interface of the power and data transfer unit.

Clause 62. The portable cooler container system of any of clauses 60-61, wherein the one or more metal plates or surfaces at least partially surround one or more electrical contacts of the electrical connector unit.

Clause 63. The portable cooler container system of any of clauses 60-62, wherein the electrical connector unit comprises an electrical contact that provides for transfer of sensed parameter information or data from the cooler container.

Clause 64. The portable cooler container system of any of clauses 60-63, wherein the electrical connector unit comprises a pair of electrical contacts that provide a positive and negative power connection.

Clause 65. The portable cooler container system of any of clauses 60-64, wherein the electronic system comprises a wireless power receiver via which the cooler container receives power.

Clause 66. The portable cooler container system of any of clauses 60-65, wherein at least one of the one or more sensors is a temperature sensor configured to sense a temperature in the payload chamber and to communicate the sensed temperature to the circuitry, the circuitry configured to communicate the sensed temperature data to a cloud-based data storage system or remote electronic device.

Clause 67. The portable cooler container system of any of clauses 60-66, wherein the container body is stackable such that electrical connector units of the container bodies are configured to face in the same direction to interface with a power and data transfer unit.

Clause 68. The portable cooler container system of any of clauses 60-67, wherein the circuitry is configured to communicate wirelessly with a remote electronic device or a cloud-based data storage system.

Clause 69. The portable cooler container system of any of clauses 60-68, further comprising a power and data transfer unit configured to receive one or more cooler containers in a stacked configuration, the power and data transfer unit operable to simultaneously provide power to each of the one or more cooler containers via an electrical connector interface that interfaces with the electrical connector unit of the cooler container.

Clause 70. A portable cooler container system, comprising:
an insulated container body having a payload chamber configured to receive one or more temperature sensitive or perishable products;
a sleeve disposed about the chamber and housing a phase change material or thermal mass;
a conduit extending through the sleeve, an outer surface of the conduit in thermal communication with the phase change material or thermal mass;
a lid hingedly coupleable or removably coupleable to the container body to access the chamber;
a temperature control system comprising
a cold side heat sink in thermal communication with at least a portion of the conduit,
a hot side heat sink,
a thermoelectric module interposed between and in thermal communication with the cold side heat sink and hot side heat sink,
a pump operable to flow a fluid relative to the cold side heat sink to cool the fluid and to flow the cooled fluid through the conduit in the sleeve to cool the phase change material or thermal mass so that the phase change material or thermal mass is configured to cool at least a portion of the chamber; and an electronic system of the container body comprising
one or more power storage elements,
one or more sensors for sensing one or more parameters of the cooler container,
circuitry configured to communicate the sensed parameter information with a remote electronic device and to control an operation of one or both of the thermoelectric module and the pump; and
an electrical connector unit on an outer surface of the cooler container via which power is transferred to the cooler container and via which sensed parameter information is transferred from the cooler container when the cooler container is placed against a power and data transfer unit.

Clause 71. The portable cooler container system of clause 70, wherein the electrical connector unit further comprises one or more metal plates or surfaces configured to magnetically align the electrical connector unit with a corresponding electrical connector interface of the power and data transfer unit.

Clause 72. The portable cooler container system of any of clauses 70-71, wherein the one or more metal plates or surfaces at least partially surround one or more electrical contacts of the electrical connector unit.

Clause 73. The portable cooler container system of any of clauses 70-72, wherein the electrical connector unit comprises an electrical contact that provides for transfer of sensed parameter information or data from the cooler container.

Clause 74. The portable cooler container system of any of clauses 70-73, wherein the electrical connector unit comprises a pair of electrical contacts that provide a positive and negative power connection.

Clause 75. The portable cooler container system of any of clauses 70-74, wherein the electronic system comprises a wireless power receiver via which the cooler container receives power.

Clause 76. The portable cooler container system of any of clauses 70-75, wherein at least one of the one or more sensors is a temperature sensor configured to sense a temperature in the payload chamber and to communicate the sensed temperature to the circuitry, the circuitry configured to communicate the sensed temperature data to a cloud-based data storage system or remote electronic device.

Clause 77. The portable cooler container system of any of clauses 70-76, wherein the container body is stackable such that electrical connector units of the container bodies are configured to face in the same direction to interface with a power and data transfer unit.

Clause 78. The portable cooler container system of any of clauses 70-77, wherein the circuitry is configured to communicate wirelessly with a remote electronic device or a cloud-based data storage system.

Clause 79. The portable cooler container system of any of clauses 70-78, further comprising a power and data transfer unit configured to receive one or more cooler containers in a stacked configuration, the power and data transfer unit operable to simultaneously provide power to each of the one or more cooler containers via an electrical connector interface that interfaces with the electrical connector unit of the cooler container.

Clause 80. A power and data transfer unit for a portable cooler container system, comprising:
- a wall or tower having one or more surfaces configured to face one or more cooler containers placed against the one or more surfaces;
- a plurality of electrical connector interfaces on the one or more surfaces, each of the electrical connector interfaces configured to interface with an electrical connector unit of a cooler container placed proximate to the electrical connector interface;
- one or more magnets proximate each of the plurality of electrical connector interfaces on the one or more surfaces, the one or more magnets configured to exert a magnetic force on a metal or magnetic surface of the cooler containers to align the electrical connector unit of each cooler container with a corresponding electrical connector interface; and
- an electronic system comprising
  - a controller with circuitry in communication with the plurality of electrical connector interfaces,
  - one or more power sources in communication with the controller, and
  - a data communication module in communication with the controller,
  - wherein the controller is configured to control delivery of power to the cooler containers and configured to control retrieval of sensed parameter information or data from the cooler containers, the circuitry configured to communicate the sensed parameter information or data to a remote electronic device or cloud-based data storage system.

Clause 81. The power and data transfer unit of clause 80, where in the one or more surfaces are opposite surfaces of the wall or tower.

Clause 82. The power and data transfer unit of any of clauses 80-81, wherein the one or more magnets at least partially surround one or more electrical contacts of the electrical connector interface.

Clause 83. The power and data transfer unit of any of clauses 80-82, wherein the electrical connector interface comprises an electrical contact that provides for transfer of sensed parameter information or data from the cooler container.

Clause 84. The power and data transfer unit of any of clauses 80-83, wherein the electrical connector interface comprises a pair of electrical contacts that provide a positive and negative power connection with corresponding electrical contacts of the cooler container.

Clause 85. The power and data transfer unit of any of clauses 80-84, wherein the electronic system comprises a wireless power transmitter configured to transmit power wirelessly to the cooler container.

Clause 86. The power and data transfer unit of any of clauses 80-85, wherein the circuitry is configured to communicate wirelessly with a remote electronic device or a cloud-based data storage system.

While certain embodiments of the inventions have been described, these embodiments have been presented by way of example only, and are not intended to limit the scope of the disclosure. Indeed, the novel methods and systems described herein may be embodied in a variety of other forms. The features disclosed herein are applicable to containers that transport all manner of perishable goods (e.g., medicine, food, beverages, living tissue or organisms) and the invention is understood to extend to such other containers. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. A cooler container kit, comprising:
    a cooler container comprising:
        an insulated container body having a payload chamber configured to receive one or more products;
        a lid coupleable to the container body;
        an electronic system of the container body, comprising:
            one or more electrical connectors on an outer surface of the cooler container via which power is transferred to the cooler container;
            a conduit extending through the insulated container body and about the payload chamber; and
            a temperature control system comprising:
                a cold side heat sink in thermal communication with at least a portion of the conduit;
                a hot side heat sink;
                a thermoelectric module disposed between and in thermal communication with the cold side heat sink and the hot side heat sink; and
                a pump operable to flow a liquid relative to the cold side heat sink to cool the liquid, the pump configured to flow the cooled liquid through the conduit; and
    a docking unit having a docking station for the cooler container, the docking station configured to transfer the power to the cooler container based on the one or more electrical connectors of the cooler container contacting a corresponding one or more electrical contacts of the docking station.

2. The cooler container kit of claim 1, wherein the cooler container further comprises one or more metal plates or surfaces on the outer surface of the cooler container proximate the one or more electrical connectors and configured to magnetically align the one or more electrical connectors with the corresponding one or more electrical contacts.

3. The cooler container kit of claim 2, wherein the one or more metal plates or surfaces at least partially surround the one or more electrical connectors.

4. The cooler container kit of claim 1, wherein the one or more electrical connectors comprise an electrical contact that provides for transfer of sensed parameter information or data from the container.

5. The cooler container kit of claim 1, wherein the cooler container comprises one or more sensors including at least one temperature sensor configured to sense a temperature associated with the payload chamber.

6. The cooler container kit of claim 5, wherein the thermoelectric module is disposed in thermal communication with the cold side heat sink and the hot side heat sink by being disposed in contact with the cold side heat sink and the hot side heat sink.

7. The cooler container kit of claim 5, wherein the electronic system is further configured to communicate the sensed temperature to the docking unit via a connection between the one or more electrical connectors and the one or more electrical contacts.

8. The cooler container kit of claim 1, wherein the cooler container further comprises:
    phase change material in the insulated container body disposed about the payload chamber,
        wherein the conduit extends through the phase change material such that the pump, being configured to flow the cooled liquid through the conduit, facilitates cooling of the phase change material and at least a portion of the payload chamber.

9. A cooler container kit, comprising:
    a cooler container comprising:
        an insulated container body having a payload chamber configured to receive one or more products;
        a lid coupleable to the container body;
        an electronic system of the container body via which power is transferred to the cooler container;
        phase change material disposed about the payload chamber;

a conduit extending through the phase change material and configured to cool the phase change material based on the power being transferred to the cooler container; and a temperature control system comprising:
- a cold side heat sink in thermal communication with at least a portion of the conduit;
- a hot side heat sink; and
- a thermoelectric module disposed between and in thermal communication with the cold side heat sink and the hot side heat sink; and a docking unit having a docking station for the cooler container, the docking stations configured to transfer the power to the cooler container based on the cooler container being placed adjacent the docking unit.

10. The cooler container kit of claim 9, wherein the cooler container further comprises:
one or more electrical connectors on an outer surface of the cooler container; and
metal plates or surfaces on the outer surface of the cooler container proximate the one or more electrical connectors and configured to magnetically align the one or more electrical connectors with corresponding one or more electrical contacts of the docking station.

11. The cooler container kit of claim 10, wherein the one or more metal plates or surfaces at least partially surround the one or more electrical connectors.

12. The cooler container kit of claim 9, wherein the thermoelectric module is disposed in thermal communication with the cold side heat sink and the hot side heat sink by being disposed in contact with the cold side heat sink and the hot side heat sink.

13. The cooler container kit of claim 9, wherein the cooler container further comprises one or more sensors including at least one temperature sensor configured to sense a temperature associated with the payload chamber and to communicate the sensed temperature to the electronic system.

14. The cooler container kit of claim 13, wherein the cooler container further comprises a foam portion disposed around a portion of the insulated container body.

15. The cooler container kit of claim 9, wherein the electronic system comprises a wireless power receiver via which the cooler container receives the power.

16. The cooler container kit of claim 9, wherein the cooler container further comprises:
a pump operable to flow a liquid relative to the cold side heat sink to cool the liquid and to flow the cooled liquid through the conduit to cool the phase change material and at least a portion of the payload chamber.

17. A cooler container kit, comprising:
a cooler container comprising:
- an insulated container body having a payload chamber configured to receive one or more products;
- a lid coupleable to the container body;
- an electronic system of the container body via which power is transferred to the cooler container;
- a phase change material disposed about the payload chamber;
- a conduit extending through the phase change material;
- a cold side heat sink in thermal communication with at least a portion of the conduit and configured to cool the phase change material via a liquid disposed in the conduit;
- a hot side heat sink;
- a thermoelectric module disposed between and in thermal communication with the cold side heat sink and the hot side heat sink; and
- a pump configured to flow the liquid through the conduit relative to the cold side heat sink; and a docking unit having a docking station for the cooler container, the docking station configured to support the cooler container on top of the docking station and transfer power to the cooler container.

18. The cooler container kit of claim 17, wherein the cooler container further comprises one or more metal plates or surfaces on an outer surface of the cooler container proximate one or more electrical connectors and configured to magnetically align the one or more electrical connectors with a corresponding one or more electrical contacts of the docking unit.

19. The cooler container kit of claim 17, wherein the electronic system comprises a wireless power receiver via which the cooler container receives the power from the docking station.

20. The cooler container kit of claim 17, wherein the cooler container further comprises one or more metal plates configured to magnetically align a power receiver of the cooler container with a power transmitter of the docking station.

* * * * *